US011280609B2

United States Patent
Chen et al.

(10) Patent No.: US 11,280,609 B2
(45) Date of Patent: Mar. 22, 2022

(54) DETECTION OF MISALIGNMENT HOTSPOTS FOR HIGH DEFINITION MAPS FOR NAVIGATING AUTONOMOUS VEHICLES

(71) Applicant: DeepMap Inc., Palo Alto, CA (US)

(72) Inventors: Chen Chen, San Jose, CA (US); Mark Damon Wheeler, Saratoga, CA (US); Liang Zou, Sunnyvale, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 988 days.

(21) Appl. No.: 15/857,609

(22) Filed: Dec. 28, 2017

(65) Prior Publication Data

US 2018/0188041 A1 Jul. 5, 2018

Related U.S. Application Data

(60) Provisional application No. 62/441,080, filed on Dec. 30, 2016.

(51) Int. Cl.
*G01C 11/12* (2006.01)
*G06T 7/73* (2017.01)
(Continued)

(52) U.S. Cl.
CPC ............. *G01C 11/12* (2013.01); *B60W 40/06* (2013.01); *G01C 11/06* (2013.01); *G01C 11/30* (2013.01);
(Continued)

(58) Field of Classification Search
CPC ...... G01C 11/12; G01C 21/32; G01C 21/005; G06T 7/55
See application file for complete search history.

(56) References Cited

U.S. PATENT DOCUMENTS 6,771,837 B1 8/2004 Berbecel et al.
6,885,939 B2 4/2005 Schmidt et al.
(Continued)

FOREIGN PATENT DOCUMENTS

WO WO 2016/130719 A2 8/2016

OTHER PUBLICATIONS

PCT Invitation to Pay Additional Fees, PCT Application No. PCT/US2017/068840, dated Feb. 22, 2018, 2 pages.
(Continued)

*Primary Examiner* — Jelani A Smith
*Assistant Examiner* — Toya Pettiegrew
(74) *Attorney, Agent, or Firm* — Maschoff Brennan

(57) ABSTRACT

A high-definition map system receives sensor data from vehicles travelling along routes and combines the data to generate a high definition map for use in driving vehicles, for example, for guiding autonomous vehicles. A pose graph is built from the collected data, each pose representing location and orientation of a vehicle. The pose graph is optimized to minimize constraints between poses. Points associated with surface are assigned a confidence measure determined using a measure of hardness/softness of the surface. A machine-learning-based result filter detects bad alignment results and prevents them from being entered in the subsequent global pose optimization. The alignment framework is parallelizable for execution using a parallel/distributed architecture. Alignment hot spots are detected for further verification and improvement. The system supports incremental updates, thereby allowing refinements of subgraphs for incrementally improving the high-definition map for keeping it up to date.

20 Claims, 36 Drawing Sheets

(51) Int. Cl.

| | | |
|---|---|---|
| *G06T 7/68* | (2017.01) | |
| *G06K 9/00* | (2022.01) | |
| *G06T 7/55* | (2017.01) | |
| *G06T 17/05* | (2011.01) | |
| *G01C 11/30* | (2006.01) | |
| *G06T 7/246* | (2017.01) | |
| *G06K 9/46* | (2006.01) | |
| *G01C 11/06* | (2006.01) | |
| *G01C 21/36* | (2006.01) | |
| *G06T 7/11* | (2017.01) | |
| *G01C 21/32* | (2006.01) | |
| *G05D 1/00* | (2006.01) | |
| *G05D 1/02* | (2020.01) | |
| *G06T 7/70* | (2017.01) | |
| *G06T 7/593* | (2017.01) | |
| *G06K 9/62* | (2022.01) | |
| *B60W 40/06* | (2012.01) | |
| *G01S 19/42* | (2010.01) | |
| *G08G 1/00* | (2006.01) | |
| *G06T 17/20* | (2006.01) | |
| *G01C 21/00* | (2006.01) | |
| *G01S 19/47* | (2010.01) | |
| *G01S 19/46* | (2010.01) | |
| *G01S 17/89* | (2020.01) | |

(52) U.S. Cl.
CPC ........... *G01C 21/005* (2013.01); *G01C 21/32* (2013.01); *G01C 21/3602* (2013.01); *G01C 21/3635* (2013.01); *G01C 21/3694* (2013.01); *G01S 19/42* (2013.01); *G05D 1/0088* (2013.01); *G05D 1/0246* (2013.01); *G06K 9/00791* (2013.01); *G06K 9/00798* (2013.01); *G06K 9/00805* (2013.01); *G06K 9/4671* (2013.01); *G06K 9/6212* (2013.01); *G06T 7/11* (2017.01); *G06T 7/246* (2017.01); *G06T 7/248* (2017.01); *G06T 7/55* (2017.01); *G06T 7/593* (2017.01); *G06T 7/68* (2017.01); *G06T 7/70* (2017.01); *G06T 7/73* (2017.01); *G06T 7/74* (2017.01); *G06T 17/05* (2013.01); *G06T 17/20* (2013.01); *G08G 1/20* (2013.01); *B60W 2552/00* (2020.02); *G01S 17/89* (2013.01); *G01S 19/46* (2013.01); *G01S 19/47* (2013.01); *G05D 2201/0213* (2013.01); *G06T 2200/04* (2013.01); *G06T 2207/10021* (2013.01); *G06T 2207/10028* (2013.01); *G06T 2207/20048* (2013.01); *G06T 2207/30252* (2013.01); *G06T 2207/30256* (2013.01); *G06T 2210/56* (2013.01); *G06T 2215/12* (2013.01)

(56) References Cited

U.S. PATENT DOCUMENTS

| | | |
|---|---|---|
| 8,929,176 B2 | 1/2015 | Debrunner et al. |
| 9,412,173 B2 | 8/2016 | Leonard et al. |
| 9,412,278 B1 | 8/2016 | Gong et al. |
| 10,031,231 B2 * | 7/2018 | Zermas .................. G06N 20/00 |
| 10,055,885 B2 * | 8/2018 | Goodman ............... G06T 17/05 |
| 2004/0128070 A1 | 7/2004 | Schmidt et al. |
| 2006/0208169 A1 | 9/2006 | Breed et al. |
| 2008/0033645 A1 | 2/2008 | Levinson et al. |
| 2011/0143811 A1 | 6/2011 | Rodriguez |
| 2011/0212717 A1 | 9/2011 | Rhoads et al. |
| 2012/0099402 A1 | 4/2012 | Debrunner et al. |
| 2013/0273968 A1 | 10/2013 | Rhoads et al. |
| 2014/0080428 A1 | 3/2014 | Rhoads et al. |
| 2016/0071278 A1 | 3/2016 | Leonard et al. |
| 2017/0083763 A1 * | 3/2017 | Zang .......................... G06T 7/73 |
| 2018/0068567 A1 | 3/2018 | Gong et al. |
| 2018/0086373 A1 * | 3/2018 | Tamura ................. B60W 40/06 |
| 2018/0188039 A1 | 7/2018 | Chen et al. |
| 2018/0188042 A1 | 7/2018 | Chen |
| 2018/0188043 A1 | 7/2018 | Chen et al. |
| 2018/0189578 A1 | 7/2018 | Yang et al. |
| 2018/0216942 A1 | 8/2018 | Wang et al. |
| 2018/0225968 A1 | 8/2018 | Wang |
| 2018/0283892 A1 | 10/2018 | Behrendt et al. |
| 2018/0293435 A1 | 10/2018 | Wang |
| 2018/0293466 A1 | 10/2018 | Viswanathan |

OTHER PUBLICATIONS

PCT International Search Report and Written Opinion, PCT Application No. PCT/US2017/068840, dated May 2, 2018, 35 pages.

Rehder, et al., "Global Pose Estimation with Limited GPS and Long Range Visual Odometry," IEEE Robotics and Automation (ICRA), Jun. 2012, 7 pages, [Online] [Retrieved on Apr. 15, 2018], Retrieved from the Internet<URL:http://repository.cmu.edu/cgi/viewcontent.cgi?article=1935&context=robotics>.

Chen, Y. et al., "Object Modeling by Registration of Multiple Range Images," Proceedings of the 1991 IEEE International Conference on Robotics and Automation, Apr. 1991, pp. 2724-2729.

Fitzgibbon, A.W., "Robust Registration of 2D and 3D Point Sets," Image and Vision Computing, Elsevier, Dec. 2003, pp. 1145-1153, vol. 21, Issues 13-14.

Gatziolis, D. et al., "A Guide to LIDAR Data Acquisition and Processing for the Forests of the Pacific Northwest," United States Department of Agriculture, Forest Service, Pacific Northwest Research Station, General Technical Report, PNW-GTR-768, Jul. 2008, 40 pages.

Grisetti, G. et al., "A Tutorial on Graph-Based SLAM," IEEE Intelligent Transportation Systems Magazine, Winter 2010, pp. 31-43, vol. 2, Issue 4.

Low, K-L., "Linear Least-Squares Optimization for Point-to-Plane ICP Surface Registration," Technical Report TR04-004, Department of Computer Science, University of North Carolina at Chapel Hill, Feb. 2004, 3 pages.

Park, S-Y. et al., "An Accurate and Fast Point-to-Plane Registration Technique," Pattern Recognition Letters, 2003, pp. 2967-2976, vol. 24.

Segal, A.V. et al., "Generalized-ICP," 8 pages.

Zitova, B. et al., "Image Registration Methods A Survey," Image and Vision Computing, 2003, pp. 977-100, vol. 21.

* cited by examiner

For each pose subgraph

Repeat while boundary node poses change across iterations

2100
Optimize pose subgraph while keeping boundary nodes fixed

2110
Update boundary nodes from neighboring pose subgraphs

2120
Determine an amount of change in the boundary nodes

2130
Mark subgraph optimization complete if no change in boundary nodes

FIG. 21

Graph 2a Well aligned Walls

Graph 2b Misaligned Walls (The double lines should be a single line)

Top down view of OMap

DETECTION OF MISALIGNMENT HOTSPOTS FOR HIGH DEFINITION MAPS FOR NAVIGATING AUTONOMOUS VEHICLES

CROSS-REFERENCE TO RELATED APPLICATION

This application claims the benefit of U.S. Provisional Application No. 62/441,080, filed Dec. 30, 2016, which is hereby incorporated by reference in its entirety.

BACKGROUND

This disclosure relates generally to maps for autonomous vehicles, and more particularly to performing alignment of three dimensional representation of data captured by autonomous vehicles to generate high definition maps for safe navigation of autonomous vehicles.

Autonomous vehicles, also known as self-driving cars, driverless cars, auto, or robotic cars, drive from a source location to a destination location without requiring a human driver to control and navigate the vehicle. Automation of driving is difficult due to several reasons. For example, autonomous vehicles use sensors to make driving decisions on the fly, but vehicle sensors cannot observe everything all the time. Vehicle sensors can be obscured by corners, rolling hills, and other vehicles. Vehicles sensors may not observe certain things early enough to make decisions. In addition, lanes and signs may be missing on the road or knocked over or hidden by bushes, and therefore not detectable by sensors. Furthermore, road signs for rights of way may not be readily visible for determining from where vehicles could be coming, or for swerving or moving out of a lane in an emergency or when there is a stopped obstacle that must be passed.

Autonomous vehicles can use map data to figure out some of the above information instead of relying on sensor data. However conventional maps have several drawbacks that make them difficult to use for an autonomous vehicle. For example maps do not provide the level of accuracy required for safe navigation (e.g., 10 cm or less). GNSS (Global Navigation Satellite System) based systems provide accuracies of approximately 3-5 meters, but have large error conditions resulting in an accuracy of over 100 m. This makes it challenging to accurately determine the location of the vehicle.

Furthermore, conventional maps are created by survey teams that use drivers with specially outfitted cars with high resolution sensors that drive around a geographic region and take measurements. The measurements are taken back and a team of map editors assembles the map from the measurements. This process is expensive and time consuming (e.g., taking possibly months to complete a map). Therefore, maps assembled using such techniques do not have fresh data. For example, roads are updated/modified on a frequent basis roughly 5-10% per year. But survey cars are expensive and limited in number, so cannot capture most of these updates. For example, a survey fleet may include a thousand cars. For even a single state in the United States, a thousand cars would not be able to keep the map up-to-date on a regular basis to allow safe self-driving. As a result, conventional techniques of maintaining maps are unable to provide the right data that is sufficiently accurate and up-to-date for safe navigation of autonomous vehicles.

SUMMARY

Embodiments receive sensor data from vehicles travelling along routes within a geographical region and combine the data to generate a high definition map. The high definition map is for use in driving vehicles, for example, for guiding autonomous vehicles.

The system combines sensor data received from vehicles to generate a three dimensional representation of the geographical region. An example three dimensional representation is a point cloud representation. The system identifies portions of the geographical region within the three dimensional representation that are misaligned as a result of combining the data. The misaligned portions are further analyzed, for example, to verify the accuracy of the data.

In one embodiment, the system identifies a surface from the three dimensional representation of the geographical region and determines a measure of thickness of the surface. An example of a surface is the ground or a wall. For example, if a cluster of points represents a portion of the surface, the system analyzes the thickness of the space occupied by the cluster of points. The system determines a measure of likelihood of misalignment of the portion of the surface as a value proportionate to the measure of thickness.

In an embodiment, the system determines a normal vector pointing in a direction normal to the identified surface. The system selects a point on the surface and identifies a cluster of points related to the selected point in the three dimensional representation along the normal direction and a direction opposite the normal direction. The system determines a maximum distance between the points in the cluster as the measure of thickness of the surface.

In an embodiment, the system configures a user interface that displays the measure of likelihood of misalignment of the identified surface within the geographical region. An example user interface configured is a heat map. The system sends the user interface for presentation via a client device. The system may further receive modifications to the high definition map being generated responsive to sending the user interface for presentation.

BRIEF DESCRIPTION OF THE DRAWINGS

FIG. 21 shows a process for distributed optimization of a pose graph, according to an embodiment.

Figure 1:
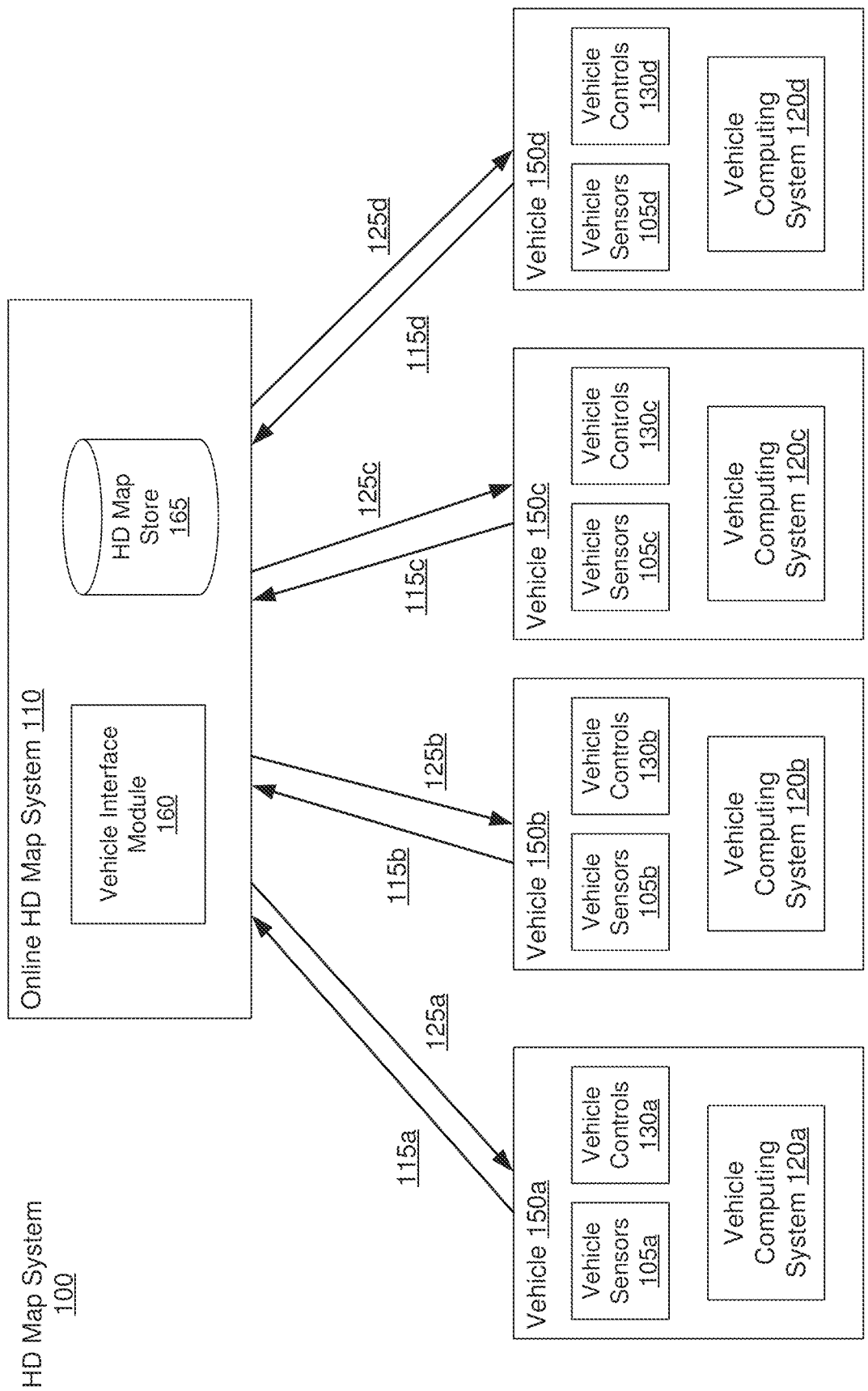
FIG. 1 shows the overall system environment of an HD map system interacting with multiple vehicle computing systems, according to an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Embodiments of the invention maintain high definition (HD) maps containing up to date information using high precision. The HD maps may be used by autonomous vehicles to safely navigate to their destinations without human input or with limited human input. An autonomous vehicle is a vehicle capable of sensing its environment and navigating without human input. Autonomous vehicles may also be referred to herein as "driverless car," "self-driving car," or "robotic car." An HD map refers to a map storing data with very high precision, typically 5-10 cm. Embodiments generate HD maps containing spatial geometric information about the roads on which an autonomous vehicle can travel. Accordingly, the generated HD maps include the information necessary for an autonomous vehicle navigating safely without human intervention. Instead of collecting data for the HD maps using an expensive and time consuming mapping fleet process including vehicles outfitted with high resolution sensors, embodiments of the invention use data from the lower resolution sensors of the self-driving vehicles themselves as they drive around through their environments. The vehicles may have no prior map data for these routes or even for the region. Embodiments of the invention provide location as a service (LaaS) such that autonomous vehicles of different manufacturers can each have access to the most up-to-date map information created via these embodiments of invention.

Embodiments generate and maintain high definition (HD) maps that are accurate and include the most updated road conditions for safe navigation. For example, the HD maps provide the current location of the autonomous vehicle relative to the lanes of the road precisely enough to allow the autonomous vehicle to drive safely in the lane.

HD maps store a very large amount of information, and therefore face challenges in managing the information. For example, an HD map for a large geographic region may not fit on the local storage of a vehicle. Embodiments of the invention provide the necessary portion of an HD map to an autonomous vehicle that allows the vehicle to determine its current location in the HD map, determine the features on the road relative to the vehicle's position, determine if it is safe to move the vehicle based on physical constraints and legal constraints, etc. Examples of physical constraints include physical obstacles, such as walls, and examples of legal constraints include legally allowed direction of travel for a lane, speed limits, yields, stops.

Embodiments of the invention allow safe navigation for an autonomous vehicle by providing low latency, for example, 10-20 milliseconds or less for providing a response to a request; high accuracy in terms of location, i.e., accuracy within 10 cm or less; freshness of data by ensuring that the map is updated to reflect changes on the road within a reasonable time frame; and storage efficiency by minimizing the storage needed for the HD Map.

FIG. 1 shows the overall system environment of an HD map system interacting with multiple vehicles, according to an embodiment. The HD map system 100 includes an online HD map system 110 that interacts with a plurality of vehicles 150. The vehicles 150 may be autonomous vehicles but are not required to be. The online HD map system 110 receives sensor data captured by sensors of the vehicles, and combines the data received from the vehicles 150 to generate and maintain HD maps. The online HD map system 110 sends HD map data to the vehicles for use in driving the vehicles. In an embodiment, the online HD map system 110 is implemented as a distributed computing system, for example, a cloud based service that allows clients such as vehicle computing systems 120 to make requests for information and services. For example, a vehicle computing system 120 may make a request for HD map data for driving along a route and the online HD map system 110 provides the requested HD map data.

FIG. 1 and the other figures use like reference numerals to identify like elements. A letter after a reference numeral, such as "105A," indicates that the text refers specifically to the element having that particular reference numeral. A reference numeral in the text without a following letter, such as "105," refers to any or all of the elements in the figures bearing that reference numeral (e.g. "105" in the text refers to reference numerals "105A" and/or "105N" in the figures).

Figure 4:
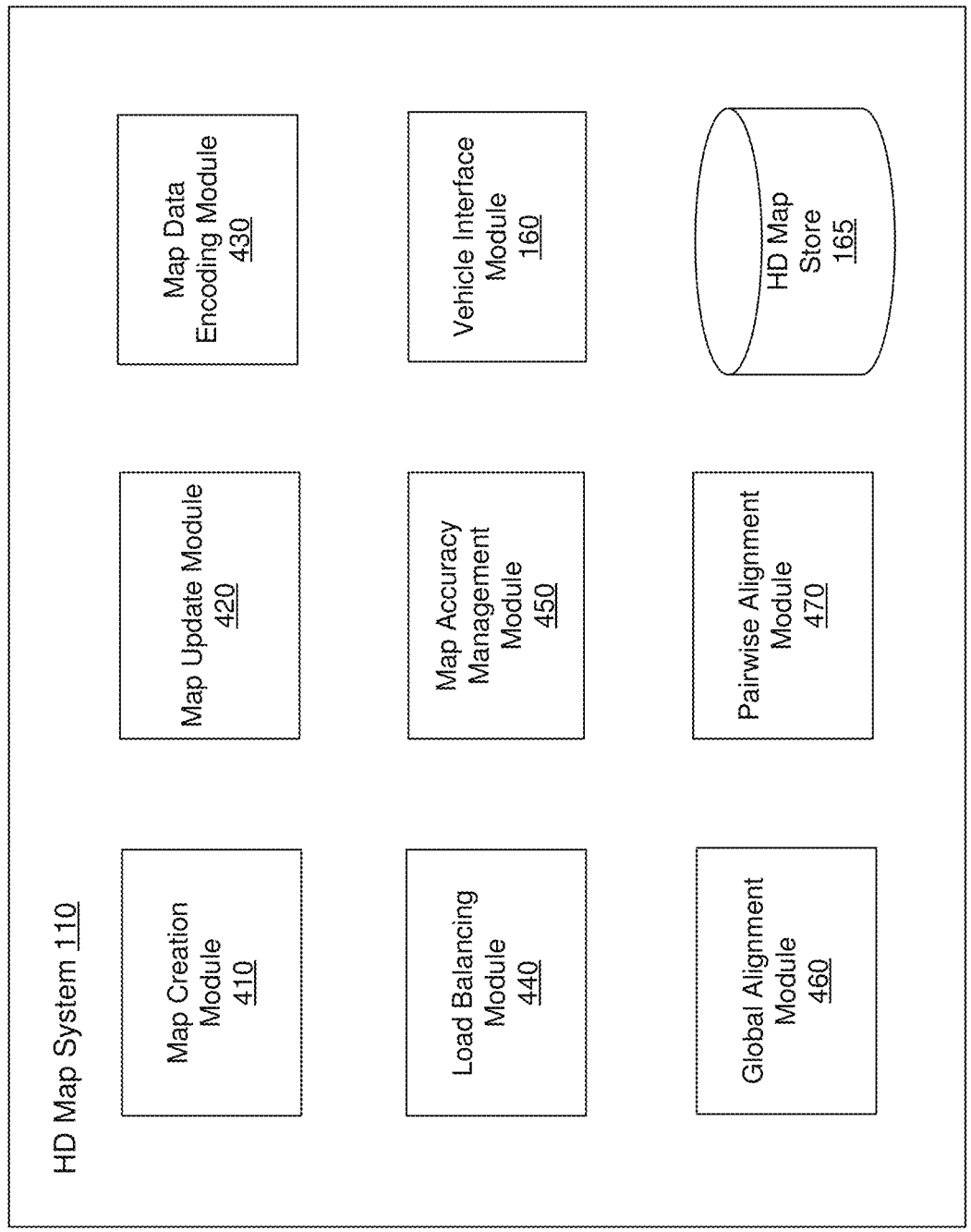
FIG. 4 shows the system architecture of an HD map system, according to an embodiment.

The online HD map system 110 comprises a vehicle interface module 160 and an HD map store 165. The online HD map system 110 interacts with the vehicle computing system 120 of various vehicles 150 using the vehicle interface module 160. The online HD map system 110 stores map information for various geographical regions in the HD map store 165. The online HD map system 110 may include other modules than those shown in FIG. 1, for example, various other modules as illustrated in FIG. 4 and further described herein.

The online HD map system 110 receives 115 data collected by sensors of a plurality of vehicles 150, for example, hundreds or thousands of cars. The vehicles provide sensor data captured while driving along various routes and send it to the online HD map system 110. The online HD map system 110 uses the data received from the vehicles 150 to create and update HD maps describing the regions in which the vehicles 150 are driving. The online HD map system 110 builds high definition maps based on the collective information received from the vehicles 150 and stores the HD map information in the HD map store 165.

The online HD map system 110 sends 125 HD maps to individual vehicles 150 as required by the vehicles 150. For example, if an autonomous vehicle needs to drive along a route, the vehicle computing system 120 of the autonomous vehicle provides information describing the route being traveled to the online HD map system 110. In response, the online HD map system 110 provides the required HD maps for driving along the route.

In an embodiment, the online HD map system 110 sends portions of the HD map data to the vehicles in a compressed format so that the data transmitted consumes less bandwidth. The online HD map system 110 receives from various vehicles, information describing the data that is stored at the local HD map store 275 of the vehicle. If the online HD map system 110 determines that the vehicle does not have certain portion of the HD map stored locally in the local HD map store 275, the online HD map system 110 sends that portion of the HD map to the vehicle. If the online HD map system 110 determines that the vehicle did previously receive that particular portion of the HD map but the corresponding data was updated by the online HD map system 110 since the vehicle last received the data, the online HD map system 110 sends an update for that portion of the HD map stored at the vehicle. This allows the online HD map system 110 to minimize the amount of data that is communicated with the vehicle and also to keep the HD map data stored locally in the vehicle updated on a regular basis.

A vehicle 150 includes vehicle sensors 105, vehicle controls 130, and a vehicle computing system 120. The vehicle sensors 105 allow the vehicle 150 to detect the surroundings of the vehicle as well as information describing the current state of the vehicle, for example, information describing the location and motion parameters of the vehicle. The vehicle sensors 105 comprise a camera, a light detection and ranging sensor (LIDAR), a GNSS navigation system, an inertial measurement unit (IMU), and others. The vehicle has one or more cameras that capture images of the surroundings of the vehicle. A LIDAR surveys the surroundings of the vehicle by measuring distance to a target by illuminating that target with a laser light pulses, and measuring the reflected pulses. The GNSS navigation system determines the position of the vehicle based on signals from satellites. An IMU is an electronic device that measures and reports motion data of the vehicle such as velocity, acceleration, direction of movement, speed, angular rate, and so on using a combination of accelerometers and gyroscopes or other measuring instruments.

The vehicle controls 130 control the physical movement of the vehicle, for example, acceleration, direction change, starting, stopping, and so on. The vehicle controls 130 include the machinery for controlling the accelerator, brakes, steering wheel, and so on. The vehicle computing system 120 continuously provides control signals to the vehicle controls 130, thereby causing an autonomous vehicle to drive along a selected route.

The vehicle computing system 120 performs various tasks including processing data collected by the sensors as well as map data received from the online HD map system 110. The vehicle computing system 120 also processes data for sending to the online HD map system 110. Details of the vehicle computing system are illustrated in FIG. 2 and further described in connection with FIG. 2.

The interactions between the vehicle computing systems 120 and the online HD map system 110 are typically performed via a network, for example, via the Internet. The network enables communications between the vehicle computing systems 120 and the online HD map system 110. In one embodiment, the network uses standard communications technologies and/or protocols. The data exchanged over the network can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
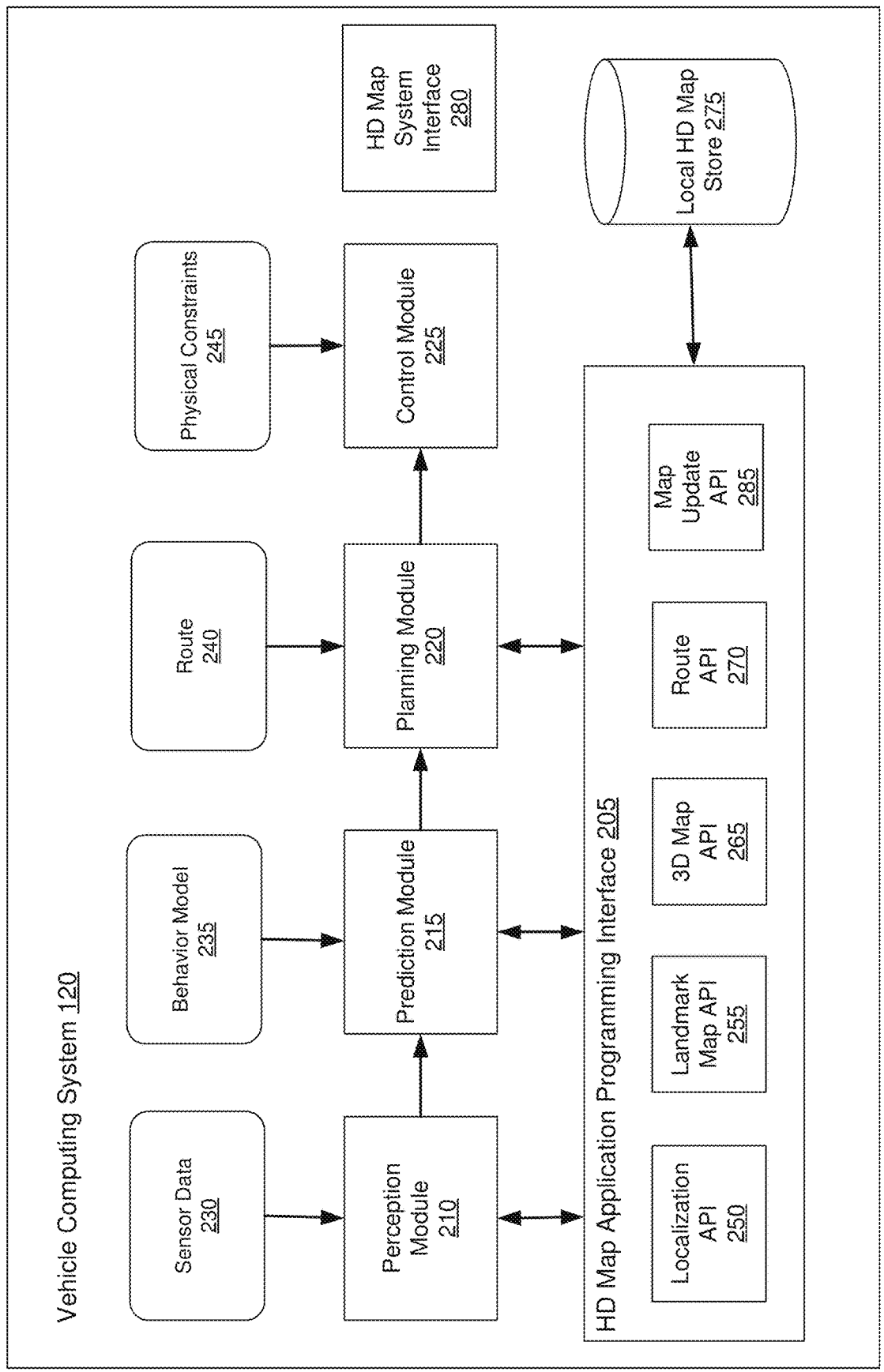
FIG. 2 shows the system architecture of a vehicle computing system, according to an embodiment.

FIG. 2 shows the system architecture of a vehicle computing system, according to an embodiment. The vehicle computing system 120 comprises a perception module 210, prediction module 215, planning module 220, a control module 225, a local HD map store 275, an HD map system interface 280, and an HD map application programming interface (API) 205. The various modules of the vehicle computing system 120 process various type of data including sensor data 230, a behavior model 235, routes 240, and physical constraints 245. In other embodiments, the vehicle computing system 120 may have more or fewer modules. Functionality described as being implemented by a particular module may be implemented by other modules.

The perception module 210 receives sensor data 230 from the sensors 105 of the vehicle 150. This includes data collected by cameras of the car, LIDAR, IMU, GNSS navigation system, and so on. The perception module 210 uses the sensor data to determine what objects are around the vehicle, the details of the road on which the vehicle is travelling, and so on. The perception module 210 processes the sensor data 230 to populate data structures storing the sensor data and provides the information to the prediction module 215.

The prediction module 215 interprets the data provided by the perception module using behavior models of the objects perceived to determine whether an object is moving or likely to move. For example, the prediction module 215 may determine that objects representing road signs are not likely to move, whereas objects identified as vehicles, people, and so on, are either moving or likely to move. The prediction module 215 uses the behavior models 235 of various types of objects to determine whether they are likely to move. The prediction module 215 provides the predictions of various objects to the planning module 200 to plan the subsequent actions that the vehicle needs to take next.

The planning module 200 receives the information describing the surroundings of the vehicle from the prediction module 215, the route 240 that determines the destination of the vehicle, and the path that the vehicle should take to get to the destination. The planning module 200 uses the information from the prediction module 215 and the route 240 to plan a sequence of actions that the vehicle needs to take within a short time interval, for example, within the next few seconds. In an embodiment, the planning module 200 specifies the sequence of actions as one or more points representing nearby locations that the vehicle needs to drive through next. The planning module 200 provides the details of the plan comprising the sequence of actions to be taken by the vehicle to the control module 225. The plan may determine the subsequent action of the vehicle, for example, whether the vehicle performs a lane change, a turn, acceleration by increasing the speed or slowing down, and so on.

The control module 225 determines the control signals for sending to the controls 130 of the vehicle based on the plan received from the planning module 200. For example, if the vehicle is currently at point A and the plan specifies that the vehicle should next go to a nearby point B, the control module 225 determines the control signals for the controls 130 that would cause the vehicle to go from point A to point B in a safe and smooth way, for example, without taking any sharp turns or a zig zag path from point A to point B. The path taken by the vehicle to go from point A to point B may depend on the current speed and direction of the vehicle as well as the location of point B with respect to point A. For example, if the current speed of the vehicle is high, the vehicle may take a wider turn compared to a vehicle driving slowly.

The control module 225 also receives physical constraints 245 as input. These include the physical capabilities of that specific vehicle. For example, a car having a particular make and model may be able to safely make certain types of vehicle movements such as acceleration, and turns that another car with a different make and model may not be able to make safely. The control module 225 incorporates these physical constraints in determining the control signals. The control module 225 sends the control signals to the vehicle controls 130 that cause the vehicle to execute the specified sequence of actions causing the vehicle to move as planned. The above steps are constantly repeated every few seconds causing the vehicle to drive safely along the route that was planned for the vehicle.

The various modules of the vehicle computing system 120 including the perception module 210, prediction module 215, and planning module 220 receive map information to perform their respective computation. The vehicle 100 stores the HD map data in the local HD map store 275. The modules of the vehicle computing system 120 interact with the map data using the HD map API 205 that provides a set of application programming interfaces (APIs) that can be invoked by a module for accessing the map information. The HD map system interface 280 allows the vehicle computing system 120 to interact with the online HD map system 110 via a network (not shown in the Figures). The local HD map store 275 stores map data in a format specified by the HD Map system 110. The HD map API 205 is capable of processing the map data format as provided by the HD Map system 110. The HD Map API 205 provides the vehicle computing system 120 with an interface for interacting with the HD map data. The HD map API 205 includes several APIs including the localization API 250, the landmark map API 255, the route API 265, the 3D map API 270, the map update API 285, and so on.

The localization APIs 250 determine the current location of the vehicle, for example, when the vehicle starts and as the vehicle moves along a route. The localization APIs 250 include a localize API that determines an accurate location of the vehicle within the HD Map. The vehicle computing system 120 can use the location as an accurate relative positioning for making other queries, for example, feature queries, navigable space queries, and occupancy map queries further described herein. The localize API receives inputs comprising one or more of, location provided by GNSS, vehicle motion data provided by IMU, LIDAR scanner data, and camera images. The localize API returns an accurate location of the vehicle as latitude and longitude coordinates. The coordinates returned by the localize API are more accurate compared to the GNSS coordinates used as input, for example, the output of the localize API may have precision range from 5-10 cm. In one embodiment, the vehicle computing system 120 invokes the localize API to determine location of the vehicle periodically based on the LIDAR using scanner data, for example, at a frequency of 10 Hz. The vehicle computing system 120 may invoke the localize API to determine the vehicle location at a higher rate (e.g., 60 Hz) if GNSS/IMU data is available at that rate. The vehicle computing system 120 stores as internal state, location history records to improve accuracy of subsequent localize calls. The location history record stores history of location from the point-in-time, when the car was turned off/stopped. The localization APIs 250 include a localize-route API generates an accurate route specifying lanes based on the HD map. The localize-route API takes as input a route from a source to destination via a third party maps and generates a high precision routes represented as a connected graph of navigable lanes along the input routes based on HD maps.

The landmark map API 255 provides the geometric and semantic description of the world around the vehicle, for example, description of various portions of lanes that the vehicle is currently travelling on. The landmark map APIs 255 comprise APIs that allow queries based on landmark maps, for example, fetch-lanes API and fetch-features API.

The fetch-lanes API provide lane information relative to the vehicle and the fetch-features API. The fetch-lanes API receives as input a location, for example, the location of the vehicle specified using latitude and longitude of the vehicle and returns lane information relative to the input location. The fetch-lanes API may specify a distance parameters indicating the distance relative to the input location for which the lane information is retrieved. The fetch-features API receives information identifying one or more lane elements and returns landmark features relative to the specified lane elements. The landmark features include, for each landmark, a spatial description that is specific to the type of landmark.

The 3D map API 265 provides efficient access to the spatial 3-dimensional (3D) representation of the road and various physical objects around the road as stored in the local HD map store 275. The 3D map APIs 365 include a fetch-navigable-surfaces API and a fetch-occupancy-grid API. The fetch-navigable-surfaces API receives as input, identifiers for one or more lane elements and returns navigable boundaries for the specified lane elements. The fetch-occupancy-grid API receives a location as input, for example, a latitude and longitude of the vehicle, and returns information describing occupancy for the surface of the road and all objects available in the HD map near the location. The information describing occupancy includes a hierarchical volumetric grid of all positions considered occupied in the map. The occupancy grid includes information at a high resolution near the navigable areas, for example, at curbs and bumps, and relatively low resolution in less significant areas, for example, trees and walls beyond a curb. The fetch-occupancy-grid API is useful for detecting obstacles and for changing direction if necessary.

The 3D map APIs also include map update APIs, for example, download-map-updates API and upload-map-updates API. The download-map-updates API receives as input a planned route identifier and downloads map updates for data relevant to all planned routes or for a specific planned route. The upload-map-updates API uploads data collected by the vehicle computing system 120 to the online HD map system 110. This allows the online HD map system 110 to keep the HD map data stored in the online HD map system 110 up to date based on changes in map data observed by sensors of vehicles driving along various routes.

The route API 270 returns route information including full route between a source and destination and portions of route as the vehicle travels along the route. The 3D map API 365 allows querying the HD Map. The route APIs 270 include add-planned-routes API and get-planned-route API. The add-planned-routes API provides information describing planned routes to the online HD map system 110 so that information describing relevant HD maps can be downloaded by the vehicle computing system 120 and kept up to date. The add-planned-routes API receives as input, a route specified using polylines expressed in terms of latitudes and longitudes and also a time-to-live (TTL) parameter specifying a time period after which the route data can be deleted. Accordingly, the add-planned-routes API allows the vehicle to indicate the route the vehicle is planning on taking in the near future as an autonomous trip. The add-planned-route API aligns the route to the HD map, records the route and its TTL value, and makes sure that the HD map data for the route stored in the vehicle computing system 120 is up to date. The get-planned-routes API returns a list of planned routes and provides information describing a route identified by a route identifier.

The map update API 285 manages operations related to update of map data, both for the local HD map store 275 and for the HD map store 165 stored in the online HD map system 110. Accordingly, modules in the vehicle computing system 120 invoke the map update API 285 for downloading data from the online HD map system 110 to the vehicle computing system 120 for storing in the local HD map store 275 as necessary. The map update API 285 also allows the vehicle computing system 120 to determine whether the information monitored by the vehicle sensors 105 indicates a discrepancy in the map information provided by the online HD map system 110 and uploads data to the online HD map system 110 that may result in the online HD map system 110 updating the map data stored in the HD map store 165 that is provided to other vehicles 150.

FIG. 4 illustrates the various layers of instructions in the HD Map API of a vehicle computing system, according to an embodiment. Different manufacturer of vehicles have different instructions for receiving information from vehicle sensors 105 and for controlling the vehicle controls 130. Furthermore, different vendors provide different compute platforms with autonomous driving capabilities, for example, collection and analysis of vehicle sensor data. Examples of compute platform for autonomous vehicles include platforms provided vendors, such as NVIDIA, QUALCOMM, and INTEL. These platforms provide functionality for use by autonomous vehicle manufacturers in manufacture of autonomous vehicles. A vehicle manufacturer can use any one or several compute platforms for autonomous vehicles. The online HD map system 110 provides a library for processing HD maps based on instructions specific to the manufacturer of the vehicle and instructions specific to a vendor specific platform of the vehicle. The library provides access to the HD map data and allows the vehicle to interact with the online HD map system 110.

Figure 3:
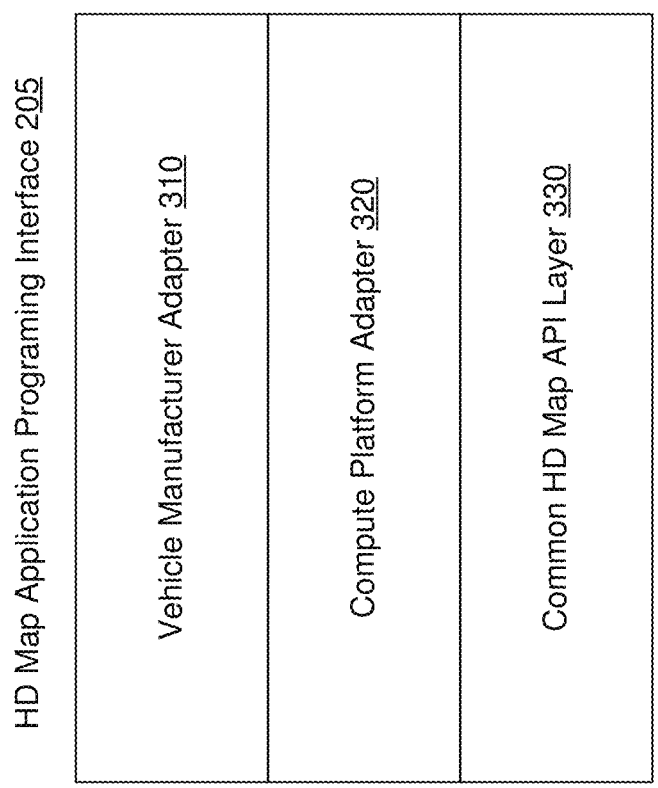
FIG. 3 illustrates the various layers of instructions in the HD Map API of a vehicle computing system, according to an embodiment.

As shown in FIG. 3, in an embodiment, the HD map API is implemented as a library that includes a vehicle manufacturer adapter 310, a compute platform adapter 320, and a common HD map API layer 330. The common HD map API layer comprises generic instructions that can be used across a plurality of vehicle compute platforms and vehicle manufacturers. The compute platform adapter 320 include instructions that are specific to each computer platform. For example, the common HD Map API layer 330 may invoke the compute platform adapter 320 to receive data from sensors supported by a specific compute platform. The vehicle manufacturer adapter 310 comprises instructions specific to a vehicle manufacturer. For example, the common HD map API layer 330 may invoke functionality provided by the vehicle manufacturer adapter 310 to send specific control instructions to the vehicle controls 130.

The online HD map system 110 stores compute platform adapters 320 for a plurality of compute platforms and vehicle manufacturer adapters 310 for a plurality of vehicle manufacturers. The online HD map system 110 determines the particular vehicle manufacturer and the particular compute platform for a specific autonomous vehicle. The online HD map system 110 selects the vehicle manufacturer adapter 310 for the particular vehicle manufacturer and the compute platform adapter 320 the particular compute platform of that specific vehicle. The online HD map system 110 sends instructions of the selected vehicle manufacturer adapter 310 and the selected compute platform adapter 320 to the vehicle computing system 120 of that specific autonomous vehicle. The vehicle computing system 120 of that specific autonomous vehicle installs the received vehicle manufacturer adapter 310 and the compute platform adapter 320. The vehicle computing system 120 periodically checks if the online HD map system 110 has an update to the installed vehicle manufacturer adapter 310 and the compute platform adapter 320. If a more recent update is available compared to the version installed on the vehicle, the vehicle computing system 120 requests and receives the latest update and installs it.

HD Map System Architecture

FIG. 4 shows the system architecture of an HD map system, according to an embodiment. The online HD map system 110 comprises a map creation module 410, a map update module 420, a map data encoding module 430, a load balancing module 440, a map accuracy management module, a vehicle interface module, and a HD map store 165. Other embodiments of online HD map system 110 may include more or fewer modules than shown in FIG. 4. Functionality indicated as being performed by a particular module may be implemented by other modules. In an embodiment, the online HD map system 110 may be a distributed system comprising a plurality of processors.

The map creation module 410 creates the map from map data collected from several vehicles that are driving along various routes. The map update module 420 updates previously computed map data by receiving more recent information from vehicles that recently traveled along routes on which map information changed. For example, if certain road signs have changed or lane information has changed as a result of construction in a region, the map update module 420 updates the maps accordingly. The map data encoding module 430 encodes map data to be able to store the data efficiently as well as send the required map data to vehicles 150 efficiently. The load balancing module 440 balances load across vehicles to ensure that requests to receive data from vehicles are uniformly distributed across different vehicles. The map accuracy management module 450 maintains high accuracy of the map data using various techniques even though the information received from individual vehicles may not have high accuracy.

Figure 5:
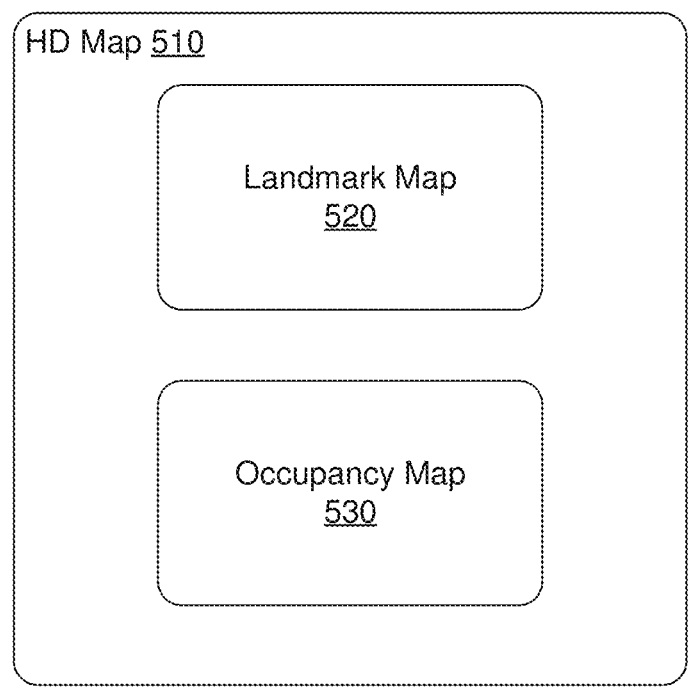
FIG. 5 illustrates the components of an HD map, according to an embodiment.

FIG. 5 illustrates the components of an HD map, according to an embodiment. The HD map comprises maps of several geographical regions. The HD map 510 of a geographical region comprises a landmark map (LMap) 520 and an occupancy map (OMap) 530. The landmark map comprises information describing lanes including spatial location of lanes and semantic information about each lane. The spatial location of a lane comprises the geometric location in latitude, longitude and elevation at high prevision, for example, at or below 10 cm precision. The semantic information of a lane comprises restrictions such as direction, speed, type of lane (for example, a lane for going straight, a left turn lane, a right turn lane, an exit lane, and the like), restriction on crossing to the left, connectivity to other lanes and so on. The landmark map may further comprise information describing stop lines, yield lines, spatial location of crosswalks, safely navigable space, spatial location of speed bumps, curb, and road signs comprising spatial location and type of all signage that is relevant to driving restrictions. Examples of road signs described in an HD map include stop signs, traffic lights, speed limits, one-way, do-not-enter, yield (vehicle, pedestrian, animal), and so on.

The occupancy map 530 comprises spatial 3-dimensional (3D) representation of the road and all physical objects around the road. The data stored in an occupancy map 530 is also referred to herein as occupancy grid data. The 3D representation may be associated with a confidence score indicative of a likelihood of the object existing at the location. The occupancy map 530 may be represented in a number of other ways. In one embodiment, the occupancy map 530 is represented as a 3D mesh geometry (collection of triangles) which covers the surfaces. In another embodiment, the occupancy map 530 is represented as a collection of 3D points which cover the surfaces. In another embodiment, the occupancy map 530 is represented using a 3D volumetric grid of cells at 5-10 cm resolution. Each cell indicates whether or not a surface exists at that cell, and if the surface exists, a direction along which the surface is oriented.

The occupancy map 530 may take a large amount of storage space compared to a landmark map 520. For example, data of 1 GB/Mile may be used by an occupancy map 530, resulting in the map of the United States (including 4 million miles of road) occupying $4 \times 10^{15}$ bytes or 4 petabytes. Therefore the online HD map system 110 and the vehicle computing system 120 use data compression techniques for being able to store and transfer map data thereby reducing storage and transmission costs. Accordingly, the techniques disclosed herein make self-driving of autonomous vehicles possible.

In one embodiment, the HD Map does not require or rely on data typically included in maps, such as addresses, road names, ability to geo-code an address, and ability to compute routes between place names or addresses. The vehicle computing system 120 or the online HD map system 110 accesses other map systems, for example, GOOGLE MAPs to obtain this information. Accordingly, a vehicle computing system 120 or the online HD map system 110 receives navigation instructions from a tool such as GOOGLE MAPs into a route and converts the information to a route based on the HD map information.

Geographical Regions in HD Maps

The online HD map system 110 divides a large physical area into geographical regions and stores a representation of each geographical region. Each geographical region represents a contiguous area bounded by a geometric shape, for example, a rectangle or square. In an embodiment, the online HD map system 110 divides a physical area into geographical regions of the same size independent of the amount of data required to store the representation of each geographical region. In another embodiment, the online HD map system 110 divides a physical area into geographical regions of different sizes, where the size of each geographical region is determined based on the amount of information needed for representing the geographical region. For example, a geographical region representing a densely populated area with a large number of streets represents a smaller physical area compared to a geographical region representing sparsely populated area with very few streets. Accordingly, in this embodiment, the online HD map system 110 determines the size of a geographical region based on an estimate of an amount of information required to store the various elements of the physical area relevant for an HD map.

In an embodiment, the online HD map system 110 represents a geographic region using an object or a data record that comprises various attributes including, a unique identifier for the geographical region, a unique name for the geographical region, description of the boundary of the geographical region, for example, using a bounding box of latitude and longitude coordinates, and a collection of landmark features and occupancy grid data.

Figure 6A:
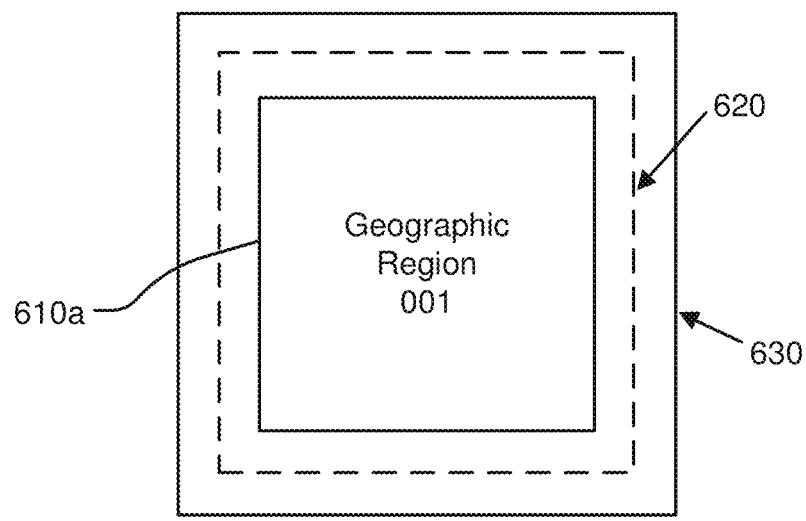
FIGS. 6A-B illustrate geographical regions defined in an HD map, according to an embodiment.
Figure 6B:
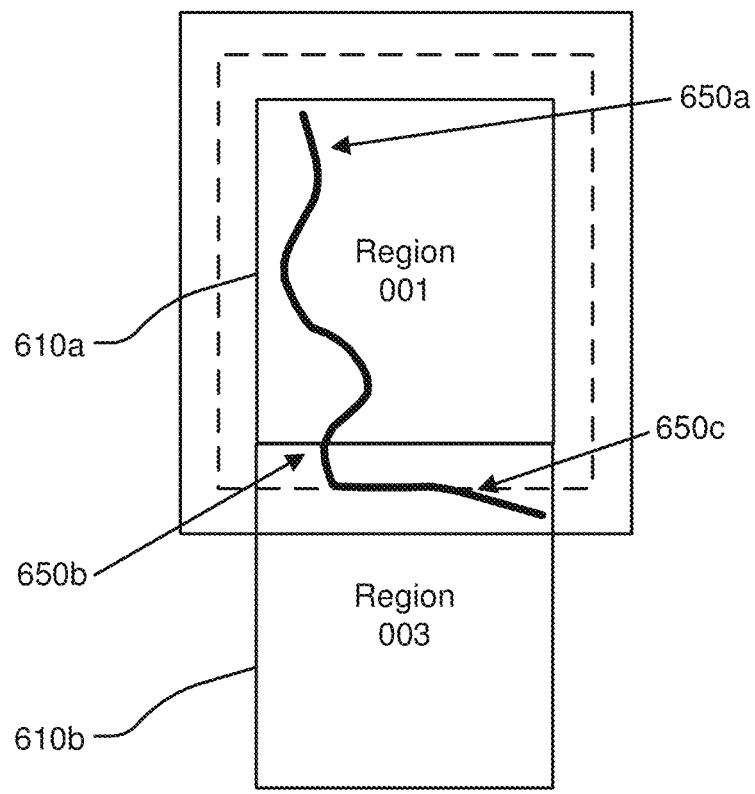

FIGS. 6A-B illustrate geographical regions defined in an HD map, according to an embodiment. FIG. 6A shows a square geographical region 610a. FIG. 6B shows two neighboring geographical regions 610a and 610b. The online HD map system 110 stores data in a representation of a geographical region that allows for smooth transition from one geographical region to another as a vehicle drives across geographical region boundaries.

According to an embodiment, as illustrated in FIG. 6, each geographic region has a buffer of a predetermined width around it. The buffer comprises redundant map data around all 4 sides of a geographic region (in the case that the geographic region is bounded by a rectangle). FIG. 6A shows a boundary 620 for a buffer of 50 meters around the geographic region 610a and a boundary 630 for buffer of 100 meters around the geographic region 610a. The vehicle computing system 120 switches the current geographical region of a vehicle from one geographical region to the neighboring geographical region when the vehicle crosses a threshold distance within this buffer. For example, as shown in FIG. 6B, a vehicle starts at location 650a in the geographical region 610a. The vehicle traverses along a route to reach a location 650b where it cross the boundary of the geographical region 610 but stays within the boundary 620 of the buffer. Accordingly, the vehicle computing system 120 continues to use the geographical region 610a as the current geographical region of the vehicle. Once the vehicle crosses the boundary 620 of the buffer at location 650c, the vehicle computing system 120 switches the current geographical region of the vehicle to geographical region 610b from 610a. The use of a buffer prevents rapid switching of the current geographical region of a vehicle as a result of the vehicle travelling along a route that closely tracks a boundary of a geographical region.

Lane Representations in HD Maps

The HD map system 100 represents lane information of streets in HD maps. Although the embodiments described herein refer to streets, the techniques are applicable to highways, alleys, avenues, boulevards, or any other path on which vehicles can travel. The HD map system 100 uses lanes as a reference frame for purposes of routing and for localization of a vehicle. The lanes represented by the HD map system 100 include lanes that are explicitly marked, for example, white and yellow striped lanes, lanes that are implicit, for example, on a country road with no lines or curbs but two directions of travel, and implicit paths that act as lanes, for example, the path that a turning car makes when entering a lane from another lane. The HD map system 100 also stores information relative to lanes, for example, landmark features such as road signs and traffic lights relative to the lanes, occupancy grids relative to the lanes for obstacle detection, and navigable spaces relative to the lanes so the vehicle can efficiently plan/react in emergencies when the vehicle must make an unplanned move out of the lane. Accordingly, the HD map system 100 stores a representation of a network of lanes to allow a vehicle to plan a legal path between a source and a destination and to add a frame of reference for real time sensing and control of the vehicle. The HD map system 100 stores information and provides APIs that allow a vehicle to determine the lane that the vehicle is currently in, the precise vehicle location relative to the lane geometry, and all relevant features/data relative to the lane and adjoining and connected lanes.

Figure 7:
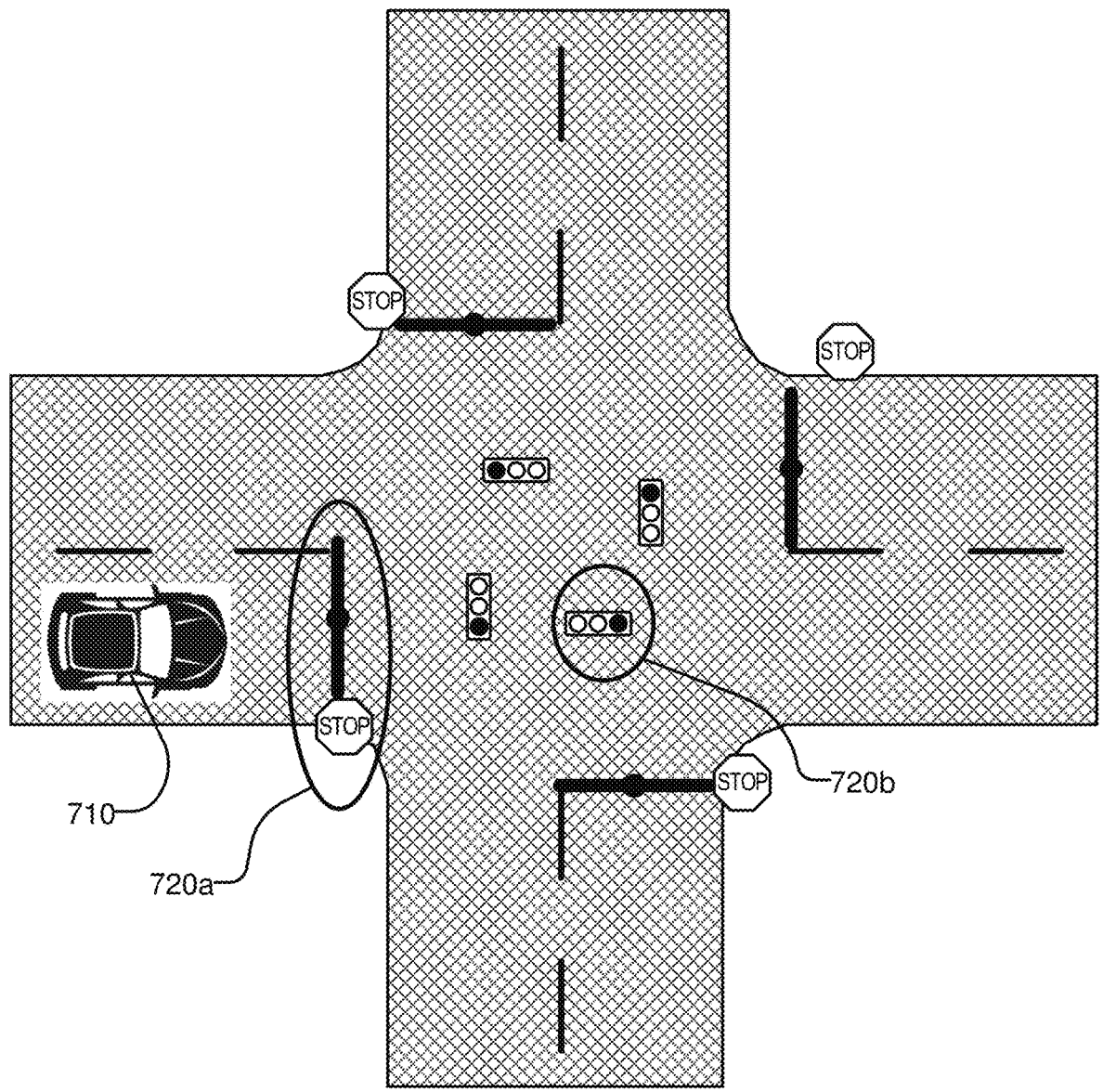
FIG. 7 illustrates representations of lanes in an HD map, according to an embodiment.

FIG. 7 illustrates lane representations in an HD map, according to an embodiment. FIG. 7 shows a vehicle 710 at a traffic intersection. The HD map system provides the vehicle with access to the map data that is relevant for autonomous driving of the vehicle. This includes, for example, features 720a and 720b that are associated with the lane but may not be the closest features to the vehicle. Therefore, the HD map system 100 stores a lane-centric representation of data that represents the relationship of the lane to the feature so that the vehicle can efficiently extract the features given a lane.

The HD map system 100 represents portions of the lanes as lane elements. A lane element specifies the boundaries of the lane and various constraints including the legal direction in which a vehicle can travel within the lane element, the speed with which the vehicle can drive within the lane element, whether the lane element is for left turn only, or right turn only, and so on. The HD map system 100 represents a lane element as a continuous geometric portion of a single vehicle lane. The HD map system 100 stores objects or data structures representing lane elements that comprise information representing geometric boundaries of the lanes; driving direction along the lane; vehicle restriction for driving in the lane, for example, speed limit, relationships with connecting lanes including incoming and outgoing lanes; a termination restriction, for example, whether the lane ends at a stop line, a yield sign, or a speed bump; and relationships with road features that are relevant for autonomous driving, for example, traffic light locations, road sign locations and so on.

Examples of lane elements represented by the HD map system 100 include, a piece of a right lane on a freeway, a piece of a lane on a road, a left turn lane, the turn from a left turn lane into another lane, a merge lane from an on-ramp an exit lane on an off-ramp, and a driveway. The HD map system 100 represents a one lane road using two lane elements, one for each direction. The HD map system 100 represents median turn lanes that are shared similar to a one-lane road.

Figure 8A:
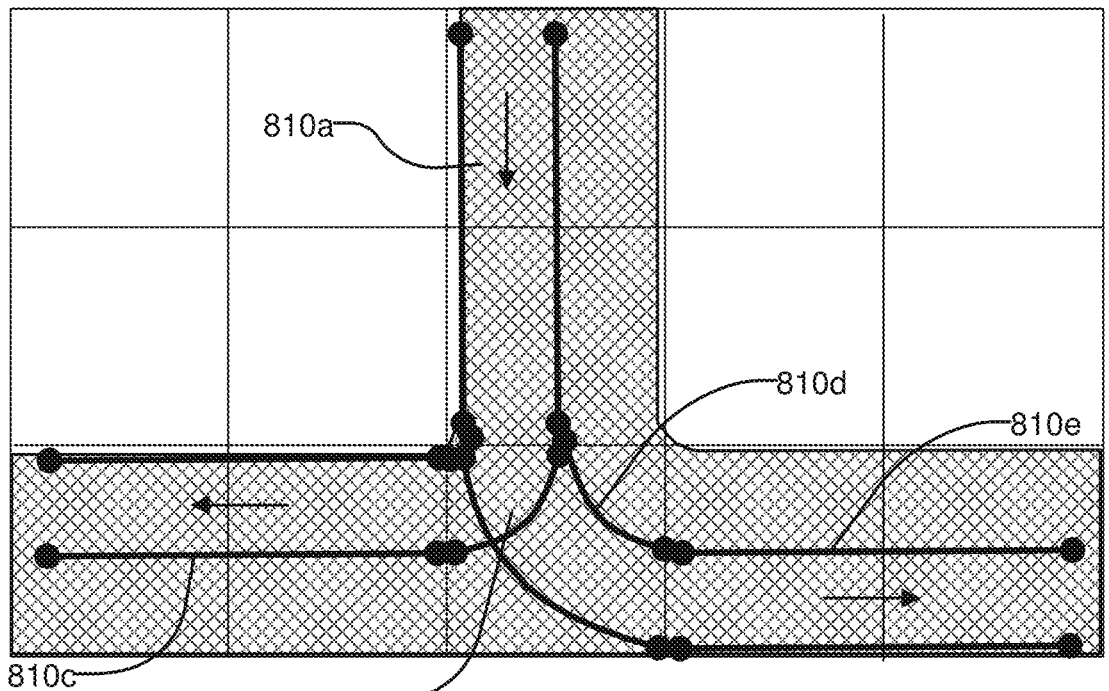
FIGS. 8A-B illustrates lane elements and relations between lane elements in an HD map, according to an embodiment.
Figure 8B:
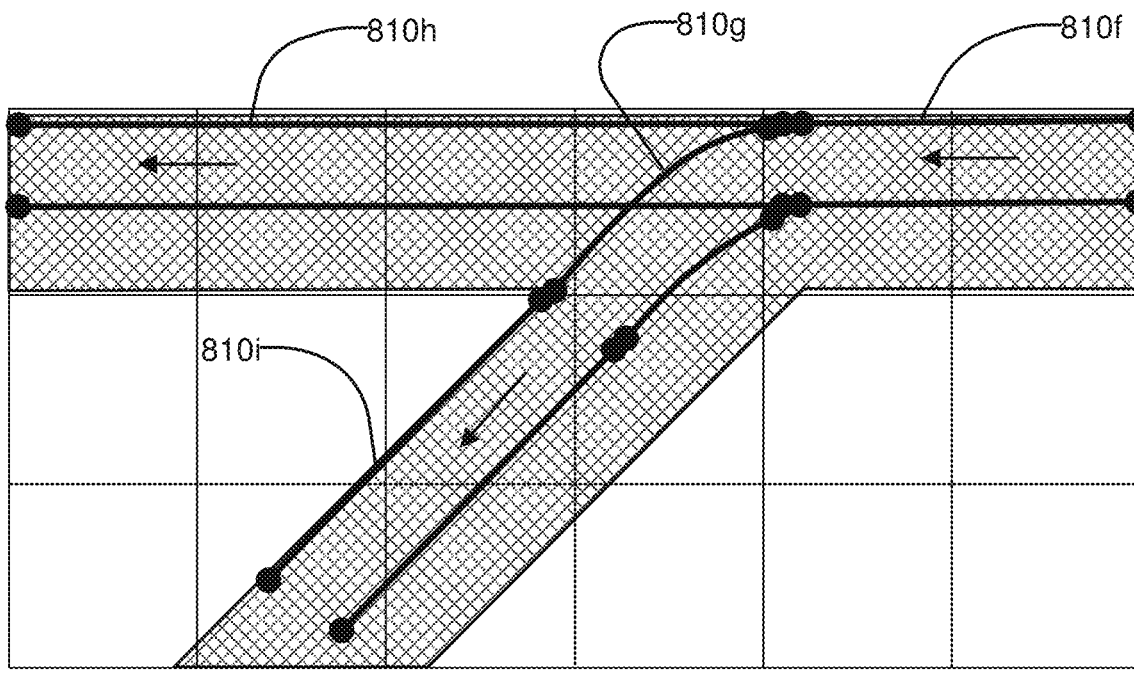

FIGS. 8A-B illustrates lane elements and relations between lane elements in an HD map, according to an embodiment. FIG. 8A shows an example of a T junction in a road illustrating a lane element 810a that is connected to lane element 810c via a turn lane 810b and is connected to lane 810e via a turn lane 810d. FIG. 8B shows an example of a Y junction in a road showing label 810f connected to lane 810h directly and connected to lane 810i via lane 810g. The HD map system 100 determines a route from a source location to a destination location as a sequence of connected lane elements that can be traversed to reach from the source location to the destination location.

Coordinate Systems

Figure 9A:
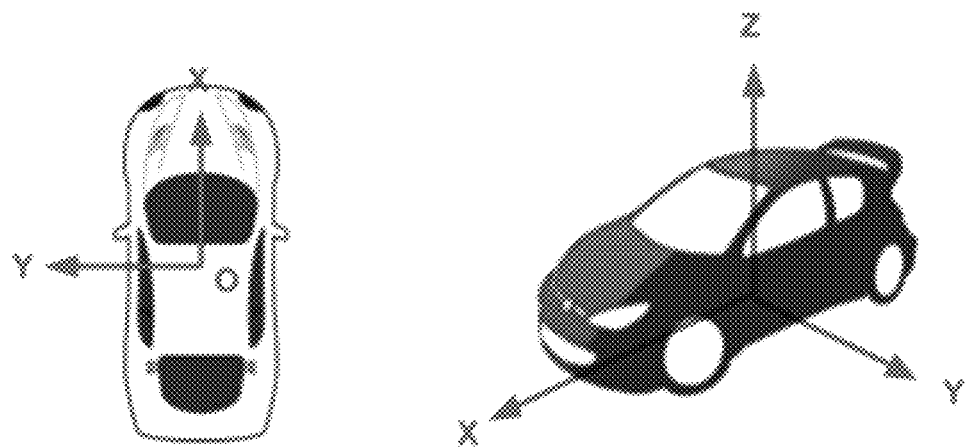
FIGS. 9A-B illustrate coordinate systems for use by the HD map system, according to an embodiment.
Figure 9B:
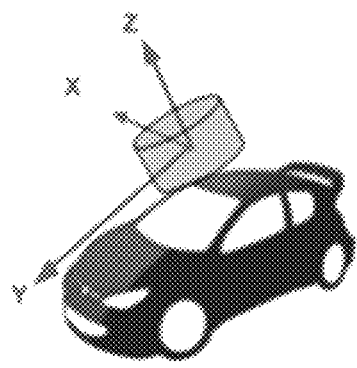

FIGS. 9A-B illustrate coordinate systems for use by the HD map system, according to an embodiment. Other embodiments can use other coordinate systems.

In an embodiment, the HD map system uses a vehicle coordinate system illustrated in FIG. 9A such that the positive direction of the X-axis is forward facing direction of the vehicle, the positive direction of the Y-axis is to the left of the vehicle when facing forward, and the positive direction of the Z-axis is upward. All axes represent distance, for example, using meters. The origin of the coordinate system is on the ground near center of car such that the z-coordinate value of the origin at the ground level, and x-coordinate and y-coordinate values are near center of the car. In an embodiment the X, Y coordinates of the original at the center of LIDAR sensor of the car.

In another embodiment, the HD map system uses a LIDAR coordinate system illustrated in FIG. 9B such that the positive direction of the X-axis is to the left of the vehicle when facing forward, the positive direction of the Y-axis is in the forward direction of the vehicle, and the positive direction of the Z-axis is upward. All axes represent distance, for example, using meters. The origin of the coordinate system is at the physical center of the puck device of the LIDAR.

During a calibration phase the HD map system determines the coordinate transform $T_{l2c}$ to map the LIDAR coordinate system to the vehicle coordinate system. For example, given a point $P_{lidar}$, the corresponding point in the vehicle $P_{car}$ may be obtained by performing the transformation $P_{car}=T_{l2c}*P_{lidar}$. The point representation $P_{car}$ is used for alignment and processing.

Point Cloud Unwinding

Figure 10:
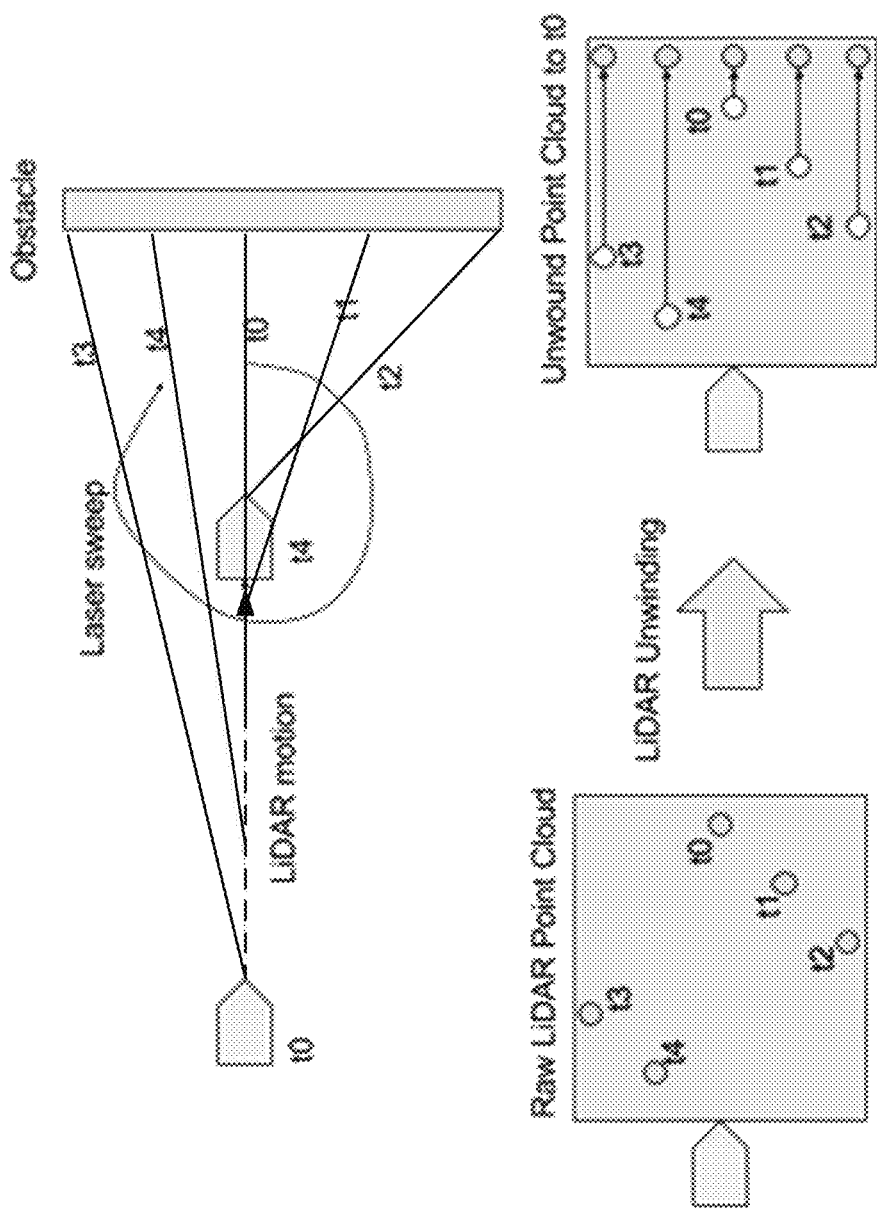
FIG. 10 illustrates the process of LIDAR point cloud unwinding by the HD map system, according to an embodiment.

FIG. 10 illustrates the process of LIDAR point cloud unwinding by the HD map system, according to an embodiment. The LiDAR is mounted on a moving vehicle. Accordingly, the LIDAR is moving while it takes a scan. For example, with 65 mile per hour traveling speed, a LIDAR sampling at 10 HZ can travel up to 3.5 m during each scan. The HD map system compensates for the motion of the LIDAR to transform the raw LIDAR scan data to a point cloud that is consistent with the real world.

To recover the true 3D point cloud of the surrounding environment relative to the LiDAR's location at a specific timestamp, the HD map system performs a process referred to as unwinding to compensate the LiDAR's motion during the course of scanning the environment.

Assume the motion the LiDAR moved during the scan as T. The LiDAR beams are identified via their row and column index in the range image. The HD map system derives the relative timing of each LiDAR beam relative to the starting time of the scan. The HD map system uses a linear motion interpolation to move each LiDAR beam according to its interpolated motion relative to the starting time. After adding this additional motion compensation to each LiDAR beam, the HD map system recovers the static world environment as an unwound point cloud.

According to different embodiments, there are different ways to estimate the LiDAR's relative motion (T), i.e., the unwinding transform, during the course of each scan. In one embodiment, the HD map system uses GNSS-IMU (global positioning system—inertial measurement unit) data for unwinding. In another embodiment, the HD map system runs a pairwise point cloud registration using raw, consecutive LiDAR point clouds. In another embodiment, the HD map system perform global alignment, and then computes the relative transform from the adjacent LiDAR poses.

Global Alignment

Given a collection of tracks (which includes GNSS-IMU and LiDAR data), the HD map system performs global alignment that fuses the GNSS-IMU and LiDAR data to compute globally consistent vehicle poses (location and orientation) for each LiDAR frame. With the global vehicle poses, the HD map system merges the LiDAR frames as a consistent, unified point cloud, from which a 3D HD map can be built.

Figure 11:
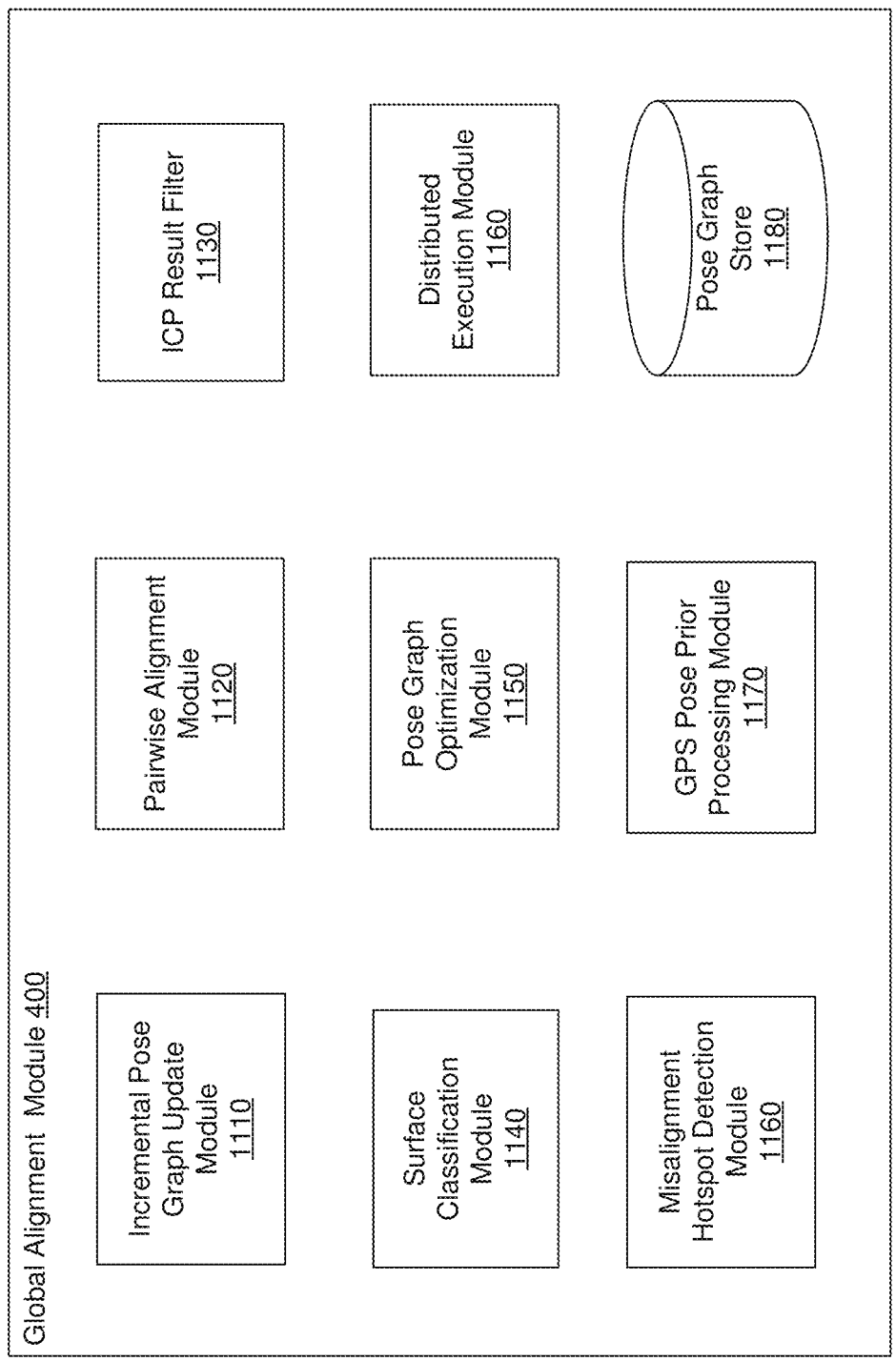
FIG. 11 shows the system architecture of the global alignment module, according to an embodiment.

FIG. 11 shows the system architecture of the global alignment module according to an embodiment. The global alignment module includes a pose graph update module 1110, a pairwise alignment module 1120, an ICP result filter module 1130, a surface classification module 1140, a pose graph optimization module 1150, a distributed execution module 1160, a misalignment hotspot detection modules 1160, a GNSS pose prior processing module 1170, and a pose graph store 1180. The functionality of each module is further described in connection with the various processes described herein.

Single Track Pairwise Alignment

Figure 12A:
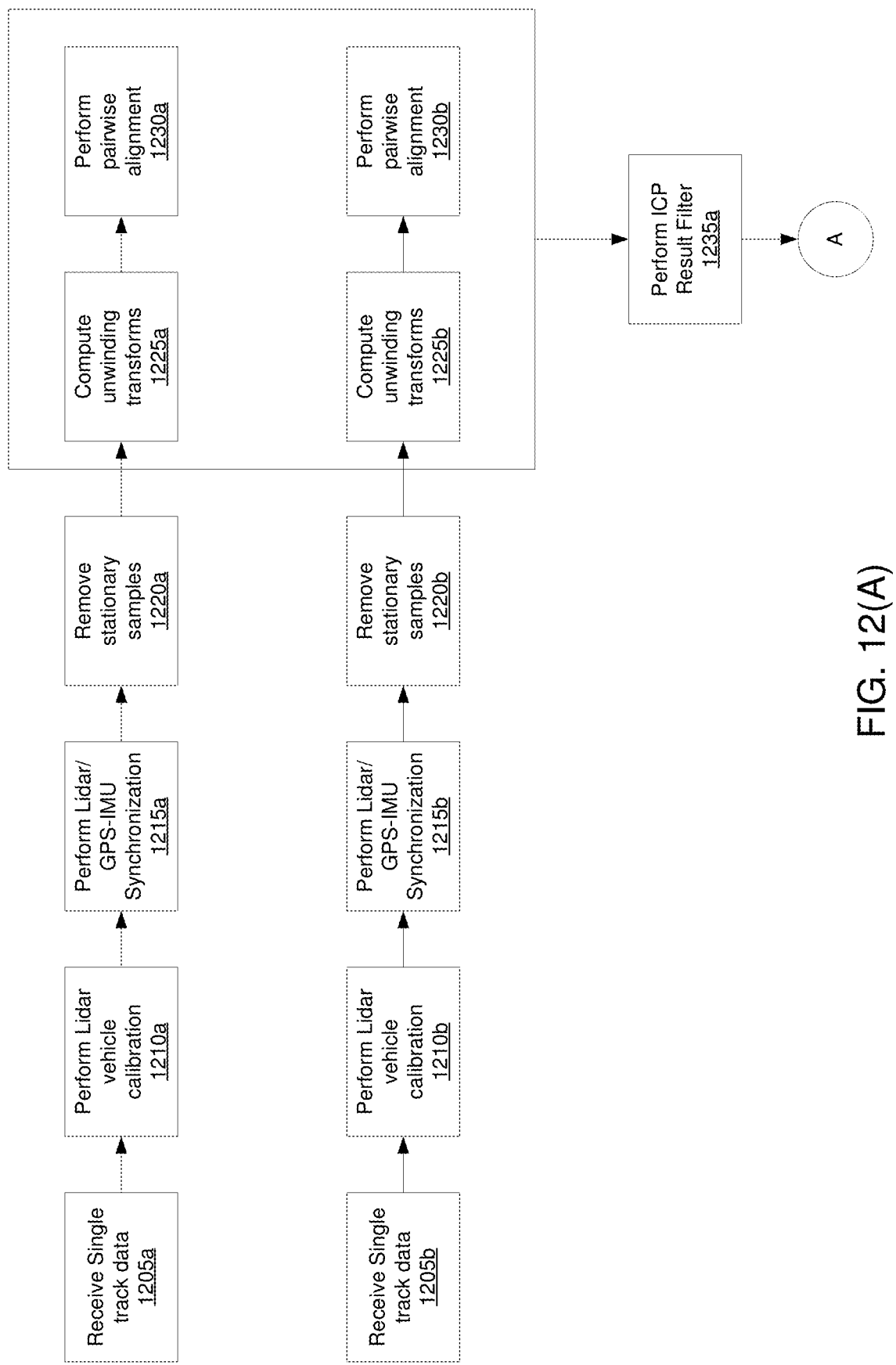
FIG. 12(A) illustrates single track pairwise alignment process according to an embodiment.

FIG. 12(A) illustrate single track pairwise alignment process according to an embodiment. In an embodiment, the single pairwise alignment process is executed by the pairwise alignment module 1120. The HD map system organizes each data collection data as a track. The track data includes at least GNSS-IMU and LiDAR data. The single track alignment is a preprocessing step that performs the following steps: (1) Receiving 1205 single track data (1) Performing 1210 LiDAR to vehicle calibration transform; (2) Performing 1215 synchronization of GNSS-IMU and LiDAR data based on their timestamps; (3) Remove 1220 stationary samples, for example, samples taken when the car is stopped at a traffic light; (4) Computing 1225 unwinding transforms for motion compensation; (5) Performing 1230 pairwise alignment by computing pairwise registrations between point clouds within the same track. The HD map system also performs 1235 an ICP result filter.

When the vehicle stops, e.g., at a red traffic light, the LiDAR measurements are redundant. The HD map system removes the stationary point cloud samples by prefiltering the track samples. The HD map system preserves the first sample for each track. The HD map system identifies subsequent samples as non-stationary samples if and only if their distance to the previous non-stationary sample measured by their GNSS locations exceeds a certain threshold measured in meters (e.g., 0.1 meter). [0002] Though GNSS measurements are not always accurate, and could have sudden jumps, the HD map system uses GNSS locations to filter out stationary samples because GNSS measurements are globally consistent. As a comparison, the relative locations from global LiDAR poses can vary each time a global optimization is computed, resulting in unstable non-stationary samples.

Unwinding transforms are the relative motions during the course of the scans (i.e., from the starting time to the end time of the scan). Therefore, the HD map system always uses consecutive LiDAR samples to estimate the unwinding transforms. For example, the HD map system needs to compute the unwinding transform for a non-stationary sample i, the HD map system uses the immediate sample (i+1) to compute this unwinding transform, even if sample (i+1) may not be a non-stationary sample.

The HD map system precomputes the unwinding transforms using raw LiDAR point clouds. The basic assumption is the correct motion can be estimated by running point-to-plane ICP using just the raw LiDAR point clouds. This assumption is generally true for steady motion (i.e., no change in velocity or rotation rate). Under this assumption, the unwinding transforms have the same effect for both the related point clouds, therefore, ignoring it still provides a reasonable motion estimation from the two raw point clouds.

To compute the unwinding transforms for non-stationary sample i, the HD map system finds its consecutive LiDAR sample (i+1), and run point-to-plane ICP using the following settings: (1) Source point cloud: LiDAR sample i+1 (2) Target point cloud: LiDAR sample i. The HD map system estimates normals and constructs a spatial indexing data structure (KD-tree) for the target point cloud, and computes the relative transform of the source point cloud using the point-to-plane ICP as the unwinding transform. For the initial guess of the ICP process, the HD map system uses the motion estimation from GNSS-IMU. The ICPs to compute unwinding transforms may fail to converge. In such cases, the HD map system ignores the non-stationary samples.

Once the unwinding transforms for all non-stationary samples are computed, the HD map system uses the unwinding transforms to motion-compensate all related point clouds so that they are consistent with the real world. The HD map system computes pairwise point cloud alignments between same-track non-stationary samples. For each non-stationary track sample, the HD map system uses a search radius to find other nearby single-track non-stationary samples. The HD map system organizes the related samples into a list of ICP pairs for ICP computation. Each ICP pair can potentially be computed independently via a parallel computing framework. For each ICP pair, the source and target point clouds are first unwound using their corresponding unwinding transforms, then provided as input to a point-to-plane ICP process to get their relative transforms.

The pairwise point-to-plane ICP process computes a transformation matrix (T), and also reports the confidence of the 6 DOF (degrees of freedom) transformation as a 6×6 information matrix. For example, if the 6-DOF motion estimation is [tx, ty, tz, roll, pitch, yaw], the 6×6 information matrix ($\Omega$) is the inverse of the covariance matrix, which provides confidence measures for each dimension. For example, if the car enters a long corridor along x axis, the point-to-plane ICP cannot accurately determine the relative motion along the x axis, therefore, the HD map system assigns the element in the information matrix corresponding to tx a low confidence value (i.e., large variance for tx).

Cross Track Pairwise Alignment

In order to merge LiDAR samples from different tracks, the HD map system computes loop closing pairwise transforms for LiDAR samples from different tracks. For each non-stationary sample, the HD map system searches within a radius for nearby non-stationary samples from other tracks. The related samples are organized into a list of ICP pairs for ICP computation. Each ICP pair can be computed independently via a parallel computing framework. For each ICP pair, the source and target point clouds are first unwound using their corresponding unwinding transforms, then fed to point-to-plane ICP to get their relative transforms.

Upon completing all pairwise alignments, the HD map system performs global pose optimization and solves the following problem.

Given a set of N samples from multiple tracks {Sample} and their relative transformations among these samples {$T_{ij}$, $i \in [1 \ldots N], j \in [1 \ldots N]$} and the corresponding information matrices {$\Omega_{ij}$, $i \in [1 \ldots N], j \in [1 \ldots N]$}, the HD map system computes a set of global consistent poses for each sample {$x_i$, $i \in [1 \ldots N]$}, so that the inconsistency between pairwise transformations are minimized:

$$\min_{x_i} \sum_{ij} \left[ T(x_i^{-1} \circ x_j)^{-1} \circ T_{ij} \right]^T \cdot \Omega_{ij} \cdot \left[ T(x_i^{-1} \circ x_j)^{-1} \circ T_{ij} \right]$$

Figure 12B:
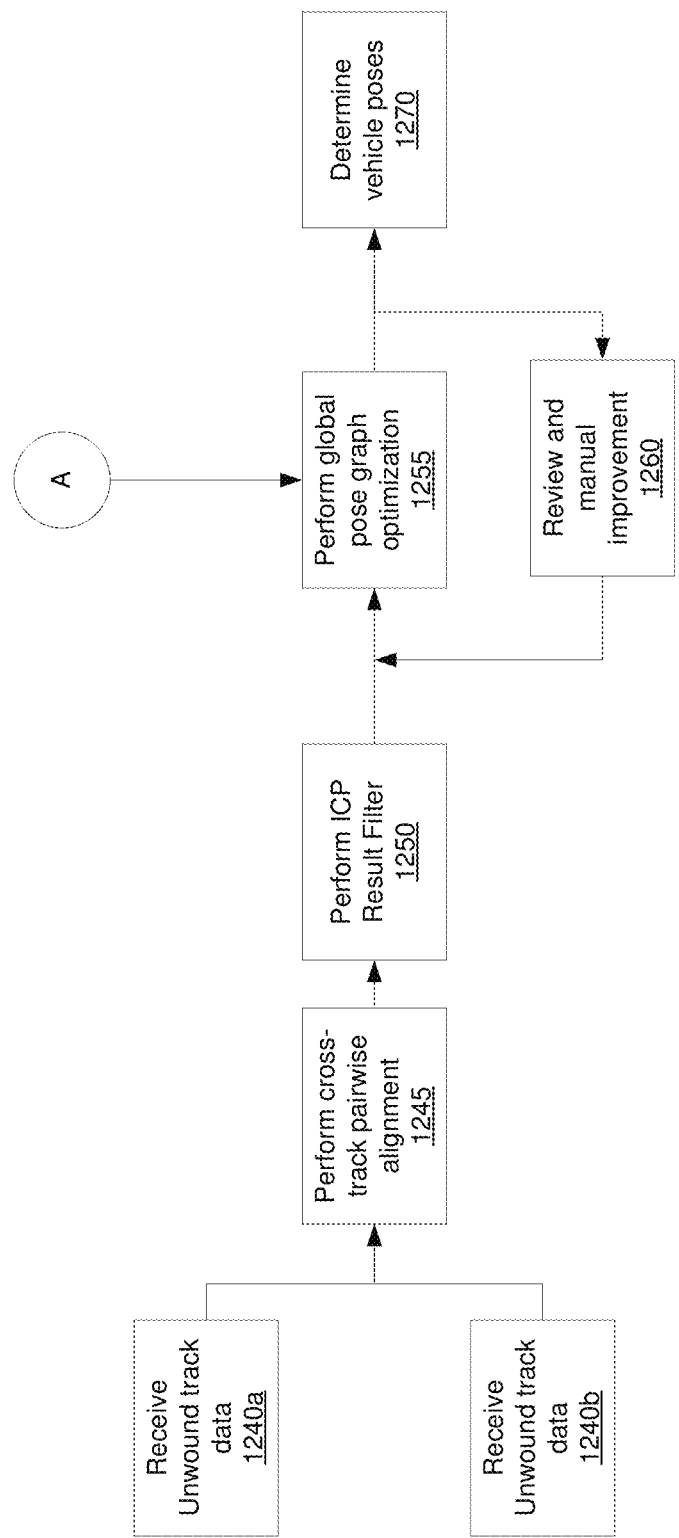
FIG. 12(B) illustrates global alignment process according to an embodiment.

FIG. 12(B) illustrate global alignment process according to an embodiment. Upon completion of single track alignments, the global alignment module 400 performs global alignment by performing 1245 cross-track pairwise alignment for LiDAR samples from different tracks for loop closing purposes. The HD map system combines the single track pairwise alignment results and the cross track pairwise alignment results, to build a global pose graph. The HD map system repeatedly performs 1255 global pose optimization and performs 1260 review and manual improvements of the results. The HD map system determines 1270 the final vehicle poses via global pose graph optimization.

Generating Pose Graph

In an embodiment, the global optimization is performed as a processing of a pose graph. The HD map system uses a node to represent the pose of each sample for all the samples available ({$V_i = x_i$}). The edges are pairwise transformations and the corresponding ({$E_{ij} = \{T_{ij}, \Omega_{ij}\}$}) information matrices for pairwise transforms among the nodes.

Figure 13:
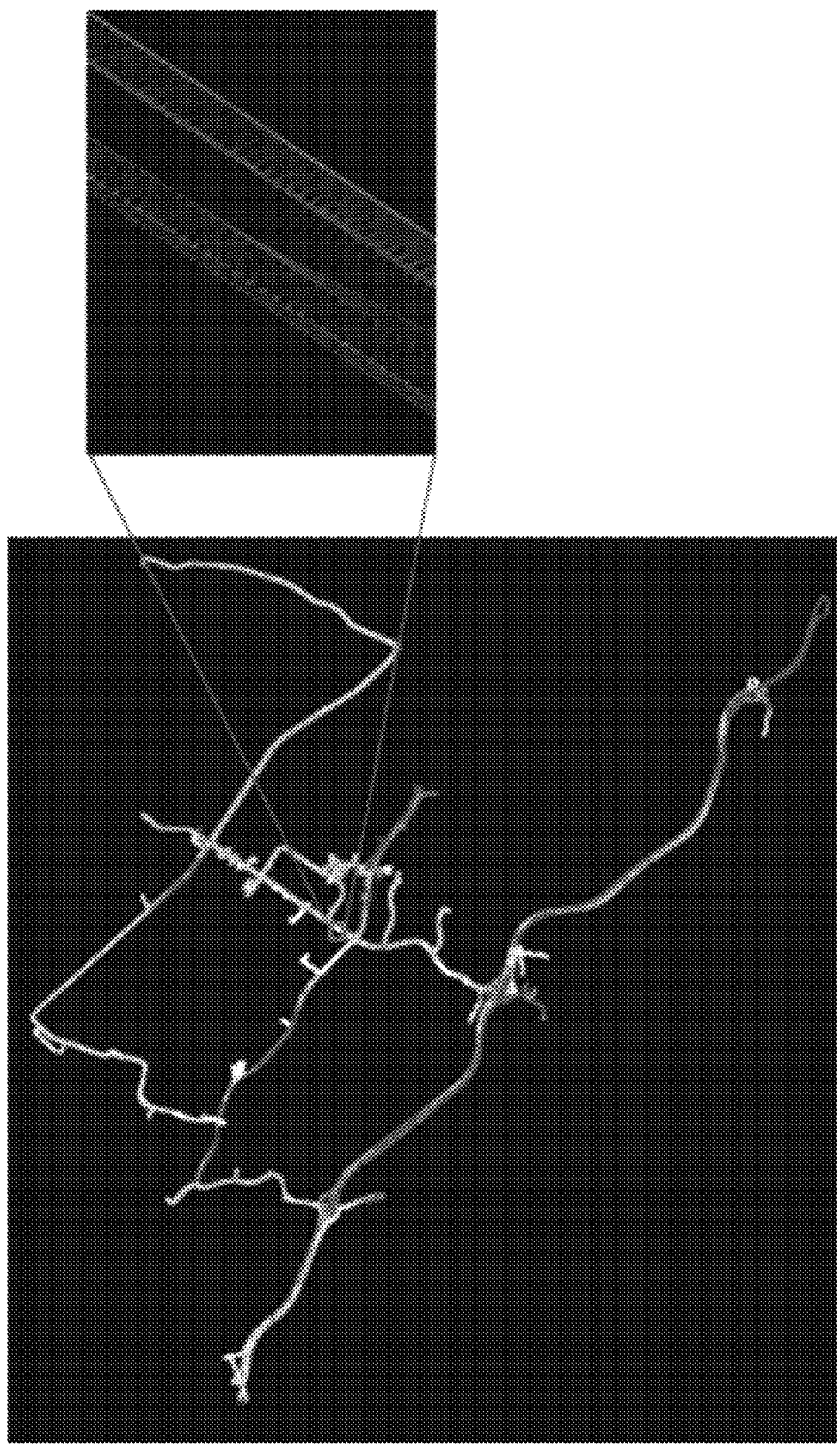
FIG. 13 shows a visualization of a pose graph according to an embodiment.

FIG. 13 shows a visualization of a pose graph according to an embodiment. The goal of global pose optimization is to optimize the pose for each node in the pose graph, such that their relative pairwise transformations are as close to the ones computed from pairwise ICP as possible, weighted by the corresponding information matrices. This can be expressed mathematically using the following equation:

$$\min_{x_i} \sum_{ij} \left[ T(x_i^{-1} \circ x_j)^{-1} \circ T_{ij} \right]^T \cdot \Omega_{ij} \cdot \left[ T(x_i^{-1} \circ x_j)^{-1} \circ T_{ij} \right]$$

where, $T(x_i^{-1} \circ x_j)$ is the pairwise transform between node i and node j, computed from the global poses; $T(x_i^{-1} \circ x_j)^{-1} \circ T_{ij}$ is the difference between the pairwise transforms computed from global poses compared to the one computed from ICP; and $[T(x_i^{-1} \circ x_j)^{-1} \circ T_{ij}]^T \cdot \Omega_{ij} \cdot [T(x_i^{-1} \circ x_j)^{-1} \circ T_{ij}]$ is the error term from edge $e_{ij}$ due to the inconsistency between global poses and the pairwise ICP weighted by the information matrix $\Omega_{ij}$. The more confident of the ICP results, the "larger" $\Omega_{ij}$ would be, and therefore the higher the error term.

Adding Pose Priors to Pose Graph

The pose graph optimization above adds constraints due to the pairwise transforms, and therefore, any global transformations to all nodes are still valid solutions to the optimization. In an embodiment, the HD map system keeps the poses consistent with GNSS measurements as close as possible, since the GNSS measurements are generally consistent globally. Therefore, the HD map system selects a subset of nodes (P), and minimizes its global pose differences with their corresponding GNSS poses.

Figure 14:
FIG. 14 shows a visualization of a pose graph that includes pose priors based on GNSS, according to an embodiment.

FIG. 14 shows a visualization of a pose graph that includes pose priors based on GNSS, according to an embodiment. As shown in FIG. 14, unary edges are added to a subset of the nodes in the pose graph. The dots 1410 illustrated as pink nodes are pose priors added to the corresponding graph nodes.

Adding global pose priors is equivalent to adding regularization terms on the subset of nodes were: $x_i$: is the global GNSS pose prior added to node $x_i$, and $T(x_i^{-1} \circ \bar{x}_i)$ is the pose difference between current pose $x_i$, and its pose prior $\bar{x}_i$; $\Omega_{ii}$: is the strength, or confidence of the global pose prior. The larger this information is, the more weight is added for this global pose prior. According to various embodiments, there are multiple ways to select the subset of samples for pose prior: (1.) Select samples from each track at fixed distance interval (2.) Perform random sampling (3.) Select one node per latitude/longitude bounding box Embodiments may adapt the creation of node subsets based on the quality of the GNSS poses and pairwise alignments. For example, the selection process may favor selection of GNSS nodes with high quality pose or increase the sampling density in regions with low quality pairwise alignments.

The HD map system determines confidence for the global pose priors similar to the confidence measures of the GNSS poses. The confidence can be measured with the inverse of estimated error variance. Accordingly, the HD map system associates lower variance with a higher confidence in the pose. The HD map system determines a position error variance while performing the GNSS calculations used to estimate position. The HD map system determines a position error variance by taking into consideration factors like the relative positions of the satellites and residual errors in distance to each satellite. The HD map system determines full pose (position and orientation) error variance as a by-product of the calculations for combining the GNSS poses with other sensor data (for example, IMU, magnetometer, visual odometry, etc.). In an embodiment, the HD map system uses a Kalman filter that outputs error variance with every estimate of pose. The HD map system determines that the better the estimated pose agrees with the GNSS and IMU data, the lower the expected error variance and the higher our confidence is in the pose. Both position and pose error variances are standard outputs of integrated GNSS/IMU devices.

Pose Graph Optimization

The HD map system performs initialization of the pose graph for correct convergence. The pose graph optimization is a nonlinear optimization where multiple local minima could exist. The HD map system uses GNSS poses to initialize all the poses in the pose graph. Although each GNSS pose could be quite off, the GNSS measurement provides a global bound on the pose error. After initializing the pose graph, the HD map system optimizes the entire pose graph using non-linear solvers.

The automatic constructed pose graphs may prone to errors due to lack of loop closing edges, or non-planar structures such as overpasses, multilevel garages, etc. The HD map system assigns operators to verify the globally optimized poses by checking the sharpness of the merged point clouds with global poses. The HD map system also allows the operators to manually add loop closing edges to improve the pose graph quality. Upon completion of the manual review process, the new pose graph with added manual edges are optimized so that a more accurate set of global poses can be produced. To automatically identify where the HD map system needs manual review or improvements, the HD map system provides automatic alignment hot spot detection.

Overall Process of Alignment

Figure 15:
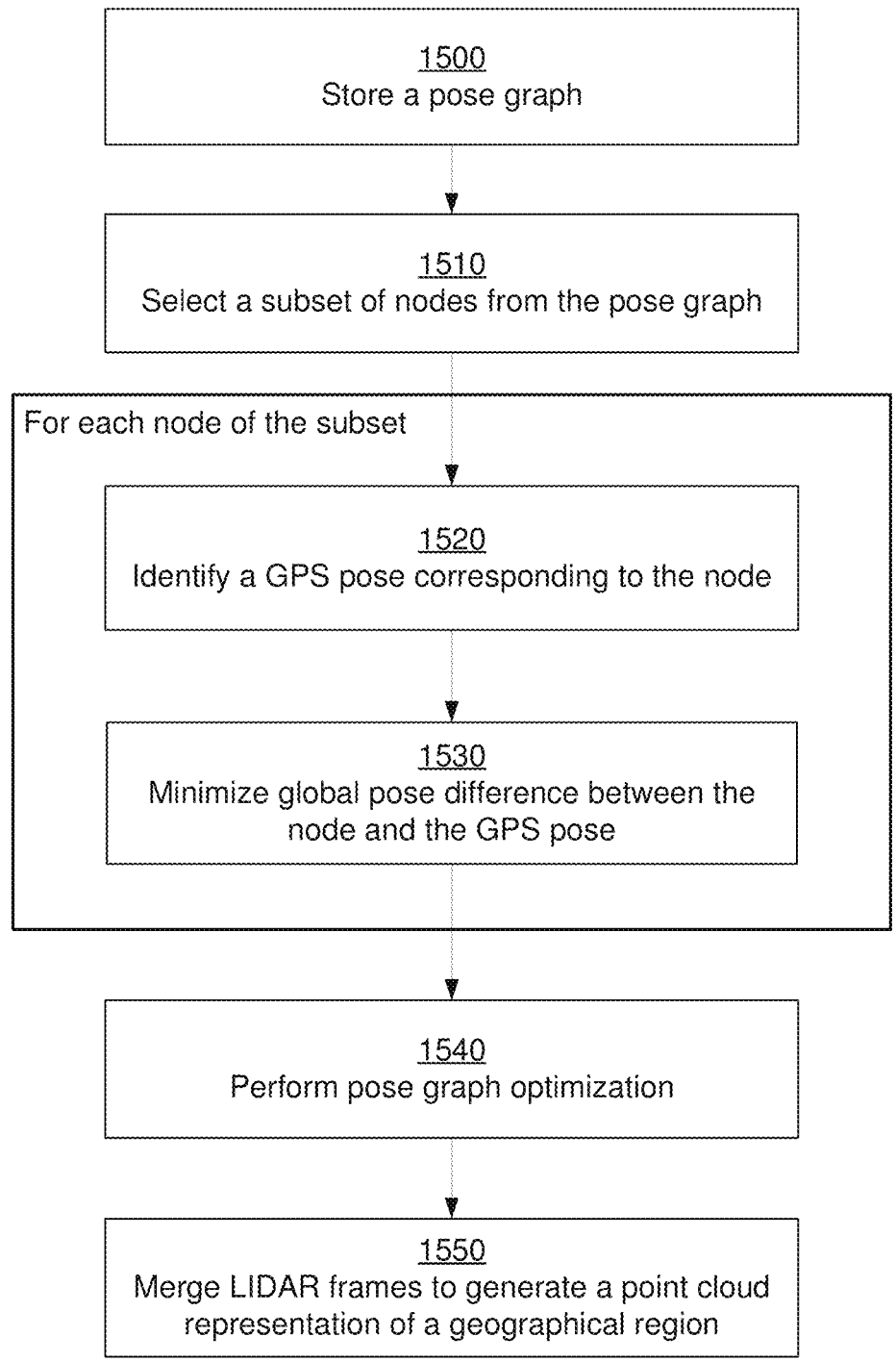
FIG. 15 shows a flowchart illustrating the process for performing pose graph optimization, according to an embodiment.

FIG. 15 shows a flowchart illustrating the process for performing pose graph optimization, according to an embodiment. Various steps of the process may be performed by the pose graph optimization module 1150 and GNSS pose prior processing module 1170. The HD map system stores 1500 a pose graph in the pose graph store 1180. A pose represents the location and orientation of a vehicle. The HD map system collects track data, each track data comprising sensor data collected by vehicles driving along a route, for example, LIDAR frames representing range images collected by LIDARs mounted on autonomous vehicles. An edge between two poses in a pose graph connects two associated nodes, for example, nodes that represent consecutive locations from where sensor data was collected by a vehicle along a route.

The GNSS pose prior processing module 1170 selects 1510 a subset of nodes from the pose graph. For each node of the subset, the GNSS pose prior processing module 1170 performs the steps 1520 and 1530. The GNSS pose prior processing module 1170 identifies 1520 a GNSS pose corresponding to the node. The GNSS pose prior processing module 1170 minimizes 1530 global pose difference between the node and the GNSS pose.

The pose graph optimization module 1150 performs 1540 pose graph optimization using the pose graph. The HD map system merges the sensor data, e.g., the LIDAR frames to generate a consistent, unified point cloud. The HD map system generates the high definition map using the point cloud.

Filtering of ICP Results

Conventional ICP techniques do not guarantee converging to the global optimal solutions. In practice, if the initial guess to the ICP algorithm is bad, ICP can get stuck at local minima and return incorrect transforms. Therefore, embodiments use a quality control method to rate each ICP results, and remove bad ICP results. The HD map system uses an automatic QA method for ICP results based on various statistics that can be collected during ICP computation.

At the last iteration of each ICP, the HD map system collects the statistics from the current set of correspondences $C=\{c_i|c_i=[s_i \rightarrow (d_i, n_i)]\}$. From these correspondences, the HD map system collects the following statistics: (1) Average signed distance error among correspondences. (2) Variance of the signed point-to-plane errors among correspondences. (3) Histogram of the distribution of signed distance error among correspondences. Since the transformation is in 6D parameter space (three degrees of freedom (3DOF) for translation, and 3DOF for rotation), the HD map system approximates the cost function as a quadratic cost as shown by the following equation:

$$\min_T \sum_i w_i |n_1 \cdot (T \cdot s_i - d_i)|^2 = x'_T \cdot \Omega \cdot x_T$$

Where $x_T=[t_x, t_y, t_z, \text{roll}, \text{pitch}, \text{yaw}]$ is the 6D vector that can generate the 4×4 transformation matrix, and is called ICP information matrix. The information matrix reveals the uncertainties for each dimension of the ICP optimization. For ICP information matrix, the HD map system computes the following attributes: conditional number and Eigen values.

In addition to the statistics, the HD map system also computes the pose differences between ICP results and the corresponding GNSS-IMU pose. For each ICP result, the HD map system computes the pose difference between the ICP result and the pairwise pose computed from GNSS-IMU pose difference between the ICP result and the pairwise pose computed from GNSS-IMU. The pose difference can be summarized as a 6D vector: [delta_x, delta_y, delta_z, delta_roll, delta_pitch, delta_yaw]. This 6D vector is also added to the feature vector for SVM ICP result classifier.

Combining the statistics and analysis of the ICP information matrix, the HD map system forms a feature vector for each ICP including following features: Average signed distance error, Variance signed distance error, Error histogram, Conditional number, Eigen values, Difference between GNSS-IMU pose, and other possible features, e.g., difference between visual odometry. The HD map system first builds a set of human verified ground truth ICP results dataset, and computes a feature vector for each ICP result. This collection of feature vectors allows the HD map system to train a binary classifier, e.g., an SVM classifier, which can predict the probability of current ICP result being correct according to the corresponding feature vector. The trained machine learning model (e.g., SVM model), reports a probability of each ICP result being correct, which allows the HD map system to filter out bad ICP results, and inform human labelers of bad ICP results that may need manual adjustment.

Figure 16:
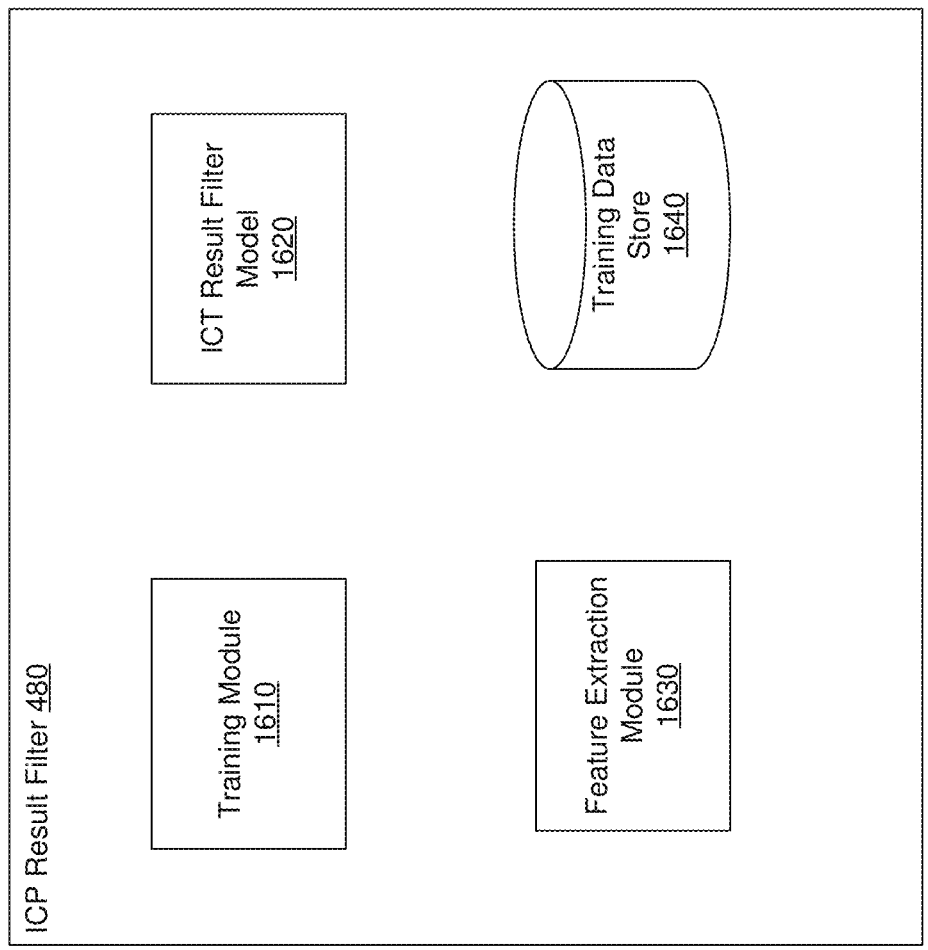
FIG. 16 shows the system architecture of a machine learning based ICP Result filter, according to an embodiment.

FIG. 16 shows the system architecture of a machine learning based ICP Result filter, according to an embodiment. The ICP result filter 480 comprises a training module

1610, an ICP result filter model 1620, a feature extraction module 1630, and a training data store 1640. The training data store 1640 stores training data that is used for training the ICP result filter model 1620. The feature extraction module 1630 extracts features from either data stored in training data store 1640 or from input data that is received for processing using the ICP result filter model 1620. The training module 1610 trains an ICP result filter model 1620 using the training data stored in the training data store 1640.

Figure 17:
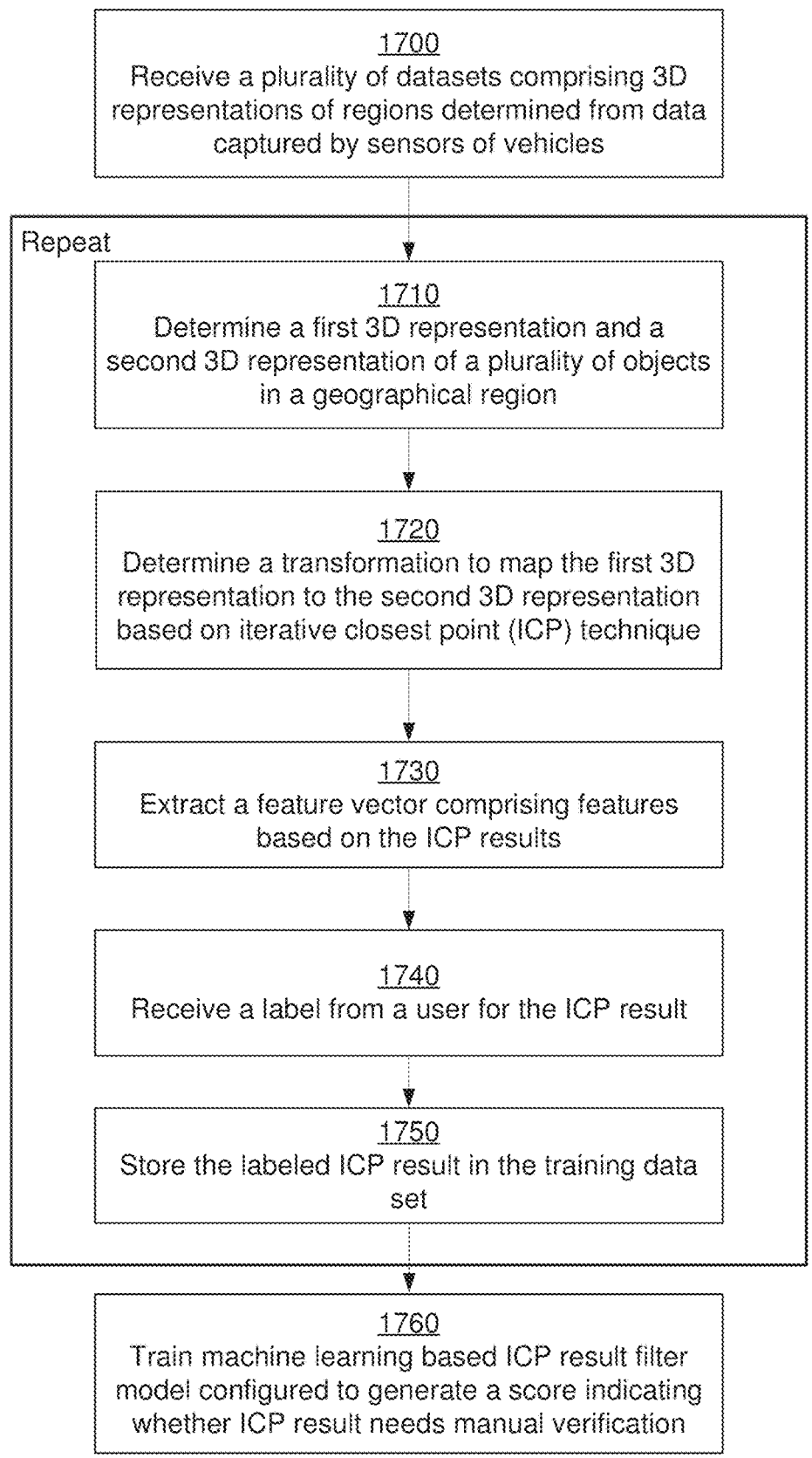
FIG. 17 shows a process for training a model for machine learning based ICP result filter, according to an embodiment.

FIG. 17 shows a process for training a model for machine learning based ICP result filter, according to an embodiment. The training module 1610 receive 1700 a plurality of datasets comprising 3D representations of regions determined from data captured by sensors of vehicles.

The training module 1610 repeats the steps 1610, 1620, 1630, 1640, and 1650. The training module 1610 determines 1710 a first 3D representation and a second 3D representation of a plurality of objects in a geographical region. The training module 1610 determines 1720 a transformation to map the first 3D representation to the second 3D representation based on iterative closest point (ICP) technique. The feature extraction module 1630 extracts 1730 a feature vector comprising features based on a particular ICP result. The training module 1610 receives 1750 a label from a user for the ICP result. The training module 1610 stores the labeled ICP result in the training data store 1740.

The training module 1610 train a machine learning based ICP result filter model 1620 configured to generate a score indicating whether an input ICP result needs manual verification.

Figure 18:
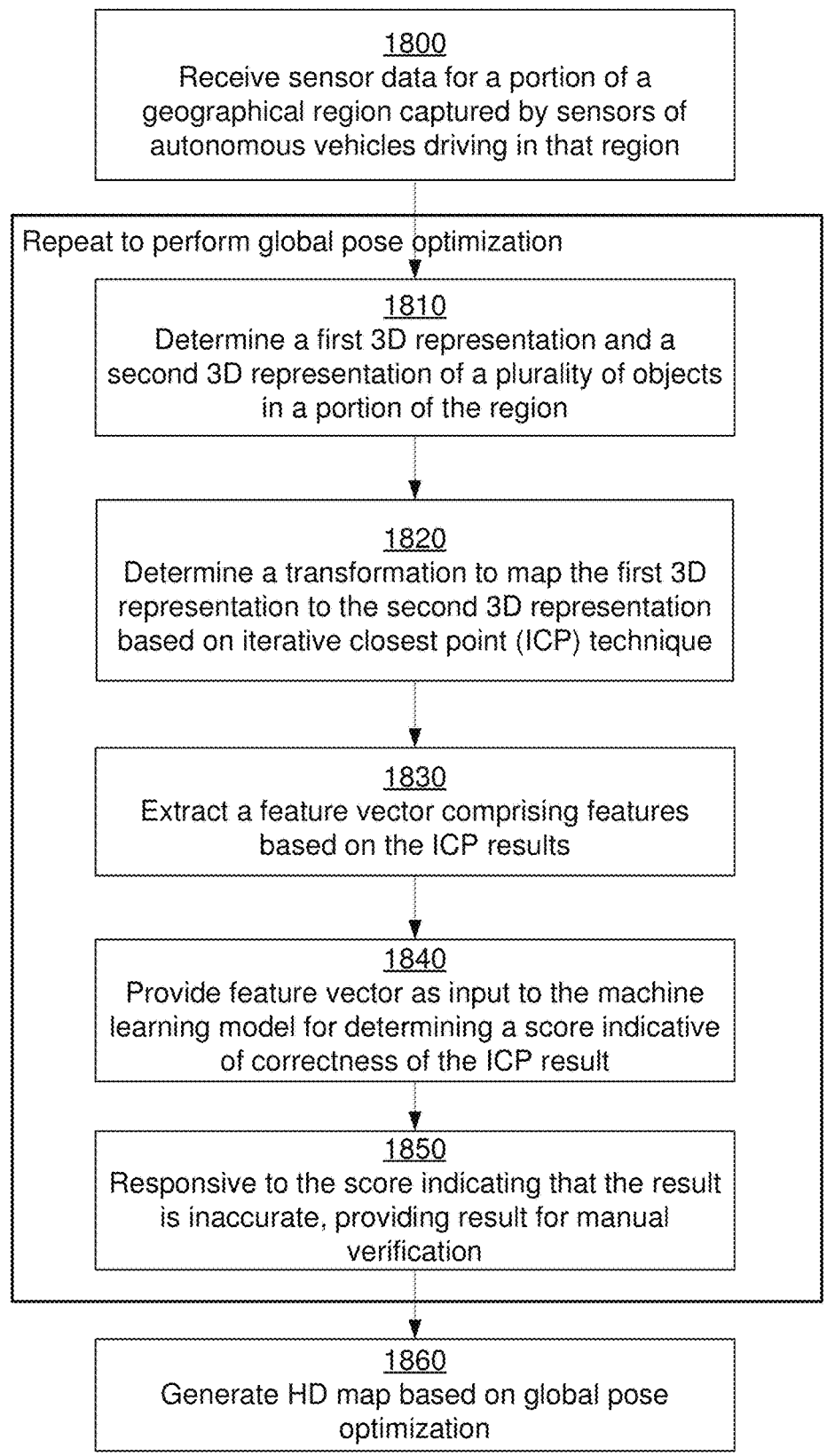
FIG. 18 shows a process for performing ICP result filter using a machine learning based model, according to an embodiment.

FIG. 18 shows a process for performing ICP result filter using a machine learning based model, according to an embodiment. The ICP result filter module 480 receives 1800 sensor data for a portion of a geographical region captured by sensors of autonomous vehicles driving in that region.

The ICP result filter module 480 repeats the steps 1810, 1820, 1830, 1840, and 1850 to perform global pose optimization. The ICP result filter module 480 determines 1810 a first 3D representation and a second 3D representation of a plurality of objects in a portion of the region. The ICP result filter module 480 determines 1820 a transformation to map the first 3D representation to the second 3D representation based on iterative closest point (ICP) technique. The ICP result filter module 480 extracts 1830 a feature vector comprising features based on the ICP results. The ICP result filter module 480 provides 1840 the feature vector as input to the machine learning based ICP result filter model 1820 for determining a score indicative of correctness of the ICP result. If the score indicates that the result is inaccurate, the ICP result filter module 480 provides the result for manual verification. In some embodiments, the result verification is performed by an automatic agent, for example, by an expert system.

The HD map system receives the results based on manual verification and generates 1860 the HD map based on global pose optimization.

Distributed Execution of Global Alignment

For creating maps covering a large geographical region, for example, a large city, the pose graph may contain billions of samples with huge number of edges. It is practically not possible to perform the pose graph optimization on a single computing machine. Embodiments of the HD map system implement a distributed method to optimize large pose graphs.

Figure 19A:
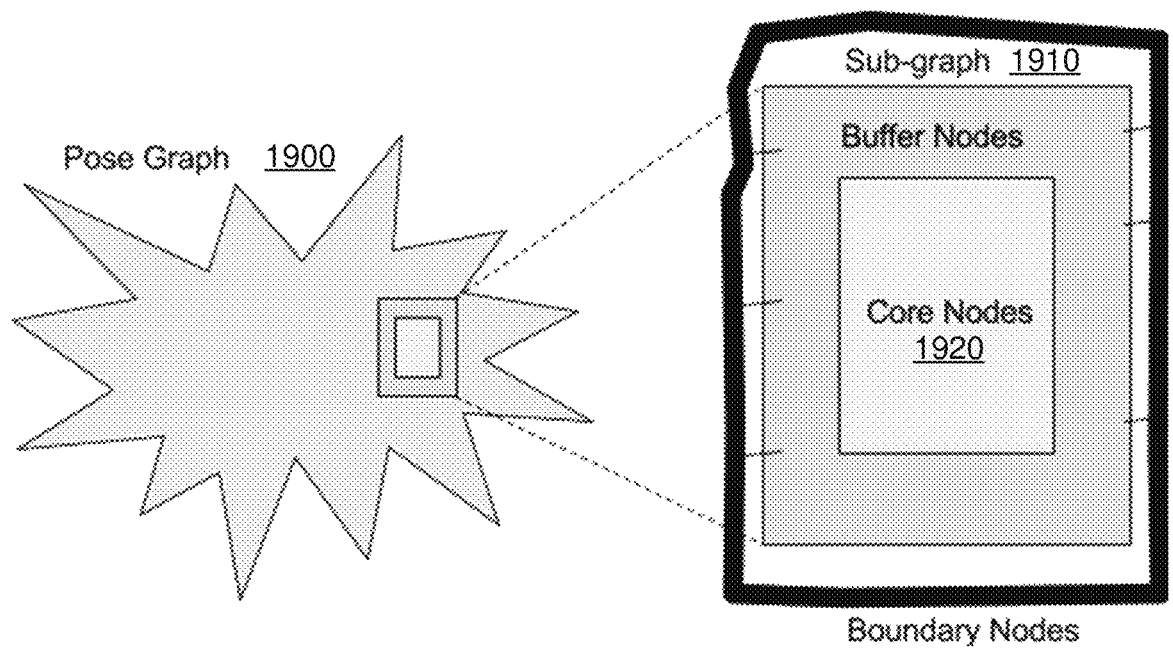
FIG. 19(A) shows an example subgraph from a pose graph, according to an embodiment.

FIG. 19(A-B) illustrate division of a pose graph into subgraphs for distributed execution of the pose graph optimization, according to an embodiment. As illustrated in FIG. 19(A), given a large pose graph 1900, the HD map system divides the pose graph into disjoint sub graphs 1910. For each sub graph 1910, the HD map system extends its boundary with some margin, as shown in FIG. 19. As a result, each sub graph contains a set of core nodes 1920, which are nodes processed by this specific sub graph. In addition, it also has a surrounding buffer nodes 1930 in the buffer region. On the boundary of the buffer region, the HD map system has boundary nodes that are fixed.

Figure 19B:
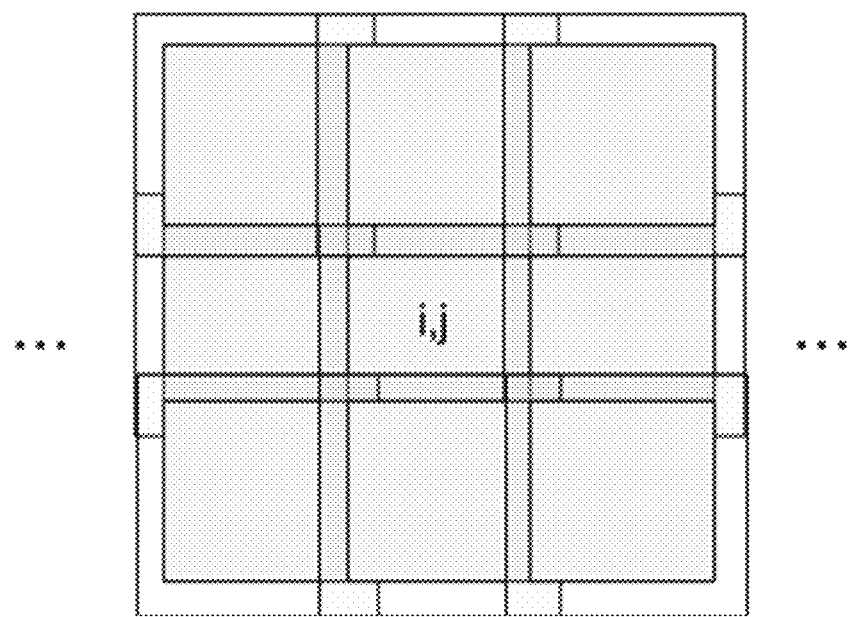
FIG. 19(B) illustrate division of a pose graph into subgraphs for distributed execution of the pose graph optimization, according to an embodiment.

As illustrated in FIG. 19(B), the HD map system divides the entire pose graph 1900 into a large number of sub graphs 1910, where the union of the core nodes 1920 of all subgraphs covers all nodes in original pose graph. The following processes optimize the pose graph in a distributed fashion.

Figure 20:
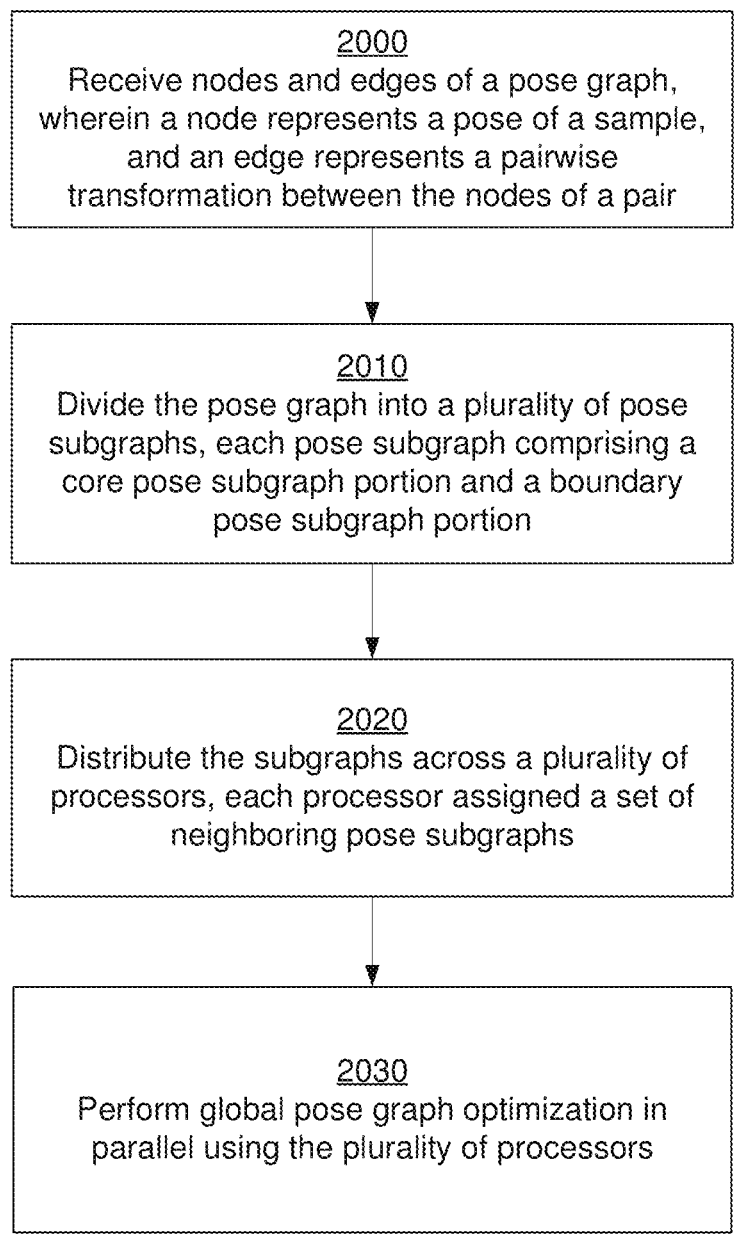
FIG. 20 shows a process for distributed processing of a pose graph, according to an embodiment.

FIG. 20 shows a process for distributed processing of a pose graph, according to an embodiment. In an embodiment, steps of this process are executed by the distributed execution module 1160. The HD map system receives 2000 nodes and edges of a pose graph. A node in the pose graph represents a pose of a sample, and an edge in the pose graph represents a pairwise transformation between the nodes of a pair. The distributed execution module 1160 divides 2010 the pose graph into a plurality of pose subgraphs, each pose subgraph comprising a core pose subgraph portion and a boundary pose subgraph portion as illustrated in FIG. 19. The distributed execution module 1160 distributes 2020 the subgraphs across a plurality of processors, each processor assigned a set of neighboring pose subgraphs. The HD map system 100 performs 2030 global pose graph optimization in parallel using the plurality of processors.

FIG. 21 shows a process for distributed optimization of a pose graph, according to an embodiment. The HD map system repeats the following steps for each pose subgraph. The following steps are repeated while boundary node poses change across iterations or while an aggregate measure of changes across boundary nodes is greater than a threshold value. The HD map system optimizes 2100 pose subgraph while keeping boundary nodes fixed. The HD map system updates 2110 boundary nodes from neighboring pose subgraphs. The HD map system determines 2120 an amount of change in the boundary nodes. The HD map system marks 2130 subgraph optimization complete if there is no change in boundary nodes or a measure of change in boundary nodes is below a threshold value.

The way the HD map system we cuts the pose graph into sub pose graphs with disjoint core nodes affects the convergence speed of the joint pose graph. A sub pose graph is also referred to herein as a pose subgraph. There is a long feedback loop where the errors are bouncing as a wave, leading to boundary node changes for a large number of iterations. Various embodiments. Various embodiments address the problem with different candidate subdivision strategies. According to an embodiment, the HD map system subdivides pose graph based on latitude/longitude bounding boxes. This strategy may lead to large number of boundary nodes, which may slow down the convergence. In another embodiment, the HD map system subdivides the pose graph based on graph cuts. For example, the HD map system may cut the pose graphs at the center of long road sections. This leads to the least number of boundary nodes.

In another embodiment, the HD map system cuts the pose graphs at junctions. Since samples in junctions often are well constrained by lots of edges, cutting pose graphs at junctions may result in fast convergence of the boundary nodes, and thus speed up the distributed pose graph optimization. In general, in an embodiment, the HD map system identifies portions of geographical region that have large number of samples returned by vehicles and divides the pose graph into subgraphs such that the boundaries pass through such regions. Having the boundary of a subgraph pass through portions of geographical regions with large number of samples leads to faster convergence.

Incremental Processing of Global Alignment

The HD map system allows incremental addition of data of tracks to a pose graph that is constructed and optimized. This allows updates on a regular basis to the pose graph and their incorporation into the HD map.

Figure 22:
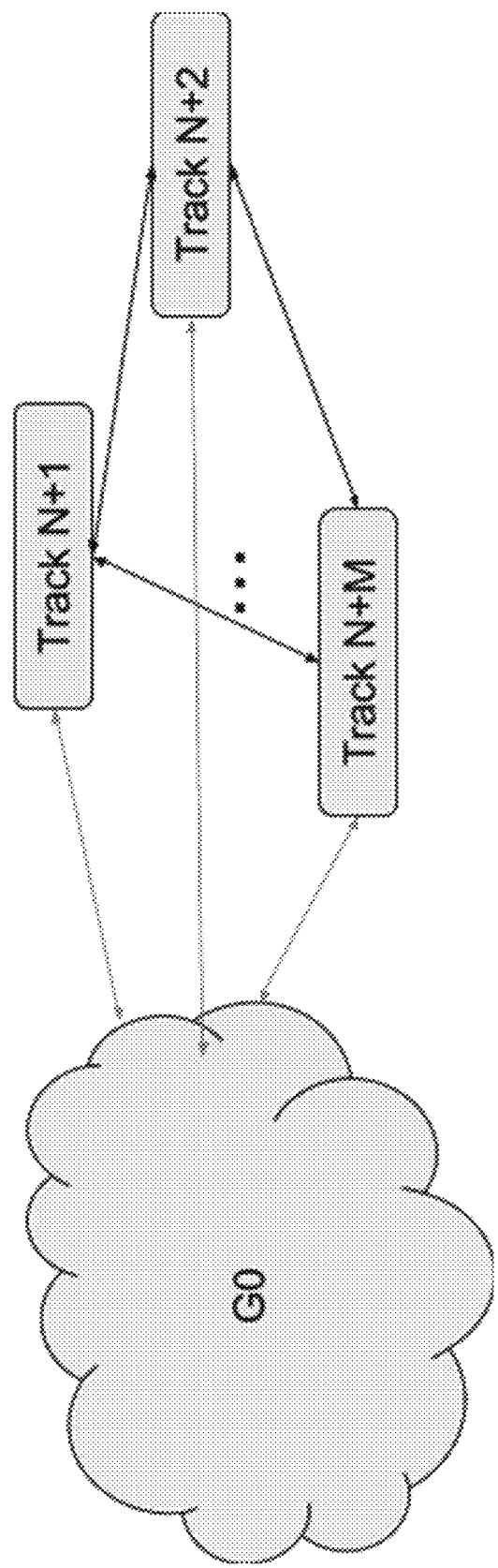
FIG. 22 shows an example illustrating the process of incremental updates to a pose graph, according to an embodiment.

FIG. 22 shows an example illustrating the process of incremental updates to a pose graph, according to an embodiment.

FIG. 22 shows an existing pose graph $G_0$ which includes tracks {$Track_1$, $Track_2$, ..., $Track_N$}. A new set of tracks is added to the graph G0 after new tracks being collected, the HD map system adds these $M_{new}$ tracks {$Track_{N+1}$, $Track_{N+2}$, ..., $Track_{N+M}$} to the existing pose graph to get a new pose graph G that includes all N+M tracks.

Figure 23:
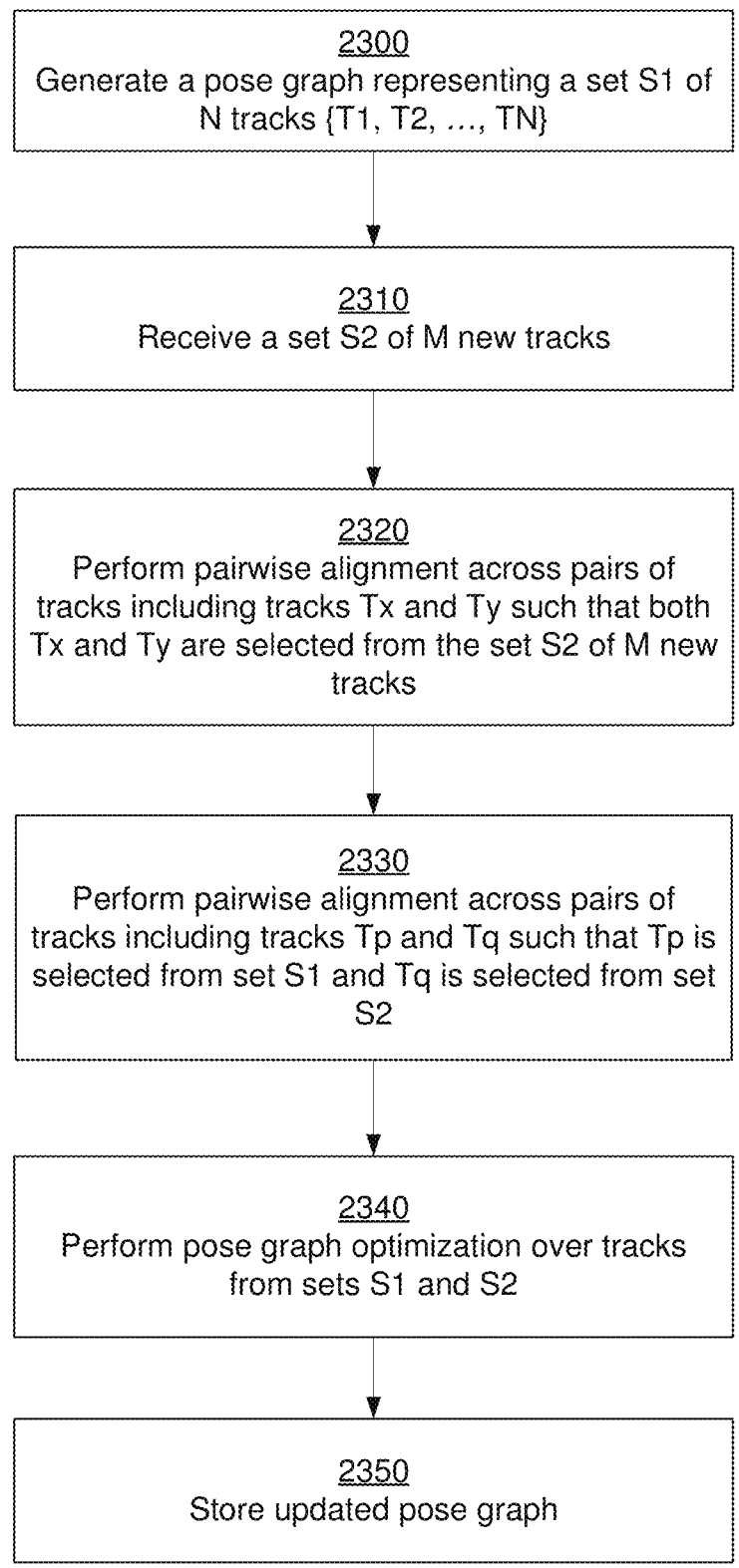
FIG. 23 shows a flowchart illustrating the process of incremental updates to a pose graph, according to an embodiment.

FIG. 23 shows a flowchart illustrating the process of incremental updates to a pose graph, according to an embodiment. In an embodiment, various steps of the process are executed by the incremental pose graph update module 1110 and performed in the online HD map system 110.

The HD map system generates 2300 a pose graph $G_0$ including a set S1 of tracks {$Track_1$, $Track_2$, ..., $Track_N$}. In an embodiment, the pose graph $G_0$ is generated and optimized using the process illustrated in FIG. 20 and FIG. 21. The HD map system receives 2310 a set S2 of new tracks {$Track_{N+1}$, $Track_{N+2}$, ..., $Track_{N+M}$} for adding to the existing pose graph $G_0$.

The HD map system performs 2320 pairwise alignment across pairs of tracks including tracks Tx and Ty such that both Tx and Ty are selected from the set S2 of M new tracks. Accordingly, the HD map system performs single track unwinding transforms and single track pairwise transforms for the new tracks.

The HD map system performs 2330 pairwise alignment across pairs of tracks (Tp, Tq) such that Tp is selected from set S1 and Tq is selected from set S2. Accordingly, the HD map system performs cross track pairwise alignment, by relating the new tracks with each other, as well as the new tracks to existing tracks. As shown in FIG. 22, in addition to computing cross track pairwise alignment among the M new tracks, the HD map system also computes cross track pairwise alignments for the new tracks with existing N tracks. With the new single track and cross track pairwise alignment results, the HD map system constructs a new pose graph G, where the nodes of G are the union of all samples in $G_0$ and all of the samples in the new tracks. The edges of G include both the edges from $G_0$ and the newly computed single and cross track pairwise ICP results.

The HD map system performs 2340 pose graph optimization over tracks from sets S1 and S2. In one embodiment, the HD map system performs optimization of the pose graph without changing the poses for the existing samples for tracks {$Track_1$, $Track_2$, ..., $Track_N$}. Accordingly, the HD map system freezes the poses of the existing samples for tracks {$Track_1$, $Track_2$, ..., $Track_N$} during the pose graph optimization. As a result, the HD map system optimizes only the new track sample poses.

In another embodiment, the HD map system makes changes to the existing sample poses for track {$Track_1$, $Track_2$, ..., $Track_N$}. Accordingly, the HD map system starts an entire new global optimization process without freezing any of the node poses. In this case, the global optimization is similar to a new global optimization for pose graph G.

The HD map system stores 2350 the updated pose graph in the pose graph store 2280. The HD map system uses the updated pose graph for updating the HD map and provides the updated HD map to vehicles driving in the appropriate regions.

Patching of Pose Graph

Due to the quality of the pose graph, the optimized poses generated by the HD map system may not be accurate for all nodes in the pose graphs. Sometimes, the optimization results may be incorrect in a small region due to lack of loop closing edges, or wrong ICP edges being inserted. In these cases, the HD map system receives inputs from users, for example, human operators. The received input causes the problematic regions to be tagged with a latitude/longitude bounding box. Subsequently the portion of the pose graph inside the latitude/longitude bounding box is fixed, for example, manually.

In an embodiment, the HD map system presents a user interface displaying a portion of the pose graph within a latitude/longitude bounding box. The HD map system receives via the user interface, request to either remove edges identified as incorrect or a request to add new verified edges.

After performing the pose graph edits based on requests received via the user interface, the HD map system re-optimizes the pose graph and generates the correct poses for all the nodes inside the bounding box. In an embodiment, the HD map system does not change the poses outside the latitude/longitude bounding box while performing the optimization of the edited pose graph. Accordingly, the HD map system freezes the poses of nodes outside latitude/longitude bounding box during the pose graph optimization. As a result, the HD map system optimizes and updates only the sample poses inside the specified latitude/longitude bounding box. In another embodiment, the HD map system starts an entire new global optimization without freezing any of the node poses. In this case, the global optimization is similar to performing a new global optimization for the edited pose graph.

In an embodiment, the HD map system allows deprecating of old tracks. Assuming current pose graph $G_0$ is optimized, the HD map system simply removes the corresponding track samples and all edges connected to them. The result is a smaller pose graph without the deprecated samples. In this case, the HD map system does not perform a pose graph optimization responsive to deprecating the tracks.

Pairwise Alignment Based on Classification of Surfaces as Hard/Soft

The HD map system computes the relative pairwise transforms between two nearby samples. Given two point clouds, the HD map system uses point-to-plane ICP (i.e., Iterative Closest Point) process to get their relative transformation and the corresponding confidence estimation, represented using an information matrix, which is the inverse of the covariance matrix.

The HD map system performs the point-to-plane ICP process as follows. The HD map system identifies two point clouds, referred to as source and target point cloud, as sparse observations of the surrounding environment, and uses the ICP process is to find the desired transform that transforms the source point cloud from its local coordinate system to the target point cloud's coordinate system. Due to the sparsity of the data, it is unlikely that the source and target point clouds sample the exact same points in the environment. Therefore, a simple point-to-point ICP is prone to error with sparse LiDAR point clouds. Typically, the environments, especially under driving scenarios, often have plenty of planar surfaces. In these situations, using point-to-plane error metric in basic ICP process leads to more robust transformation estimations.

Figure 24:
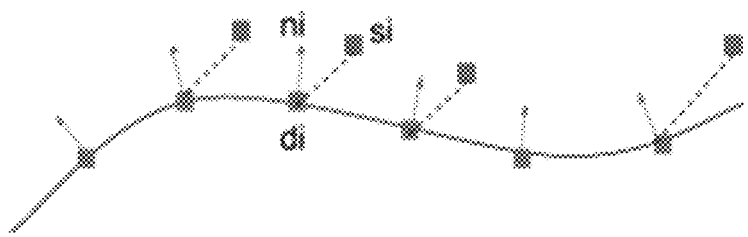
FIG. 24 illustrates the ICP process performed by the HD map system according to an embodiment.

FIG. 24 illustrates the ICP process performed by the HD map system according to an embodiment. Given correspondences, the HD map system performs point-to-plane ICP that minimizes the following cost function:

$$\min_T \sum_i w_i \, |n_1 \cdot (T \cdot s_i - d_i)|^2$$

Where $(n_i, d_i)$ is a point in target point cloud, where $n_i$ is the estimated surface normal at point $d_i$ and $s_i$ is the corresponding point in source point cloud; $w_i$ is the weight assigned to each correspondence, which is set to 1.0 for the simplest weighting strategy, and may have different adaptations for other weighting schemes. The optimization problem minimizes the sum of point-to-plane errors from source to target by adjusting the transformation T. In each iteration, the correspondences are updated via nearest neighbor searches.

The HD map system treats normal estimates for different points with different measures of confidence. For example, the HD map system associates the normals of road surface, or building surfaces with high confidence and normals of tree leaves, or bushes with low confidence, since these aren't stable planar structures. During normal computation, in addition to computing the normal vectors at each location, the HD map system estimates the confidence (or robustness) of each normal by estimating the distribution of neighboring points. The neighboring points may be obtained from the LiDAR range image.

Figure 25:
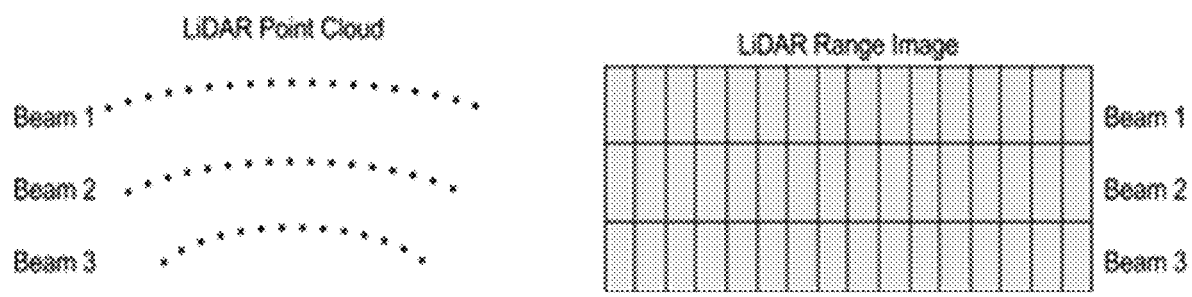
FIG. 25 illustrates estimation of point cloud normals using the LiDAR range image by the HD map system, according to an embodiment.

FIG. 25 illustrates estimation of point cloud normals on the LiDAR range image by the HD map system, according to an embodiment. FIG. 25 illustrates the beams of the LIDAR scan that form a LIDAR point cloud. FIG. 25 also illustrates a corresponding LIDAR range image.

One of the steps performed by the HD map system while performing point-to-plane ICP is to reliably estimate the surface normal of the target point cloud. In one embodiment, the HD map system estimates the surface normal at a specific point p via statistical analysis of the neighboring points of p over a certain radius. This is challenging as most of the LiDAR used in autonomous driving vehicles have limited number of laser beams. The collected LiDAR point clouds have higher point density for points collected with the same laser beam, and sparser between different laser beams. This uneven distribution of point densities causes troubles to conventional neighbor search. Accordingly, a smaller search radius makes it difficult to find neighbors within the same laser beam, which mostly lies on a line instead of a plane. On the other hand, a large search radius that includes neighboring points from a different row may also include points from other planar surfaces. Embodiments of the invention address these problem and allow estimating a normal for LiDAR range scans.

The HD map system encodes measurement of a LiDAR point cloud as a range image, where the rows and columns encode the pre-calibrated pitch and yaw angles, and the pixel value encodes the distance to the obstacle. To address the challenges of nearest neighbor based normal estimation, the HD map system estimates point cloud normals directly on the LiDAR range image. This technique has the following advantages: (1) More reliable, as it address the point density differences inside each laser beam and across laser beams. (2) More efficient, since the neighbor search is very fast on the image grid, and no additional spatial searching structure, such as a K-D tree, is needed.

Figure 26:
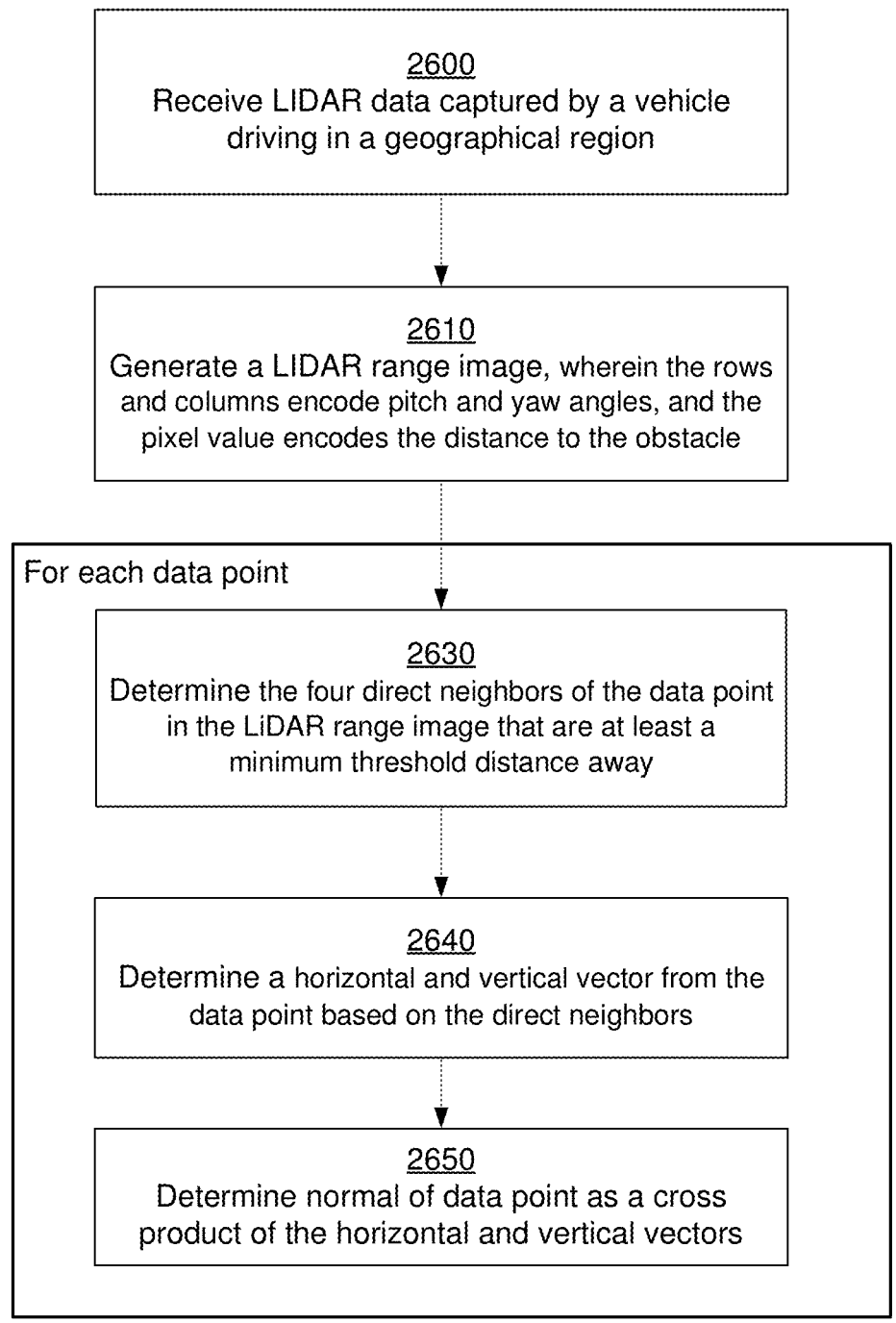
FIG. 26 shows the process for determining point cloud normals using the LiDAR range image by the HD map system, according to an embodiment.

FIG. 26 shows the process for determining point cloud normals on the LiDAR range image by the HD map system, according to an embodiment. The HD map system receives 2600 LIDAR data captured by a LIDAR mounted on a vehicle driving in a particular geographical region. The HD map system generates 2610 a LIDAR range image. In the LIDAR image, the rows and columns encode pitch and yaw angles, and the pixel value encodes the distance of the LIDAR to the obstacle.

For each point P, the HD map system performs the following steps 2630, 2640, and 2650. The HD map system determines 2630 the four direct neighbors of the data point in the LiDAR range image that are at least a minimum threshold distance away: $p_{top}$, $p_{bottom}$, $p_{left}$, and $p_{right}$. If both, top and bottom neighbors, or left and right neighbors are missing, HD map system determines that the normal is an empty value.

The HD map system determines 2640 a horizontal and vertical vector from the data point based on the direct neighbors. The HD map system determines the most appropriate horizontal and vertical vector ($\vec{v}_{horizontal}$, $\vec{v}_{vertical}$) from p and its four neighbors. The horizontal vector is computed as follows, and vertical vector is computed in a similar fashion. If both ($\vec{v}_{h1}=p_{left}-p$, $\vec{v}_{h2}=p_{right}-p$) and ($\vec{v}_{v1}=p_{top}-p$, $\vec{v}_{v2}=p_{bottom}-p$) exist, the system checks their angle. If the system determines that the angle is too big (i.e., greater than a predetermined threshold value), the system takes the shorter one as $\vec{v}_{horizontal}$; otherwise, the system takes the average as $\vec{v}_{horizontal}$.

The HD map system determines 2650 normal of data point as a cross product of the horizontal and vertical vectors $\vec{v}_{horizontal}$ and $\vec{v}_{vertical}$. In an embodiment, the normal vector is adjusted to point to the LiDAR center.

Figure 27:
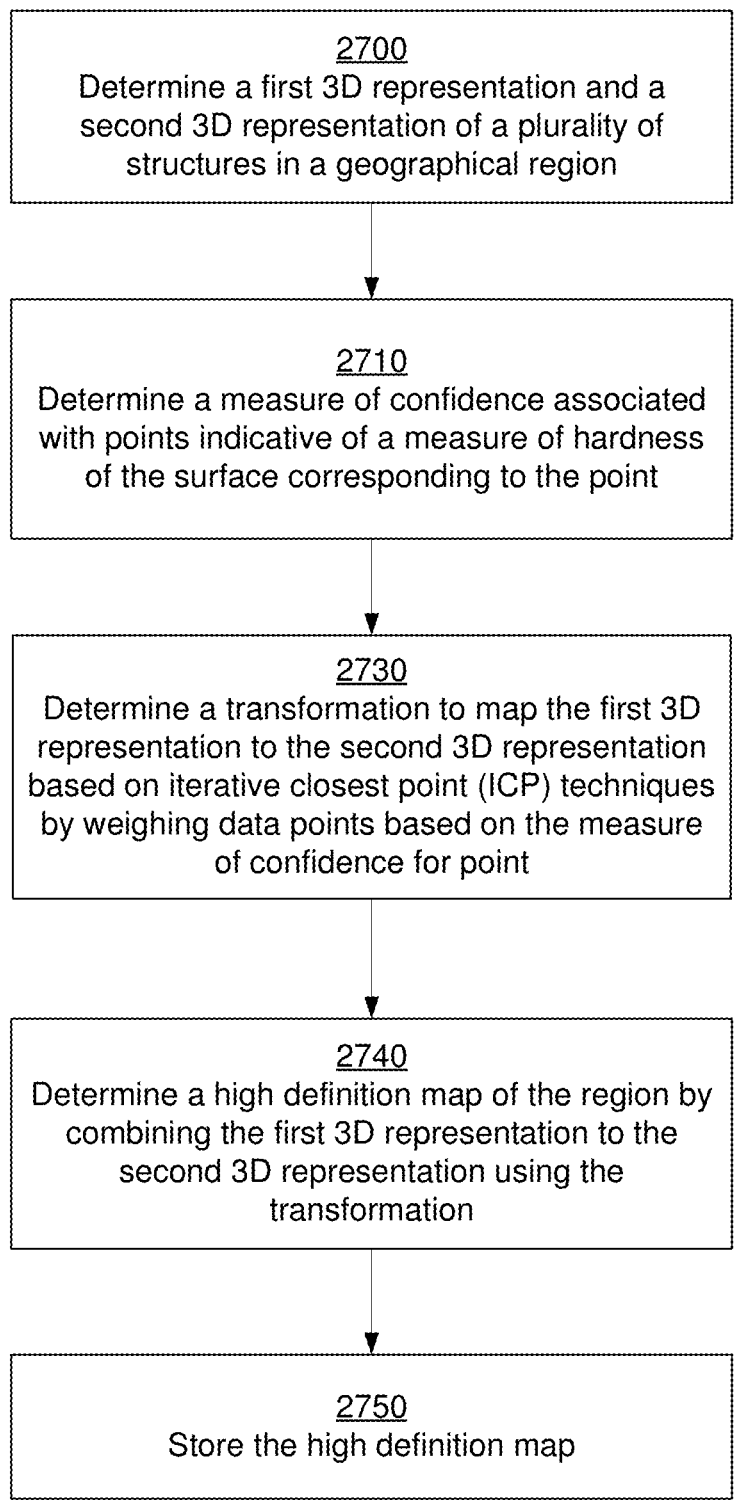
FIG. 27 shows the process for performing pairwise alignment based on classification of surfaces as hard/soft, according to an embodiment.

FIG. 27 shows the process for performing pairwise alignment based on classification of surfaces as hard/soft, according to an embodiment. Various steps illustrated in the flowchart may be performed by modules other than those indicated herein. Certain steps may be performed in an order different from those indicated herein.

The global alignment module 400 determines 2700 a plurality of 3D representations of a portion of a geographical region. The 3D representation may be a point cloud representation but could be any other mechanism for modeling 3D objects and structures. The plurality of 3D representations of a portion of a geographical region comprises a first 3D representation R1 and a second 3D representation R2 of the portion of the geographical region. The portion of a geographical region may comprise a plurality of structures or objects, for example, buildings, trees, fences, walls, and so on.

The surface classification module 1140 determines 2710 a measure of confidence associated with data points indicative of a measure of hardness of the surface corresponding to the data point. The surface classification module 1140 considers structures and objects such as buildings and walls are considered as relatively hard surfaces compared to structures such as trees or objects such as living beings. The surface classification module 1140 determines a measure of hardness of a surface of a structure based on various criteria associated with the LIDAR signal returned by points on the surface of the structure. In an embodiment, each criterion is associated with a score. The measure of hardness of the surface is determined as a weighted aggregate of the scores associated with the surface. A criterion for determining the measure of hardness of a surface of a structure is the distribution of the normal vectors of points on the surface. Another criterion for determining the measure of hardness of a surface of a structure is the color of the light reflected by the surface. For example, the surface classification module 1140 identifies certain colors as being indicative of vegetation, for example, green. Accordingly, the surface classification module 1140 associates surfaces having such colors with a high likelihood of being a soft surface such as a tree or any type of vegetation. Another criterion used by the surface classification module 1140 is the intensity of laser signal returned by the surface. The surface classification module 1140 associates higher intensity of signal returned by a surface as an indication of hard surface. In an embodiment, various features associated with a point or a surface are extracted as a feature vector and provided to a machine learning based model to determine a score indicating a level of hardness of a surface. In an embodiment, the machine learning based model is a classifier that classifies the surface as a hard surface or a soft surface. In an embodiment, the machine learning based model is trained using labeled samples describing surfaces captured by sensors of vehicles. Further details of determining measures of confidence are further described below in connection with FIGS. 28, 24, and 26.

The surface classification module 1140 determines 2730 a transformation T to map the first 3D representation to the second 3D representation based on iterative closest point (ICP) techniques by weighing data points based on the measure of confidence for each data point. The Determine HD map system 100 determines 2740 a high definition map of the geographical region by combining the first 3D representation R1 with the second 3D representation R2 using the transformation T. The HD map system 100 stores the high definition map. The HD map system 100 uses the high definition map for use in driving of autonomous vehicles.

The process described in FIG. 27 is heuristic based and may not measure an actual hardness of a structure. For example, a hard statue of a tree would be classified as a soft surface even though it is rigid and not moveable. However, the technique provides accurate results in practice because the likelihood of encountering a statue or a rigid structure that closely resembles a soft surface is low. Accordingly, statistically the results for most structures and objects encountered in practice are accurate.

Figure 28:
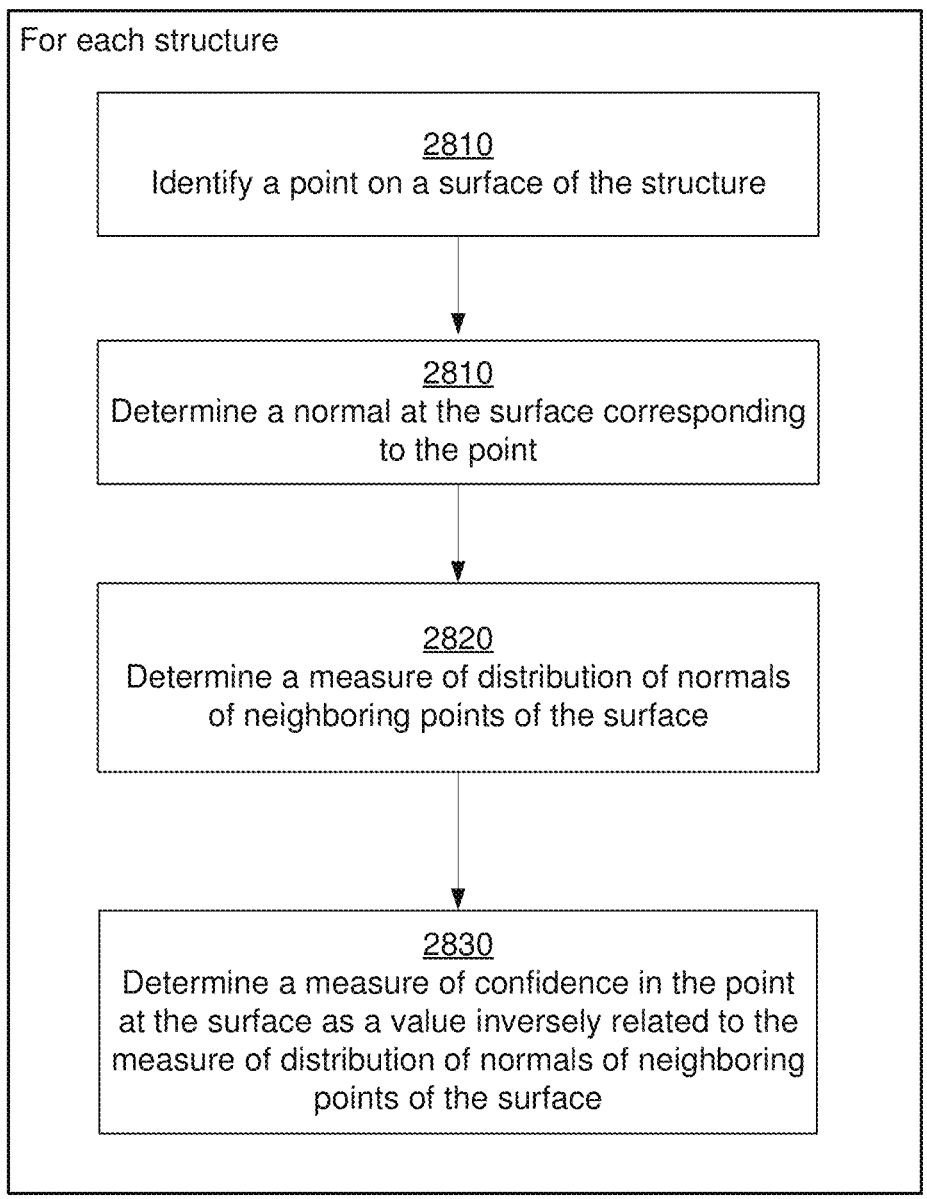
FIG. 28 shows the process for determining a measure of confidence for points along a surface for use in pairwise alignment, according to an embodiment.

FIG. 28 shows the process for determining a measure of confidence for points along a surface for use in pairwise alignment, according to an embodiment. The surface classification module 1140 identifies a point on a surface of a structure. The surface classification module 1140 determines a normal at the surface corresponding to the point. The surface classification module 1140 determine a measure of distribution of normals of neighboring points of the surface. The measure of distribution may be a statistical measure for example variance or standard deviation. The surface classification module 1140 determines a measure of confidence in the point at the surface as a value inversely related to the measure of distribution of normals of neighboring points of the surface. Accordingly, the surface classification module 1140 assigns scores indicating high confidence in points having low variance in the distribution of normals of neighboring points of the surface, for example, walls, buildings, and so on. Similarly, the surface classification module 1140 assigns scores indicating low confidence in points having high variance in the distribution of normals of neighboring points of the surface, for example, trees.

Figure 29:
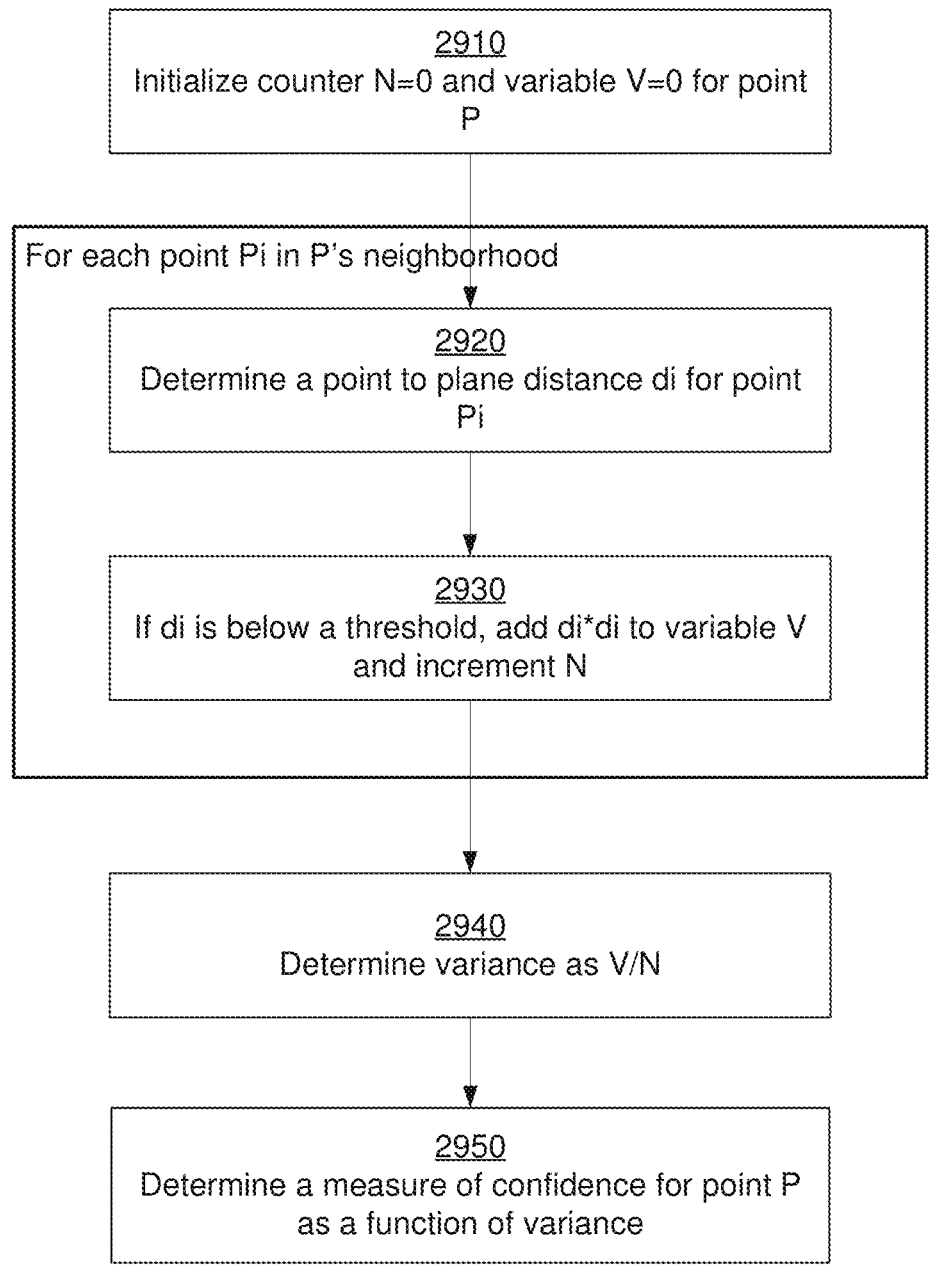
FIG. 29 shows the process for determining a measure of confidence for points, according to an embodiment.

FIG. 29 shows the process for determining a measure of confidence for points, according to an embodiment. The process in FIG. 29 is repeated for each point P with an estimated normal $\vec{n}$. The surface classification module 1140 initializes 2910 a counter N=0 and a variable V=0. The performs the steps 2920 and 2930 for each point Pi in point P's neighborhood in a rectangle window of the range image. The surface classification module 1140 determines 2920 the point-to-plane distance $d_i$ for point Pi using equation $d_i = (p_i - p) \cdot \vec{n}$. The surface classification module 1140 compares $d_i$ against a threshold value to determine whether the distance is below the threshold. If the distance value is $d_i$ determined to be below the threshold value, the surface classification module 1140 adds a square of $d_i$ to the value of the variable V, i.e., $V = V + d_i^2$ and increments N by 1, e.g., by performing N++.

The surface classification module 1140 determines 2940 a value for the variance as V/N. The surface classification module 1140 determines 2950 a measure of confidence for point P as a function of variance. In an embodiment the measure of confidence for the normal vector is determined as $$\text{confidence}(\vec{n}) = \exp\left(-\frac{\text{variance}}{2\sigma^2}\right)$$

where σ is a parameter. The surface classification module 1140 determines confidence value for each normal, and combined the confidence values into the weights of each ICP cost so that higher weights correspond with high normal confidence as shown in the equation:

$$\min_T \sum_i w_i \, | n_i \cdot (T \cdot s_i - d_i)^2 \, |^2, \text{ where } w_i = \text{confidence}(\vec{n}_i)$$

In some embodiments, in addition to weighting each correspondence via normal confidence, the HD map system achieves further robustness against noises and outliers via weighting the correspondences based on the distances between corresponding points. Given a correspondence $[s_i \rightarrow (d_i, \vec{n}_i)]$, the HD map system weights the correspondence via the corresponding point-to-plane error through a Lorentz's function:

$$w_i = 1 / \left[1 + \frac{1}{2\sigma^2}(\vec{n}_i \cdot (s_i - d_i)^2)\right]$$

The Lorentz's function serves penalizes wrong correspondences thereby making the result robust. In some embodiments, surface classification module 1140 multiplies the Lorentz's weight with the normal confidence as the final weight for each correspondence.

Soft surfaces are also referred to herein as softscape surfaces and hard surfaces are referred to herein as hardscape surfaces. A surface has a surface type that can be hard or soft. A surface with hard surface type is a hard surface, for example, a wall, and a surface with a soft surface type is a soft surface, for example, a tree.

The HD map system uses the confidence measure as a surface classifier, where "hardscape" surfaces have a high confidence and "softscape" has a low confidence. The HD map system uses this hardscape/softscape classification method to avoid matching hardscape points in one scan to softscape in the other, and uses the confidence weights to enforce this constraint.

The HD map system associates hardscape surfaces with higher confidence since they are usually much more valuable for alignment than softscape. This is because when the LIDAR scans a hard surface like a wall, it returns a clean, well-structured sets of points. So matching two scans of a wall is fairly easy. But when it scans softscape (like a bush), the points are quite noisy and have a complex random structure depending on how deep into the bush the signal went, how the leaves were oriented, and so on. So when the HD map system tries to match two scans of a bush, the HD map system may downweight the normals and just use the points.

In general matching hardscape to hardscape provides a strong constraint and is weighted more by the HD map system. Softscape (vegetation) to softscape is useful but has a weaker constraint since one scan may hit one leaf and the 2nd scan may hit a different but nearby leaf. Accordingly, the HD map system weighs softscape to softscape surface matching with lower weight compared to hardscape to hardscape surface matching. Furthermore, the HD map system weighs hardscape to softscape matches the least as that is an indication of a matching error.

Accordingly, the HD map system determines the transformation to map a first 3D representation to a second 3D representation by weighing corresponding points higher if the points have surfaces with matching surface type compared to points that have different surface types. In an embodiment, the HD map system weighs corresponding points higher if the points are on surfaces with matching measure of hardness. Accordingly, two surfaces have a matching measure of hardness if the measure of hardness of the two surfaces is within a threshold value each other. Furthermore, the HD map system weighs corresponding points higher if the points are on hard surfaces compared to points that are both on soft surfaces.

Detection of Misalignment Hotspots

After the HD map system performs global alignment, there are often potential alignment issues that need further analysis, for example, quality assurance by humans or using automated tools. A human or an automated tool could further provide input for improvement of the alignment data. However, the amount of data present in a HD map covering a large area is huge. As a result, it is not practical to perform detailed follow-up analysis of the entire map, for example, by using human operators to QA the entire map. Embodiments of the HD map system implement an automatic misalignment hotspot detection process to automatically identify regions of alignment problems. Accordingly, the follow-up analysis is performed of only the hotspots identified rather than of the entire HD map. This improves the efficiency of the process of finalizing the HD map and improves the quality of results. For example, the HD map needs to be finalized within a threshold amount of time to be able to be provided for vehicles driving along a route. If the process of verification and finalization of the HD map takes a very long time, the changes to the HD map as a result of updates received from various autonomous vehicles cannot be propagated to other vehicles driving along a route. Embodiments make the process of verification and QA of the HD map efficient thereby allowing the HD map to be provided to subsequent vehicles driving along various routes in time.

Embodiments automatically identify following situations that need further analysis and verification, for example, in the form of human QA. The HD map system detects via the misalignment hotspot detection process: (1) Non-planar crossing of roads: e.g., over/under passes, bridges, etc. LIDAR samples have very little overlapping and hence difficult to use ICP to align, but needs human to align them to guarantee global pose consistency. (2) Long-range loop closing: ICP can fail due to lack of overlapping point clouds, therefore the HD map system does not automatically align point clouds that are far away (e.g., beyond 25 m) from each other. Since typical LiDARs have very large range (~100 m), the point clouds may still have overlapping. In this case, the HD map system sends information to a user to manually close loops by adding constraints between point clouds that are far apart but still have some portion of overlapping. (3) Alignment errors that lead to: misaligned ground, misaligned vertical planar walls, and so on in the OMap.

Overall Process for Detecting Misalignment Hotspots

Figure 30:
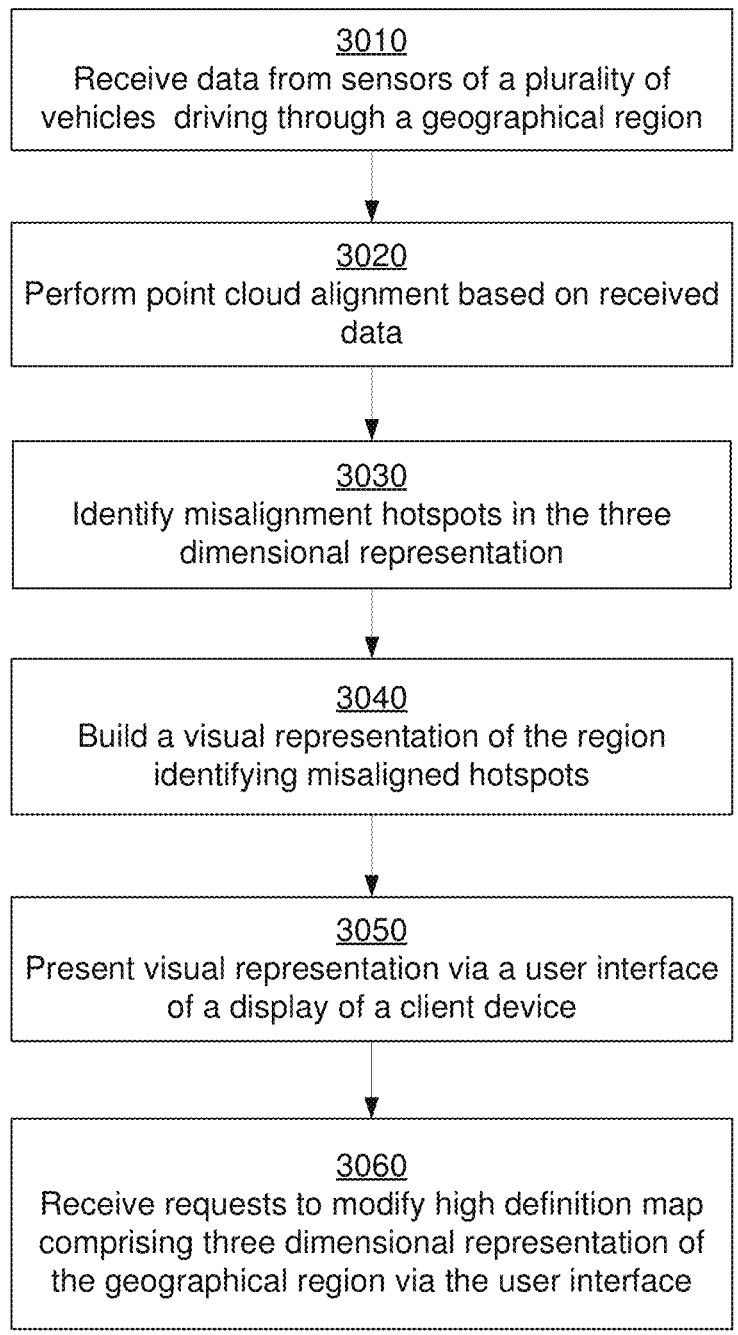
FIG. 30 shows a process for automatic detection of misalignment hotspot, according to an embodiment.

After FIG. 30 shows a process for generating high-definition maps based on automatic detection of misalignment hotspots, according to an embodiment. In an embodiment, the various steps illustrated in FIG. 30 are performed by the online HD map system 110, for example, by the global alignment module 460. In other embodiments, some of the steps of the process may be performed by the vehicle computing system 120.

The HD map system 100 receives 3000 data from sensors of a plurality of vehicles driving through a geographical region. For example, multiple vehicles may drive on the same road and send sensor data including images captured by cameras mounted on the care, LIDAR scan data, and so on. The HD map system 100 performs 3010 alignment of point clouds based on the received data. For example, a point cloud for a portion of a geographical region determined based on sensor data received from vehicle V1 may be slightly different from the point cloud for the same portion of the geographical region determined based on sensor data received from vehicle V2. The global alignment module 460 performs alignment of the different point cloud representations to generate an aggregate point cloud representation for the geographical region. Accordingly, the global alignment module 460 generates a three dimensional representation of the region based on the received sensor data.

The misalignment hotspot detection module 1160 identifies 3030 misalignment hotspots in the three dimensional representation of the geographical region. The various techniques used by the hotspot detection module 1160 to identify 3030 misalignment hotspots are described in further details herein. In an embodiment, the HD map system 100 builds 3040 a visual representation of the geographical region that highlights the various misalignment hotspots, for example, the visual representation may be a heat map chart. The HD map system 100 presents 3050 the visual representation via a user interface of a display of a client device. In an embodiment, the HD map system 100 receives 3060 requests to modify the high definition map for the geographical region via a user interface. For example, a user may view the visual representation and analyze the hotspots to identify problems with the alignment and then make corrections to the data representing the alignment results. In another embodiment, an automatic agent, for example, an expert system may perform analysis of the misalignment hotspots identified 3030 to recommend modifications to the HD map data or to automatically make the modifications to the HD map data for the geographical region.

In an embodiment, the misalignment hotspot detection module 1160 detects misalignment based on loop closing data. The misalignment hotspot detection module 1160 detects non-planar crossing roads and long-range loop closing edges. For both case, given two arbitrary samples, the misalignment hotspot detection module 1160 computes the ratio between their graph distance (i.e., shortest path distance determined by traversing the pose graph) and their geodesic distance, i.e., the straight line distance between two points. If the ratio is high, the misalignment hotspot detection module 1160 determines that there is a high likelihood that the two point clouds have overlapping portions, but do not have loop closure pairwise transforms. Accordingly, the misalignment hotspot detection module 1160 indicates these portions as misalignment hotspots.

In another embodiment, the misalignment hotspot detection module 1160 detects misaligned ground in the three dimensional representation of the geographical region. Perfectly aligned ground should be a single layer of nodes, but practice the aligned ground nodes determined by the global alignment module 400 has a thickness that has a non-zero value. The misalignment hotspot detection module 1160 determines that thick layers of ground nodes indicate bad alignment, while thin layers indicate good alignment. Accordingly, the misalignment hotspot detection module 1160 determines a likelihood of misalignment as a value directly related to the thickness of the layer representing ground in a portion of the geographical region.

Figure 31:
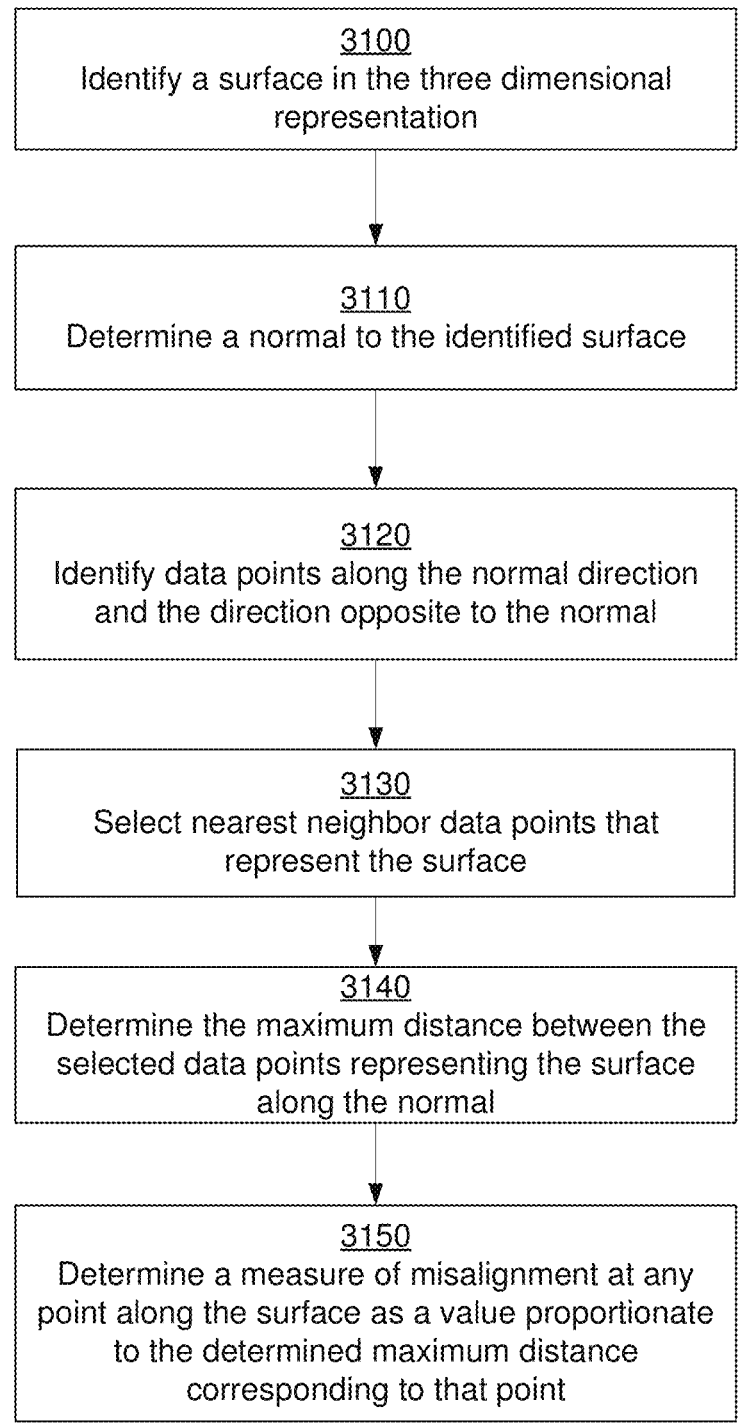
FIG. 31 shows a process for detection of misalignment for surfaces represented in a point cloud, according to an embodiment.

FIG. 31 shows a process for detection of misalignment for surfaces represented in a point cloud, according to an embodiment. The process shown in FIG. 31 is an embodiment of the step 3030 shown in FIG. 30. The misalignment hotspot detection module 1160 identifies a surface 3100 in the three dimensional representation of a geographical region, for example, a point cloud representation. For example, the surface may represent ground or a wall. The misalignment hotspot detection module 1160 determines 3110 a normal to the identified surface. The misalignment hotspot detection module 1160 identifies 3120 data points within the point cloud representation along the normal direction as well as the direction opposite to the normal. The misalignment hotspot detection module 1160 selects 3130 a cluster of points that are likely to represent the identified surface, for example, the misalignment hotspot detection module 1160 may cluster the identified data points and select a cluster representing the nearest neighbor points that are close to the identified surface.

In an embodiment, the misalignment hotspot detection module 1160 start with an identified data point that is closest to the identified surface. The misalignment hotspot detection module 1160 builds a set of data points by adding data points to the set if they are within a threshold distance of at least one other data point within the set. The misalignment hotspot detection module 1160 when the nearest data point to the selected set of data points is more than the threshold distance.

The misalignment hotspot detection module 1160 determines 3140 the maximum distance between the selected data points along the normal that are determined to represent the surface. The misalignment hotspot detection module 1160 determines QX50 a measure of misalignment at a particular data point along the surface as a value that is directly related to or directly proportionate to the determines 3140 maximum distance between the selected data points along the normal corresponding to that particular data point on the surface.

Figure 32:
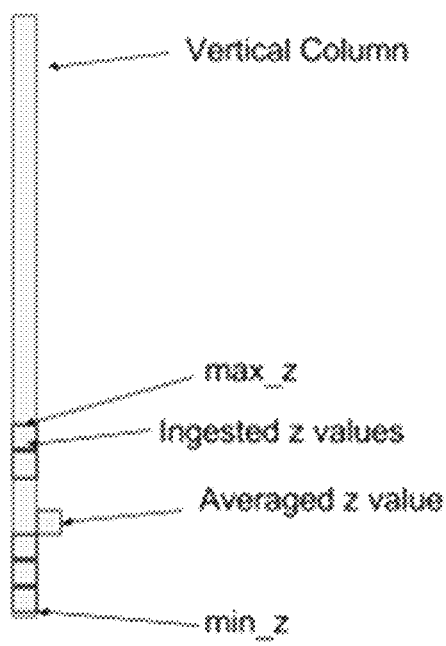
FIG. 32 illustrates detection of misalignment for ground represented in a point cloud, according to an embodiment.

FIG. 32 illustrates detection of misalignment for ground represented in a point cloud, according to an embodiment. In the OMap building process, the HD map system ingests interpolated ground points into a vertical column's temporary memory storage. When the HD map system ingests all ground points, the average height value (along the Z axis) is calculated based on the all of the z-coordinate values in that vertical column. The misalignment hotspot detection module 1160 determines the average z value, and determines the thickness of the ground representation as the difference between the maximum value of the z coordinate (max_z) and the minimum value of the z-coordinate (min_z) within the vertical column. The misalignment hotspot detection module 1160 uses the measure of thickness of the ground along the vertical column as an indicator of misalignment. Accordingly, the misalignment hotspot detection module 1160 determines a score representing the likelihood of misalignment as a value directly proportionate (or directly related) to the difference between the max_z and min_z values. In one embodiment, the misalignment hotspot detection module 1160 uses one byte (0-255) to represent the possibility of misalignment, with 0 representing perfectly aligned ground and 255 representing the diff(max_z, min_z)>=50 cm. For example, a list of node z values could be [12, 13, 14, 16], the average of node z is 14 (13.75 almost equal to 14) and the diff(max_z, min_z)=4. Each node is about 5 centimeters, so converting to metric value, the diff is 20 centimeters. The misalignment hotspot detection module 1160 determines the one byte value as (255*20/50.0)=100 (approximately).

Figure 33:
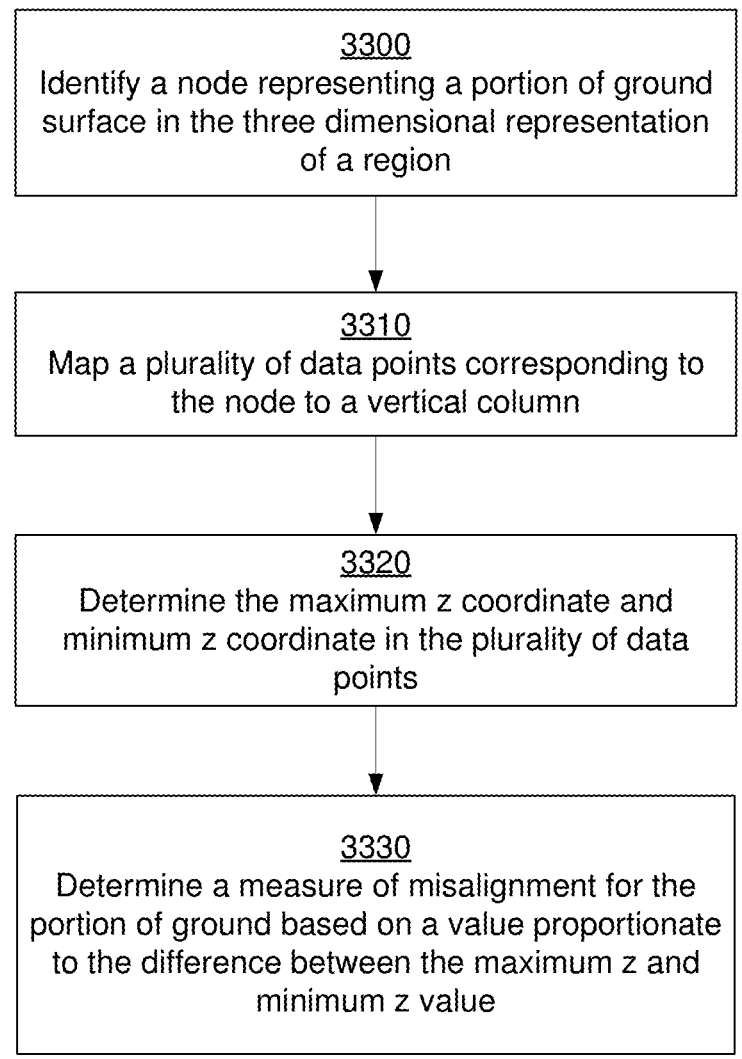
FIG. 33 shows a process for detection of misalignment for ground surface represented in a point cloud, according to an embodiment.

FIG. 33 shows a process for detection of misalignment for ground surface represented in a point cloud, according to an embodiment. The process shown in FIG. 31 is an embodiment of the step 3030 shown in FIG. 30. The misalignment hotspot detection module 1160 identifies 3300 a node representing a portion of ground surface in the three dimensional representation of a region. The misalignment hotspot detection module 1160 maps 3310 a plurality of data points corresponding to the node to a vertical column within the three dimensional representation. The normal to the ground surface is assumed to be in the vertical direction, i.e., the Z axis. The vertical column comprises data points having the same x and y coordinate values by varying z coordinate values. The misalignment hotspot detection module 1160 determines 3320 the maximum z coordinate and the minimum z coordinate values in the plurality of data points. The misalignment hotspot detection module 1160 determines 3330 a measure of misalignment for the portion of ground based on a value proportionate to the difference between the maximum z coordinate value and the minimum z coordinate value.

Figure 34:
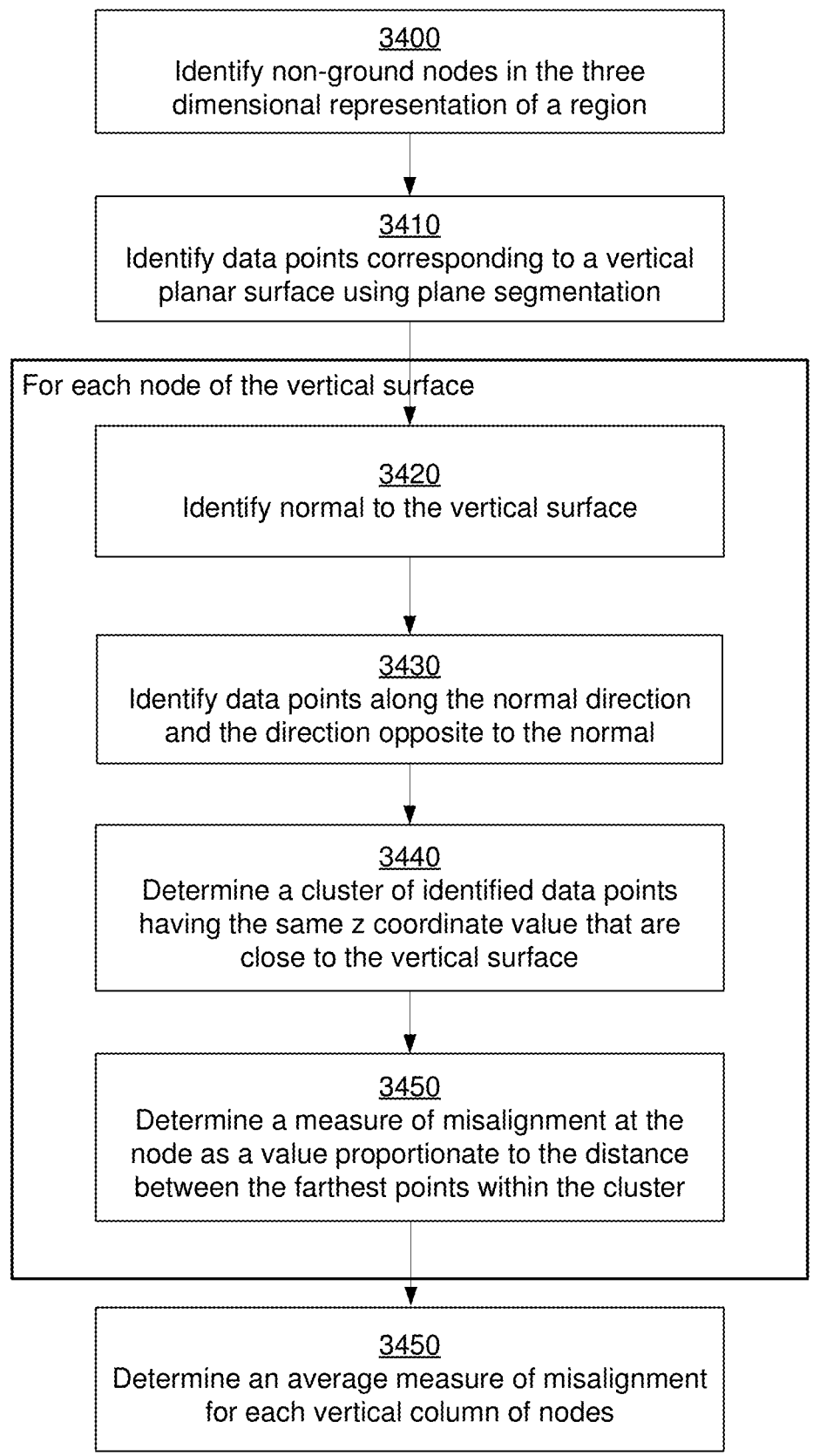
FIG. 34 shows a process for detection of misalignment for vertical surfaces represented in a point cloud, according to an embodiment.

FIG. 34 shows a process for detection of misalignment for vertical surfaces represented in a point cloud, according to an embodiment. The process shown in FIG. 34 is an embodiment of the step 3030 shown in FIG. 30. The misalignment hotspot detection module 1160 identifies 3400 non-ground nodes in the three dimensional representation of a geographical region. The misalignment hotspot detection module 1160 identifies 3410 data points that represent a vertical planar surface. In an embodiment, the misalignment hotspot detection module 1160 uses a plane segmentation technique for identifying 3410 data points that represent a vertical planar surface.

The misalignment hotspot detection module 1160 repeats the following steps 3420, 3430, 3440, and 3450 for each node of the vertical surface or at least a subset of nodes for the vertical surface. The misalignment hotspot detection module 1160 identifies 3420 a normal to the vertical surface. The normal represents a vector in a horizontal plane. The misalignment hotspot detection module 1160 identified data points along the normal direction and direction opposite to the normal. The misalignment hotspot detection module 1160 selects a cluster of data points that have the same z coordinate value that are close to the vertical surface. The misalignment hotspot detection module 1160 determines 3450 a measure of misalignment at the node as a value proportionate to the distance between the farthest points within the cluster.

The misalignment hotspot detection module 1160 further determines an average measure of misalignment for each vertical column of nodes. The misalignment hotspot detection module 1160 converts the result to a 2D heat map image, so each image pixel represents the averaged probability of misalignment of one vertical column.

Figure 35:
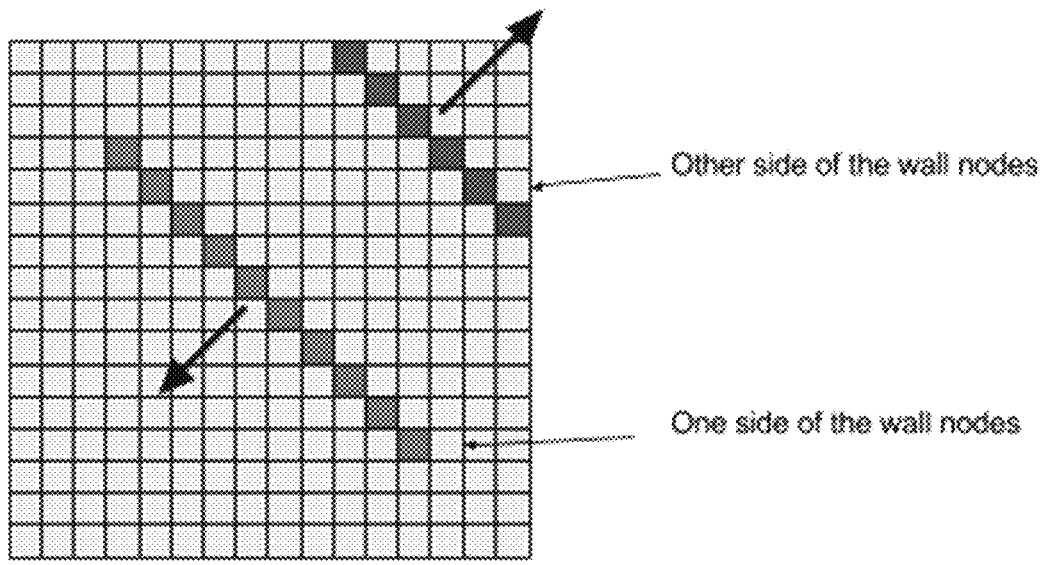
FIG. 35 shows an example illustrating detection of misalignment for a vertical structure such as a wall represented in a point cloud, according to an embodiment.
Figure 35:
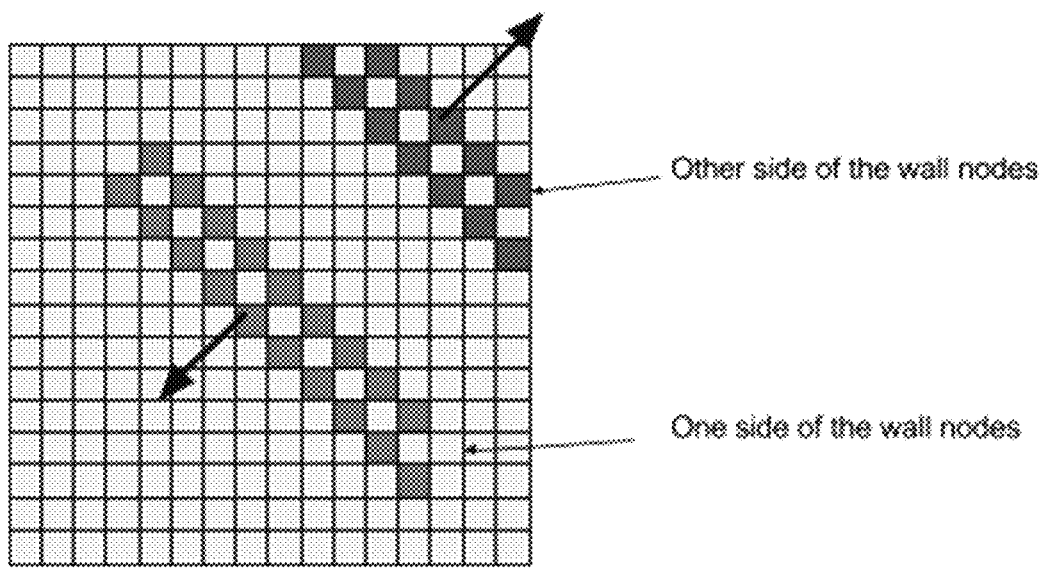

FIG. 35 shows an example illustrating detection of misalignment for a vertical structure such as a wall represented in a point cloud, according to an embodiment. Similar to ground alignment, the misalignment hotspot detection module 1160 treats walls as thin vertical planar layers. However, misalignment can cause duplicate and thick wall layers. The misalignment hotspot detection module 1160 identifies misaligned walls or portions within any vertical surface that are misaligned. The HD Map system treats the built OMap as a point cloud by considering the center of each node as a point. The misalignment hotspot detection module 1160 obtains non-ground nodes since they represent vertical surfaces. The misalignment hotspot detection module 1160 uses a plane segmentation algorithm to get all planar surfaces, for example, a sub-window based region growing (SBRG) algorithm. Since the point cloud is converted from the OMap, all temporary obstacle points (e.g. cars) are not included. The misalignment hotspot detection module 1160 marks the segmented points as walls or vertical surfaces.

According to an embodiment, the misalignment hotspot detection module 1160 performs the following steps. In the following description, points in the three dimensional representation of the geographical region are referred to as nodes. The misalignment hotspot detection module 1160 marks all wall nodes as unknown.

The misalignment hotspot detection module 1160 performs the following steps for each unknown wall node. The misalignment hotspot detection module 1160 gets the normal of the node. Along the normal direction and the reverse direction, the misalignment hotspot detection module 1160 finds the minimum x coordinate (min_x), maximum x coordinate (max_x), minimum y coordinate (min_y) and maximum y coordinate (max_y) in the same z level. The normal of the found nodes should match the normal of the current wall node being processed. The purpose is not to select the other side of the wall nodes. In an embodiment, the misalignment hotspot detection module 1160, builds a KD-tree of all the wall nodes. The misalignment hotspot detection module 1160 searches all wall nodes within a threshold distance (for example, 1 meter) for the current wall node being processed. The misalignment hotspot detection module 1160 identifies nearest neighbor points for the wall node. The hotspot detection module 1160 excludes (or skips) some of the points based on certain criteria. The misalignment hotspot detection module 1160 excludes the point if node z coordinate is different. The misalignment hotspot detection module 1160 excludes the point if the angle between the current node's normal and the neighbor node's normal is larger than a threshold. The misalignment hotspot detection module 1160 excludes the point if the vector direction from neighbor node to current node is not parallel to the current node's normal. The misalignment hotspot detection module 1160 updates the min_x, max_x, min_y and max_y values if needed. The misalignment hotspot detection module 1160 marks the nearest neighbor node as DONE.

The misalignment hotspot detection module 1160 uses the min_x, max_x, min_y and max_y to calculate the distance to indicate the misalignment thickness. For example, min_x=2, max_x=5, min_y=10, max_y=20, results in the distance of 10.4 which roughly equals to 52 (10.4*5 cm) centimeters. Similar to the ground misalignment probability value, in an embodiment, the HD map system uses one byte to represent the value. The HD map system marks all these nodes as DONE from unknown so they don't need to be calculated again.

After all wall nodes are done, the misalignment hotspot detection module 1160 determines for each vertical column, the averaged misalignment probability of all wall nodes in this vertical column and assigns that value to the vertical column. To determine the average of misalignment probability, misalignment hotspot detection module 1160 adds all the wall node misalignment probability values in the same vertical column. The misalignment hotspot detection module 1160 divides the resulting value by the total number of wall nodes in that vertical column to get the averaged misalignment probability.

In an embodiment, the misalignment hotspot detection module 1160 exports the vertical column probabilities or ground misalignment probabilities as a 2D image as a heat map. For example, the misalignment hotspot detection module 1160 may color the high probability of misalignment as red and the well aligned x, y positions as green. The HD map system provides the generated heat map to a user to allow the user to visually inspect the OMap and focus on areas identified as having high probability of misalignment.

The generated heat map can also be used to generate hotspot locations by using the method described below. This process applies to both ground misalignment probability and wall misalignment probability heat maps. When a 2D heat map is generated, the HD map system determines hotspot locations from it by using an nxn moving window (e.g. n=5). If there are more than 50% (when n=5, the actual number is 13, 25*0.5=12.5) pixel values that are larger than 100 (means the misalignment is around 20 cm. 255*20 cm/50 cm=102), the latitude/longitude of the hotspot is exported to the output. Thus the final result is a list of hotspot latitude/longitude locations which is provided to a review tool to allow operators to review data for those locations and check the alignment manually.

According to another embodiment, hotspots are identified by clustering pixel values greater than 100 using a clustering algorithm which merges neighboring clusters while keeping the constraint of cluster diameter to be roughly 10 m (i.e., a value that is similar to the scale of an alignment sampling). The HD map system generates a hotspot for each cluster and exports it to a review tool.

Computing Machine Architecture

Figure 36:
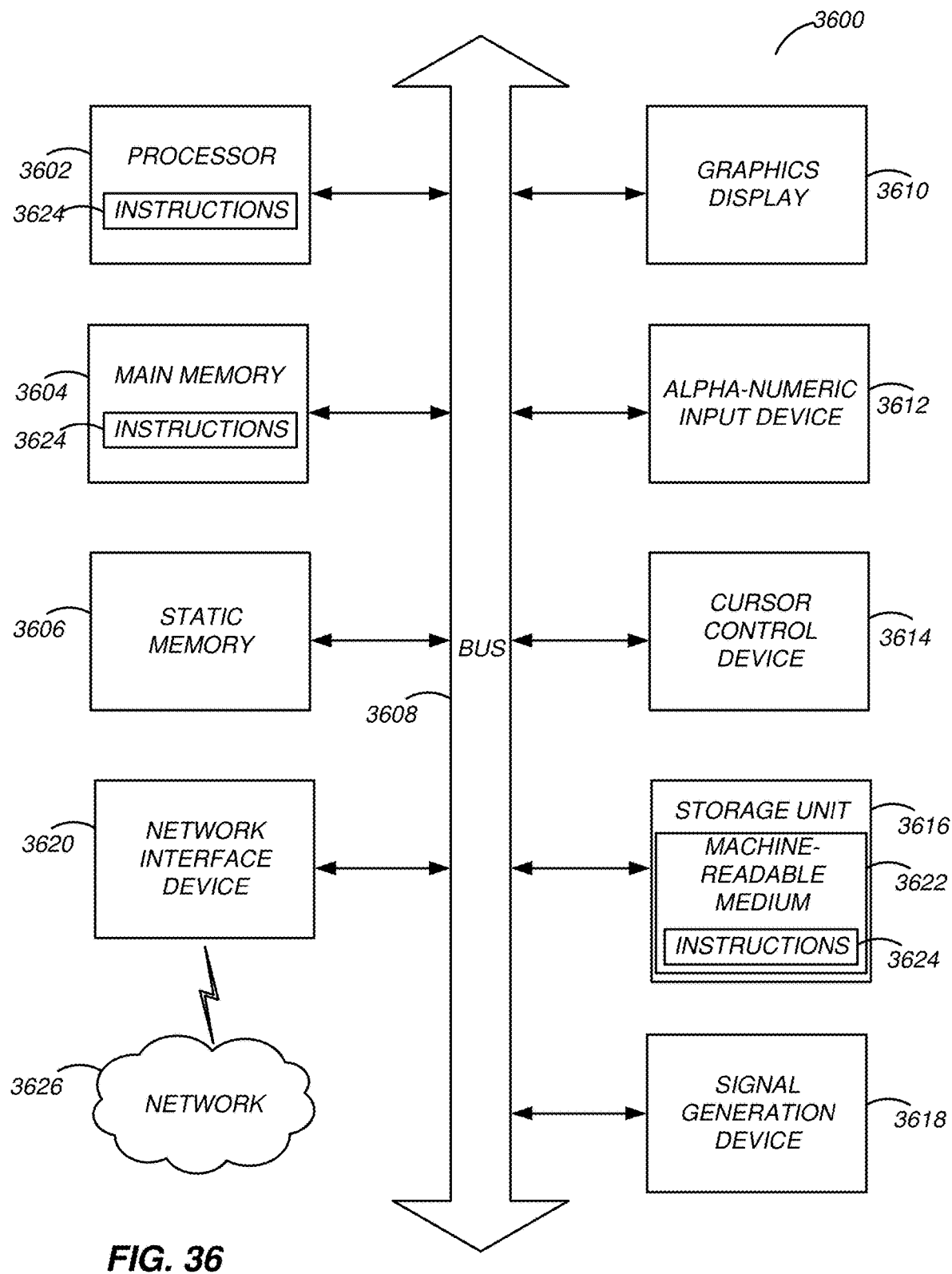
FIG. 36 illustrates an embodiment of a computing machine that can read instructions from a machine-readable medium and execute the instructions in a processor or controller.

FIG. 36 is a block diagram illustrating components of an example machine able to read instructions from a machine-readable medium and execute them in a processor (or controller). Specifically, FIG. 36 shows a diagrammatic representation of a machine in the example form of a computer system 3600 within which instructions 3624 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 3624 (sequential or otherwise) that specify actions to be taken by that machine. Further, while only a single machine is illustrated, the term "machine" shall also be taken to include any collection of machines that individually or jointly execute instructions 3624 to perform any one or more of the methodologies discussed herein.

The example computer system 3600 includes a processor 3602 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 3604, and a static memory 3606, which are configured to communicate with each other via a bus 3608. The computer system 3600 may further include graphics display unit 3610 (e.g., a plasma display panel (PDP), a liquid crystal display (LCD), a projector, or a cathode ray tube (CRT)). The computer system 3600 may also include alphanumeric input device 3612 (e.g., a keyboard), a cursor control device 3614 (e.g., a mouse, a trackball, a joystick, a motion sensor, or other pointing instrument), a storage unit 3616, a signal generation device 3618 (e.g., a speaker), and a network interface device 3620, which also are configured to communicate via the bus 3608.

The storage unit 3616 includes a machine-readable medium 3622 on which is stored instructions 3624 (e.g., software) embodying any one or more of the methodologies or functions described herein. The instructions 3624 (e.g., software) may also reside, completely or at least partially, within the main memory 3604 or within the processor 3602 (e.g., within a processor's cache memory) during execution thereof by the computer system 3600, the main memory 3604 and the processor 3602 also constituting machine-readable media. The instructions 3624 (e.g., software) may be transmitted or received over a network 3626 via the network interface device 3620.

While machine-readable medium 3622 is shown in an example embodiment to be a single medium, the term "machine-readable medium" should be taken to include a single medium or multiple media (e.g., a centralized or distributed database, or associated caches and servers) able to store instructions (e.g., instructions 3624). The term "machine-readable medium" shall also be taken to include any medium that is capable of storing instructions (e.g., instructions 3624) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

For example, although the techniques described herein are applied to autonomous vehicles, the techniques can also be applied to other applications, for example, for displaying HD maps for vehicles with drivers, for displaying HD maps on displays of client devices such as mobile phones, laptops, tablets, or any computing device with a display screen. Techniques displayed herein can also be applied for displaying maps for purposes of computer simulation, for example, in computer games, and so on.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

What is claimed is:

1. A method for determining hotspots in alignment data for generating high definition maps for use in driving of autonomous vehicles, the method comprising:
   receiving sensor data captured by a plurality of vehicles driving through a path in a geographical region, wherein the sensor data includes scan data captured by a respective LIDAR mounted on each of two or more vehicles of the plurality of vehicles;
   combining the received sensor data to generate a three dimensional representation of the geographical region;
   determining a surface and a measure of thickness corresponding to the surface from the three dimensional representation of the geographical region;
   determining a measure of likelihood of misalignment of at least a portion of the identified surface as a value proportionate to the measure of thickness;
   marking, as a misalignment hotspot location, an area identified within the three dimensional representation that includes the portion of the identified surface, the area being identified as the misalignment hotspot location based on the determined measure of likelihood of misalignment;
   obtaining a modification to the three dimensional representation in which the three dimensional representation has been modified in response to the marking of the area;
   generating high definition map data based on the modified three dimensional representation;
   providing the high definition map data to a vehicle; and
   causing the performance of one or more driving operations by the vehicle using the high definition map data.

2. The method of claim 1, wherein marking the area includes providing a heat map identifying the area.

3. The method of claim 1, wherein the three dimensional representation of the geographical region is a point cloud.

4. The method of claim 1, wherein the sensor data further comprises images captured by a respective camera mounted on each of the one or more vehicles.

5. The method of claim 1, wherein determining the measure of thickness corresponding to the surface comprises:
   determining a normal vector pointing in a direction normal to the identified surface;
   selecting a point on the identified surface;
   identifying a cluster of points related to the selected point in the three dimensional representation along the normal direction and a direction opposite the normal direction; and
   determining a maximum distance between the points in the cluster as the measure of thickness corresponding to the identified surface.

6. The method of claim 5, wherein the identified surface represents ground and the normal vector points in a vertical direction.

7. The method of claim 5, wherein the identified surface represents a wall and the normal vector is in a horizontal plane.

8. The method of claim 7, wherein identifying the cluster of points comprises excluding a point if the point has a vertical coordinate that is different from the selected point on the identified surface.

9. The method of claim 7, wherein identifying the cluster of points comprises excluding a point if a vector direction from the point to the selected point on the identified surface is not parallel to the normal vector.

10. The method of claim 1, further comprising:
    identifying a first point and a second point along the path in the geographical region;
    determining a first measure of distance between the first point and the second point representing a distance traversed along the path to get from the first point to the second point;
    determining a second measure of distance based on a geodesic distance between the first point and the second point; and
    determining, as the measure of likelihood of misalignment, a measure of misalignment probability associated with the first point and the second point as a value proportionate to the difference between the first measure of distance and the second measure of distance.

11. One or more non-transitory computer readable storage media storing instructions that, in response to being executed by one or more processors, cause a system to perform operations, the operations comprising:
    receiving sensor data captured by a plurality of vehicles driving through a path in a geographical region, wherein the sensor data includes scan data captured by a respective LIDAR mounted on each of one or more vehicles of the plurality of vehicles;
    combining the received sensor data to generate a three dimensional representation of the geographical region, wherein high definition map data is generated based on the three dimensional representation;
    determining a surface and a measure of thickness corresponding to the surface from the three dimensional representation of the geographical region;
    determining a measure of likelihood of misalignment of at least a portion of the identified surface as a value proportionate to the measure of thickness;
    marking, as a misalignment hotspot location, an area identified within the three dimensional representation that includes the portion of the identified surface, the area being identified as the misalignment hotspot location based on the determined measure of likelihood of misalignment; and
    obtaining a modification to the high definition map data in which the high definition map data has been modified in response to the marking of the area.

12. The non-transitory computer readable storage media of claim 11, wherein determining the measure of thickness corresponding to the surface comprises:
    determining a normal vector pointing in a direction normal to the identified surface;
    selecting a point on the identified surface;
    identifying a cluster of points related to the selected point in the three dimensional representation along the normal direction and a direction opposite the normal direction; and
    determining a maximum distance between the points in the cluster as the measure of thickness corresponding to the identified surface.

13. The non-transitory computer readable storage media of claim 11, wherein the identified surface represents ground and the normal vector points in a vertical direction.

14. The non-transitory computer readable storage media of claim 11, wherein the identified surface represents a wall and the normal vector is in a horizontal plane.

15. The non-transitory computer readable storage media of claim 11, wherein the operations further comprise:
    identifying a first point and a second point along the path in the geographical region;

determining a first measure of distance between the first point and the second point representing a distance traversed along the path to get from the first point to the second point;

determining a second measure of distance based on a geodesic distance between the first point and the second point; and determining, as the measure of likelihood of misalignment, a measure of misalignment probability associated with the first point and the second point as a value proportionate to the difference between the first measure of distance and the second measure of distance.

16. A computer system comprising:

an electronic processor; and one or more non-transitory computer readable storage media storing instructions that, in response to being executed by the electronic processor, cause the system to perform operations, the operations comprising:

receiving sensor data captured by a plurality of vehicles driving through a path in a geographical region, wherein the sensor data includes scan data captured by a respective LIDAR mounted on each of one or more vehicles of the plurality of vehicles;

combining the received sensor data to generate a three dimensional representation of the geographical region, wherein high definition map data is generated based on the three dimensional representation;

identifying a surface from the three dimensional representation of the geographical region;

determining a measure of thickness corresponding to the surface in the three dimensional representation based on points associated with the identified surface;

determining a measure of likelihood of misalignment of at least a portion of the identified surface as a value proportionate to the measure of thickness;

identifying, as a misalignment hotspot location, an area within the three dimensional representation that includes the portion of the identified surface, the area being identified as the misalignment hotspot location based on the determined measure of likelihood of misalignment;

marking the area of the three dimensional representation for further review in response to the area being identified as the misalignment hotspot;

obtaining a modification to the high definition map data in which the high definition map data has been modified in response to the marking of the area; and providing the high definition map data to a vehicle such that the high definition map data is used by the vehicle in performance of driving operations.

17. The computer system of claim 16, wherein determining the measure of thickness corresponding to the surface comprises:

determining a normal vector pointing in a direction normal to the identified surface;

selecting a point on the identified surface;

identifying a cluster of points related to the selected point in the three dimensional representation along the normal direction and a direction opposite the normal direction; and determining a maximum distance between the points in the cluster as the measure of thickness of the identified surface.

18. The computer system of claim 16, wherein the identified surface represents ground and the normal vector points in a vertical direction.

19. The computer system of claim 16, wherein the identified surface represents a wall and the normal vector is in a horizontal plane.

20. The non-transitory computer readable storage media of claim 11, wherein the operations further comprise providing the high definition map to a vehicle such that the high definition map is used by the vehicle in performance of driving operations.

* * * * *